(12) United States Patent
Kim et al.

(10) Patent No.: US 12,375,888 B2
(45) Date of Patent: Jul. 29, 2025

(54) MULTICAST-RELATED COMMUNICATION

(71) Applicant: LG ELECTRONICS INC., Seoul (KR)

(72) Inventors: Laeyoung Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 415 days.

(21) Appl. No.: 17/905,382

(22) PCT Filed: Mar. 3, 2021

(86) PCT No.: PCT/KR2021/002612
§ 371 (c)(1),
(2) Date: Aug. 31, 2022

(87) PCT Pub. No.: WO2021/177716
PCT Pub. Date: Sep. 10, 2021

(65) Prior Publication Data
US 2023/0319514 A1 Oct. 5, 2023

(30) Foreign Application Priority Data

Mar. 4, 2020 (KR) .................. 10-2020-0026957
Jun. 1, 2020 (KR) .................. 10-2020-0065709
Dec. 9, 2020 (KR) .................. 10-2020-0171534

(51) Int. Cl.
*H04W 4/08* (2009.01)
*H04W 28/02* (2009.01)

(52) U.S. Cl.
CPC ......... *H04W 4/08* (2013.01); *H04W 28/0268* (2013.01)

(58) Field of Classification Search
CPC .... H04W 4/08; H04W 28/0268; H04W 36/00
See application file for complete search history.

(56) References Cited

U.S. PATENT DOCUMENTS

2020/0077315 A1* 3/2020 Jin .................. H04W 36/1443
2020/0267513 A1* 8/2020 Zhu .................. H04L 65/1033
(Continued)

FOREIGN PATENT DOCUMENTS

| WO | 2018-232605 | 12/2018 | |
| WO | WO-2018232605 A1 * | 12/2018 | ........ H04W 36/0033 |
| WO | 2019-129212 | 7/2019 | |

OTHER PUBLICATIONS

3GPP TS 23.502 v16.3.0 Procedures for 5G systems (5GS) Stage 2 Dec. 2019 (Year: 2019).*

(Continued)

*Primary Examiner* — Rina C Pancholi
(74) *Attorney, Agent, or Firm* — LEE, HONG, DEGERMAN, KANG & WAIMEY

(57) ABSTRACT

A disclosure of the present specification provides a method for performing multicast-related communication by an SMF. The method may comprise the steps of: receiving, from a UE, a join request message for requesting participation in multicast communication; transmitting, to an AMF node, an allocation request message for requesting allocation of an EBI to a unicast QoS flow corresponding to a multicast QoS flow related to the multicast communication; and receiving information of the EBI allocated to the unicast QoS flow from the AMF node.

12 Claims, 30 Drawing Sheets

(56) References Cited

U.S. PATENT DOCUMENTS

| | | | | |
|---|---|---|---|---|
| 2020/0323024 A1* | 10/2020 | Huang | ............... | H04L 12/185 |
| 2023/0379942 A1* | 11/2023 | Kim | ............... | H04W 36/0007 |
| 2024/0022968 A1* | 1/2024 | Kadiri | ............... | H04W 36/362 |

OTHER PUBLICATIONS

PCT International Application No. PCT/KR2021/002612, International Search Report dated Jun. 10, 2021, 6 page.

3rd Generation Partnership Project, "Technical Specification Group Services and System Aspects; Study on architectural enhancements for 5G multicast-broadcast services (Release 17)," 3GPP TR 23.757 V0.3.0, Jan. 2020, 37 pages.

3rd Generation Partnership Project, "Technical Specification Group Services and System Aspects; Procedures for the 5G System (5GS); Stage 2 (Release 16)," 3GPP TS 23.502 V16.3.0, Dec. 2019, 549 pages.

Nokia et al., "PDU session enhanced for multicast to provide the basic multicast connectivity service," S2-1911366, SA WG2 Meeting #S2-136, Nov. 2019, 8 pages.

\* cited by examiner

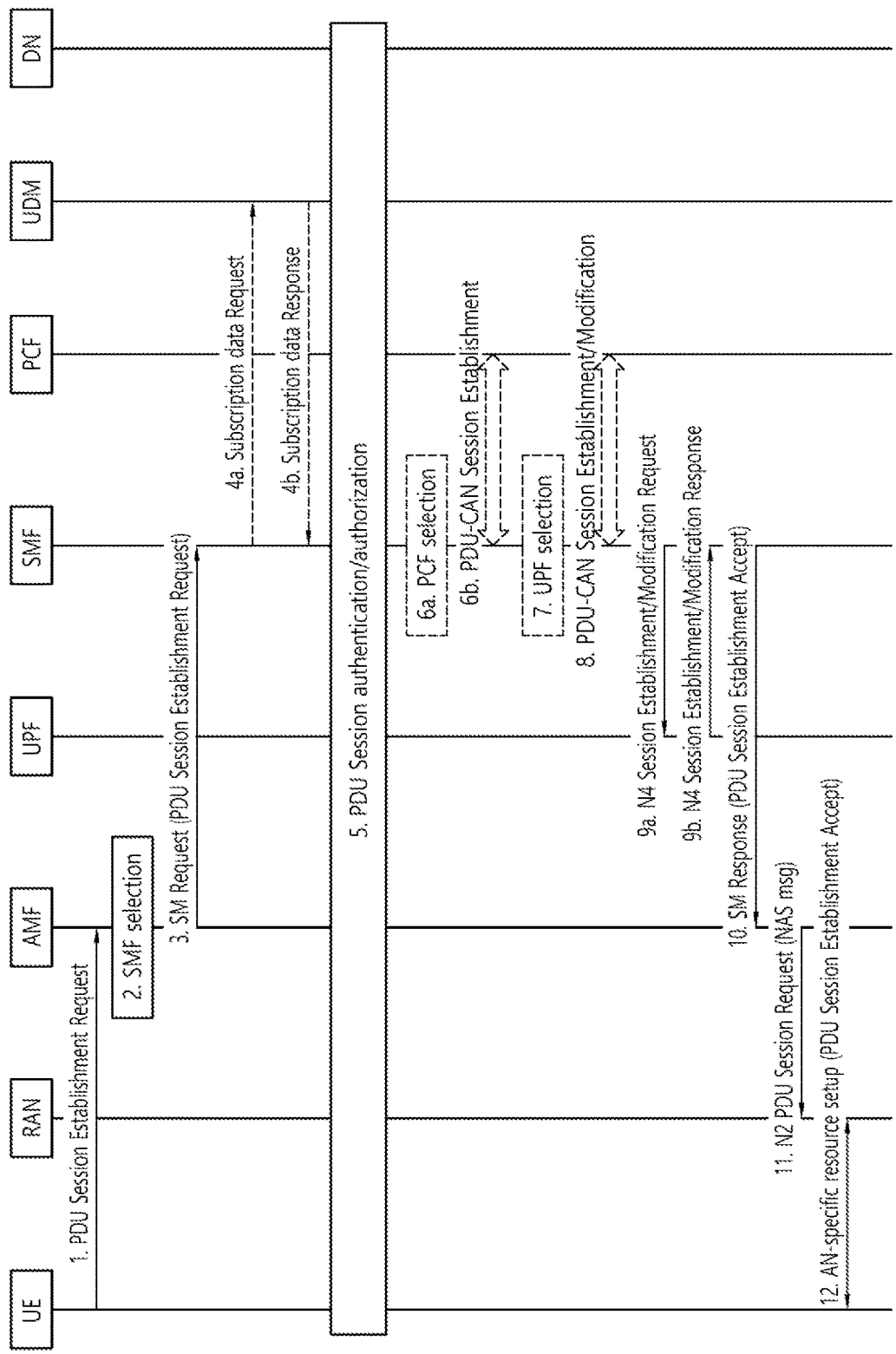

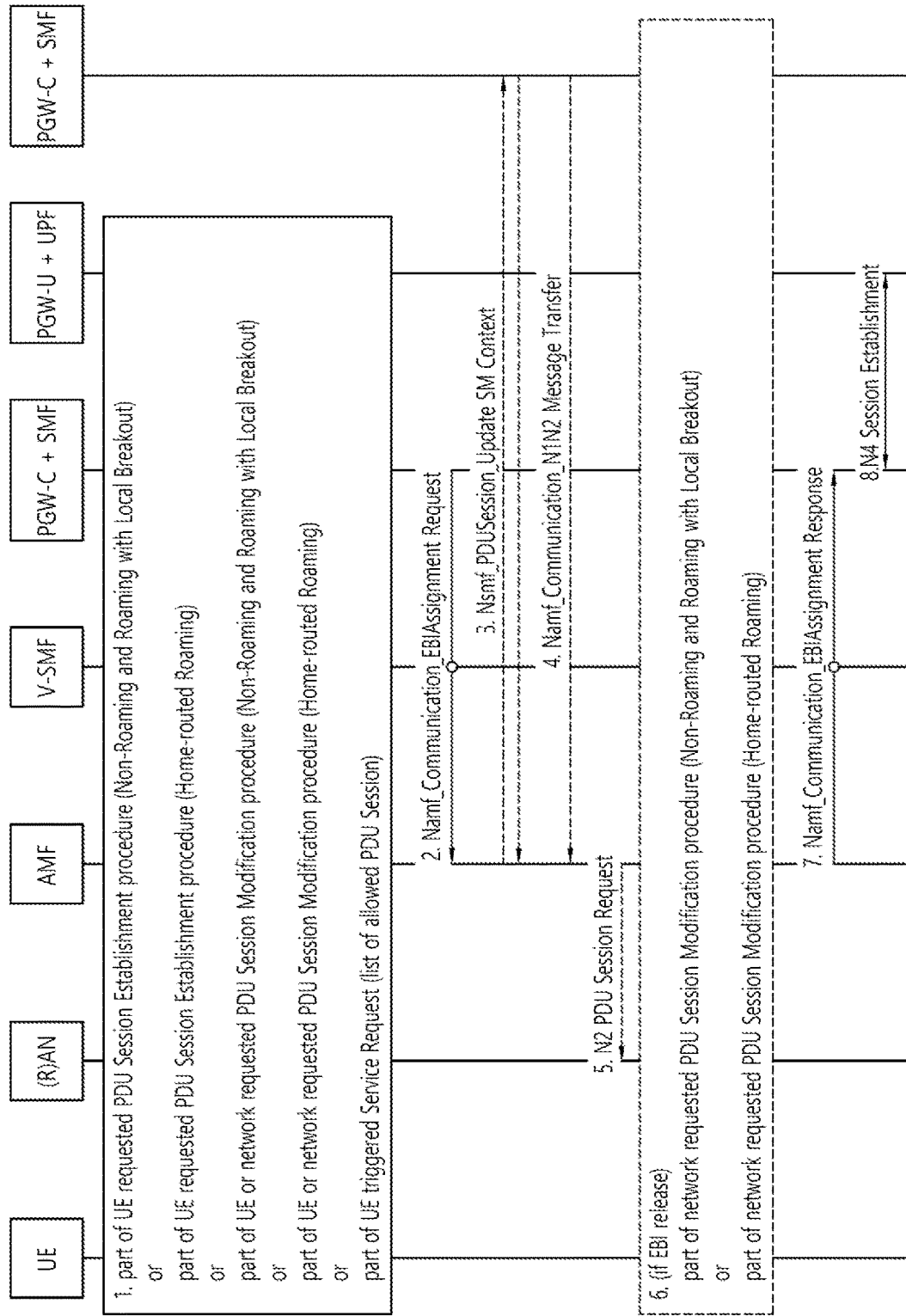

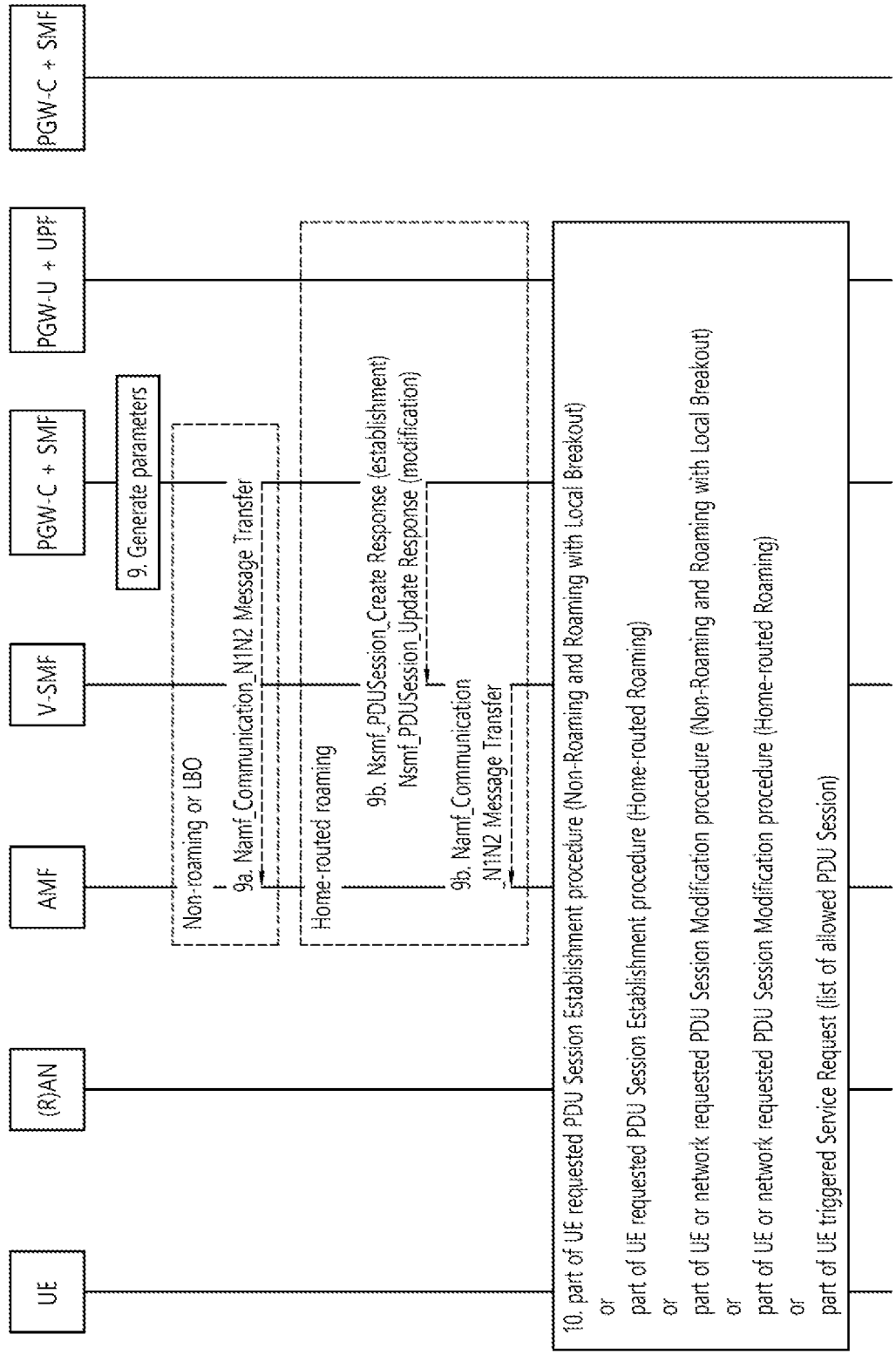

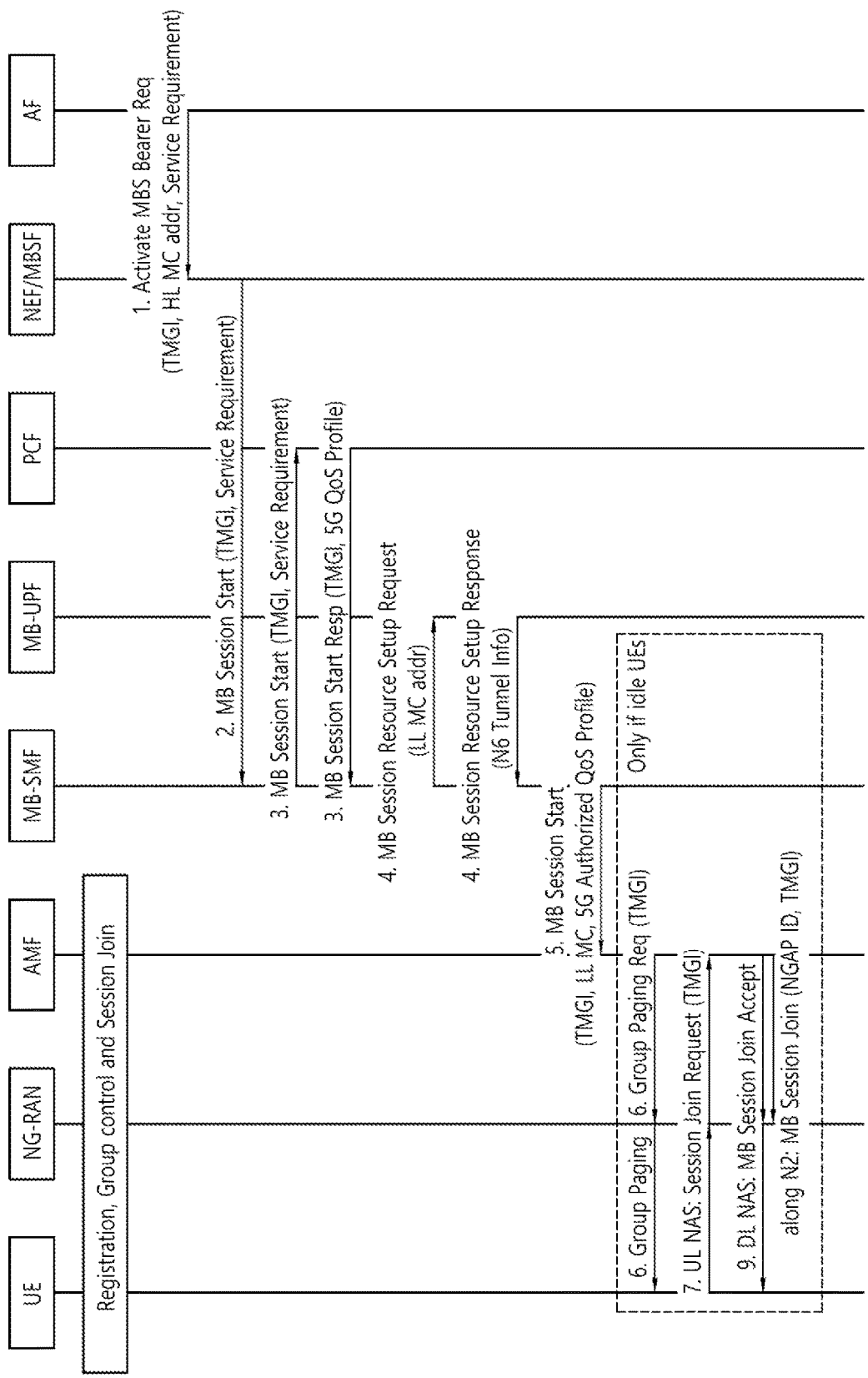

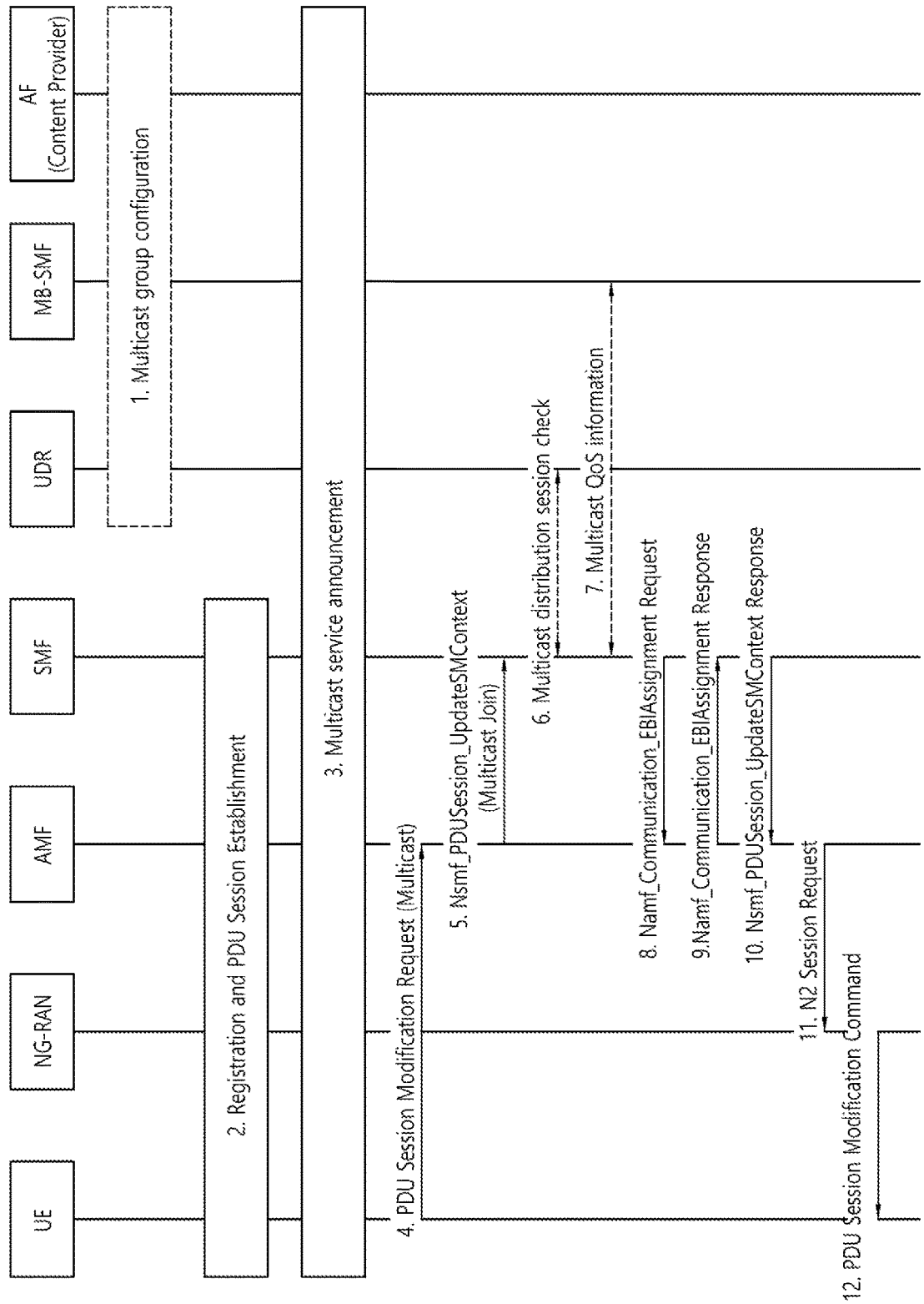

MULTICAST-RELATED COMMUNICATION

CROSS-REFERENCE TO RELATED APPLICATION(S)

This application is the National Stage filing under 35 U.S.C. 371 of International Application No. PCT/KR2021/002612, filed on Mar. 3, 2021, which claims the benefit of earlier filing date and right of priority to Korean Application Nos. 10-2020-0026957, filed on Mar. 4, 2020, 10-2020-0065709, filed on Jun. 1, 2020, and 10-2020-0171534, filed on Dec. 9, 2020, the contents of which are all hereby incorporated by reference herein in their entireties.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Meanwhile, in 5G mobile communication, multicast communication (eg, communication based on Multicast-Broadcast Services (MB S)) has been introduced. A terminal (eg, user equipment (UE)) and a network may perform multicast communication in a 5G system (5GS) in a multicast method. However, when it is difficult to perform multicast communication using the multicast method (eg, when the UE moves from 5GS to Evolved Packet Service (EPS), etc.), a method for effectively performing multicast communication between the UE and the network has not been discussed.

SUMMARY

Accordingly, a disclosure of the present specification has been made in an effort to solve the aforementioned problem.

In order to solve the above problems, one disclosure of the present specification provides a method for SMF to perform multicast-related communication. The method includes: receiving a join request message for requesting participation in multicast communication from the UE; transmitting an allocation request message for requesting EBI allocation for a unicast QoS flow corresponding to the multicast QoS flow related to the multicast communication to the AMF node; and receiving information of EBI allocated for a unicast QoS flow from the AMF node.

In order to solve the above problems, one disclosure of the present specification provides a method for a UE to perform multicast-related communication. The method includes: transmitting a join request message for requesting participation in multicast communication to the SMF node; and receiving information of EBI allocated for a unicast QoS flow corresponding to a multicast QoS flow related to the multicast communication.

In order to solve the above problems, one disclosure of the present specification provides an SMF node that performs multicast-related communication. The SMF node includes at least one processor; and at least one memory that stores instructions and is operably electrically connectable with the at least one processor, wherein the operations performed based on the instructions being executed by the at least one processor include: receiving a join request message for requesting participation in multicast communication from the UE; transmitting an allocation request message for requesting EBI allocation for a unicast QoS flow corresponding to the multicast QoS flow related to the multicast communication to the AMF node; and receiving information of EBI allocated for a unicast QoS flow from the AMF node.

In order to solve the above problems, one disclosure of the present specification provides a UE that performs multicast-related communication. The UE includes at least one processor; and at least one memory that stores instructions and is operably electrically connectable with the at least one processor, wherein the operations performed based on the instructions being executed by the at least one processor include: transmitting a join request message for requesting participation in multicast communication to the SMF node; and receiving information of EBI allocated for a unicast QoS flow corresponding to a multicast QoS flow related to the multicast communication.

In order to solve the above problems, one disclosure of the present specification provides an apparatus in mobile communication. The apparatus includes at least one processor; and at least one memory that stores instructions and is operably electrically connectable with the at least one processor, wherein the instructions are executed based on execution by the at least one processor. The operations include: obtaining a join request message for requesting participation in multicast communication; generating an allocation request message for requesting EBI allocation for a unicast QoS flow corresponding to the multicast QoS flow related to the multicast communication; and obtaining information of EBI allocated for a unicast QoS flow.

In order to solve the above problems, one disclosure of the present specification provides a non-volatile computer-readable storage medium in which instructions are recorded. The instructions, when executed by one or more processors, cause the one or more processors to: obtaining a join request message for requesting participation in multicast communication; generating an allocation request message for requesting EBI allocation for a unicast QoS flow corresponding to the multicast QoS flow related to the multicast communication; and obtaining information of EBI allocated for a unicast QoS flow.

According to the disclosure of the present specification, it is possible to solve the problems of the related art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIGS. 10a and 10b is a signal flowchart illustrating an exemplary PDU session establishment procedure.

FIGS. 13a and 13b show an example of an EBI allocation procedure to which the implementation of the present specification is applied.

FIGS. 15a and 15b show examples of operations of a terminal and a network according to the second disclosure of the present specification.

FIGS. 16a and 16b shows an example of the operation of the terminal and the network according to the fifth disclosure of the present specification.

FIG. 17 shows an example of the operation of the terminal and the network according to the first example of the seventh disclosure of the present specification.

DESCRIPTION OF EXEMPLARY EMBODIMENTS

Figure 1:
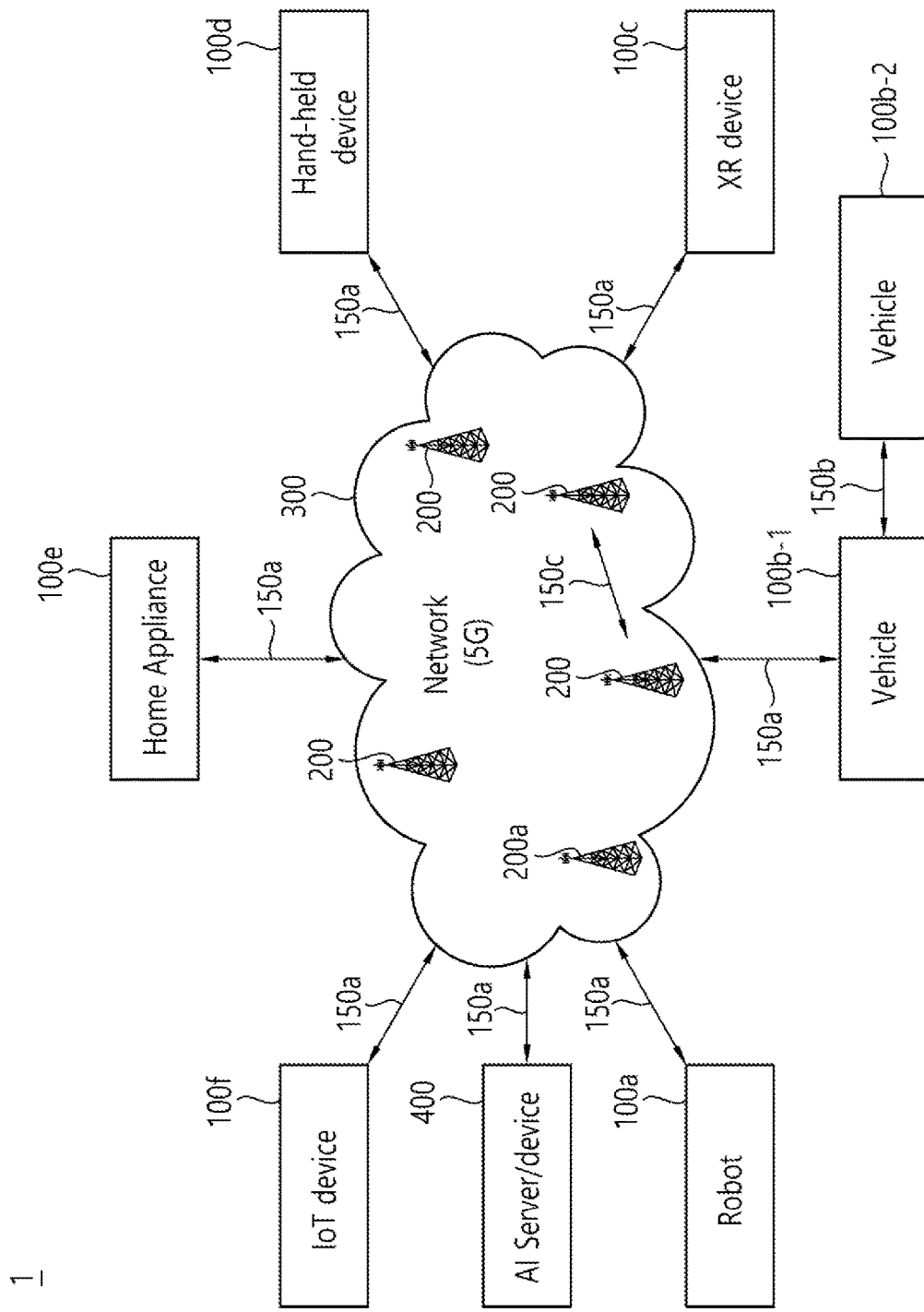
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

I. Techniques and Procedures Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
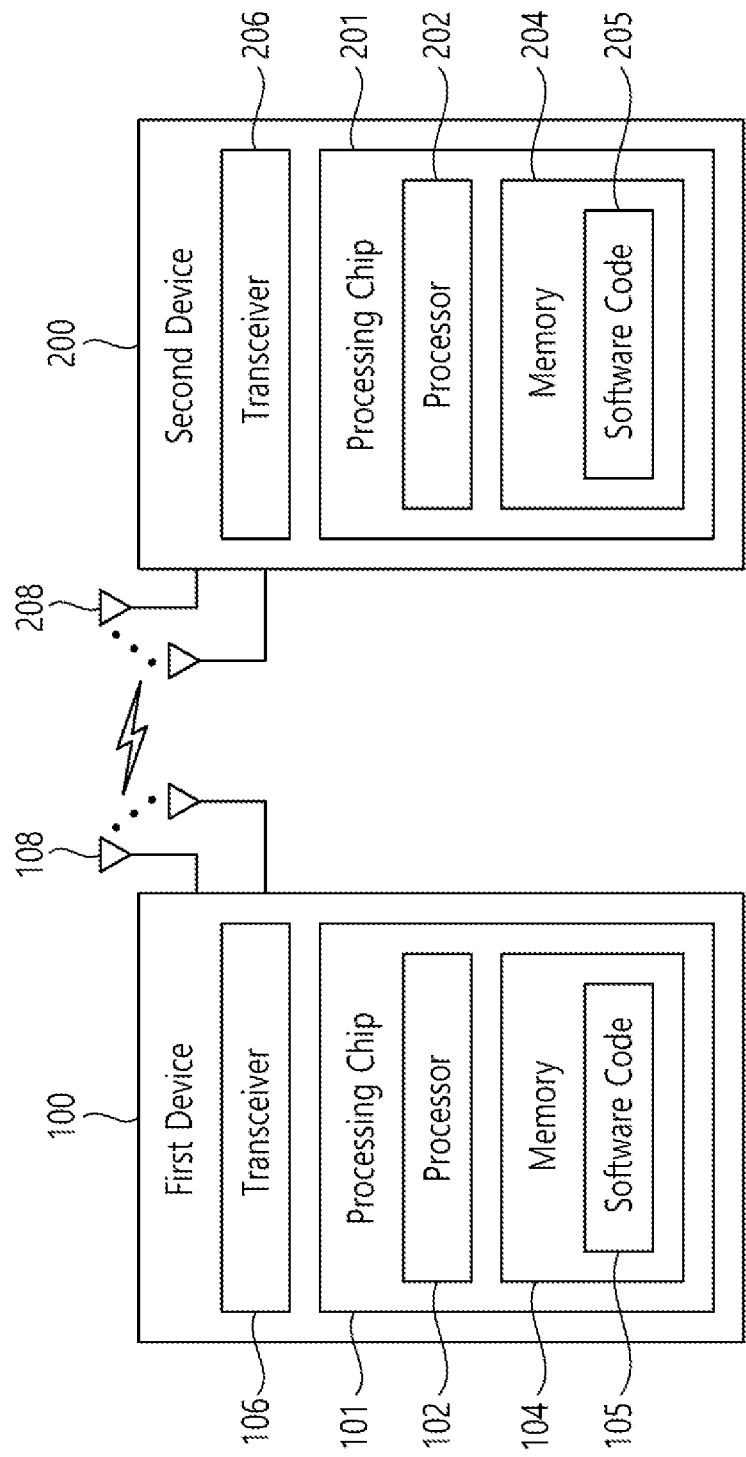
FIG. 2 shows an example of a wireless device to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure.

For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
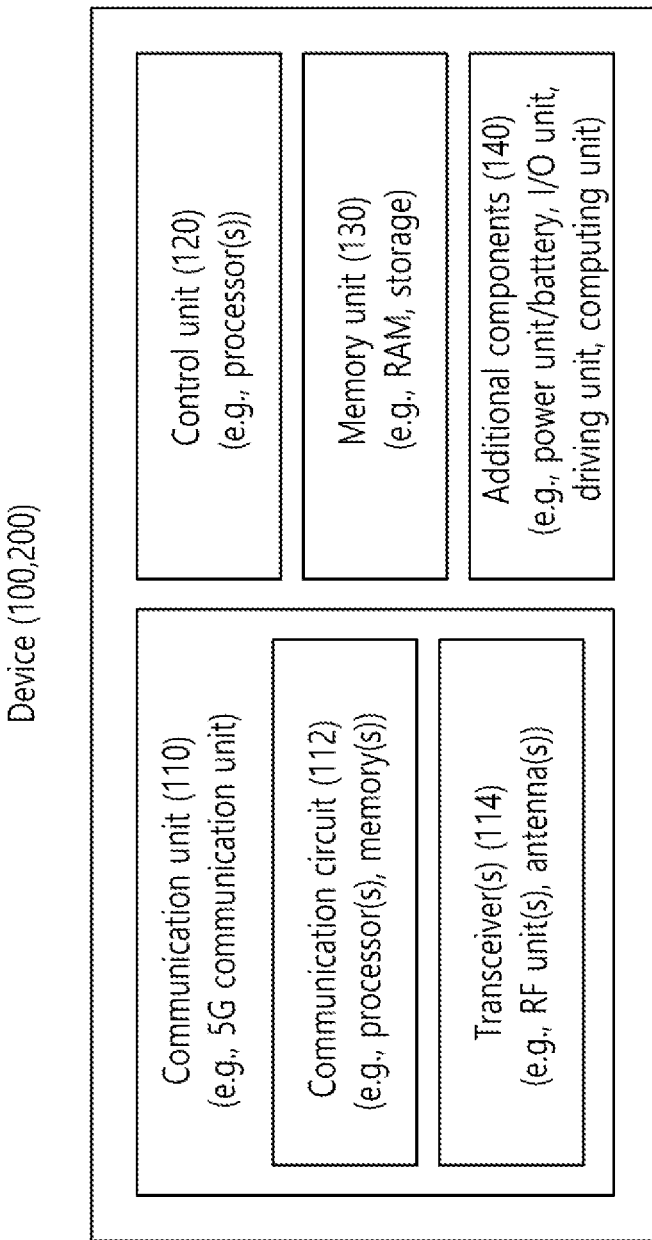
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
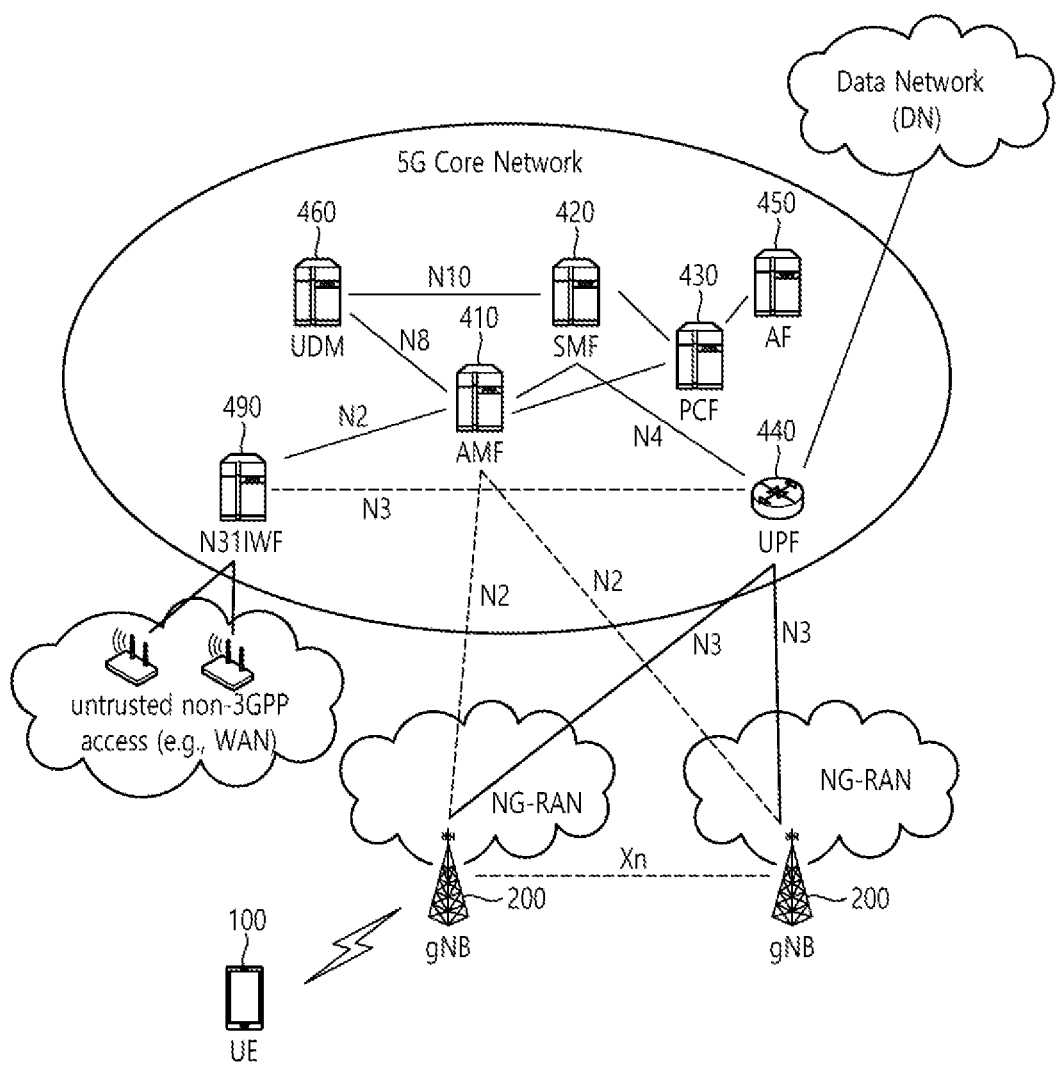
FIG. 4 is a structural diagram of a next-generation mobile communication network.

FIG. 4 is a structural diagram of a next-generation mobile communication network.

5GC (5G Core) may include various components, part of which are shown in FIG. 4, including an access and mobility management function (AMF) 410, a session management function (SMF) 420, a policy control function (PCF) 430, a User Plane Function (UPF) 44, an application function (AF) 450, a unified data management (UDM) data network 460, and a non-3GPP (3rd Generation Partnership Project) inter-working function (N3IWF) 490.

A UE 100 is connected to a data network via the UPF 440 through a Next Generation Radio Access Network (NG-RAN) including the gNB 20.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing Non-Access Stratum (NAS) security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 20 and the SMF 420. In addition, when the UE 100 moves over an area served by the gNB 20, the UPF 440 serves as a mobility anchor point. The UPF 440 may perform a function of handling a PDU. For mobility within the NG-RAN (which is defined after 3GPP Release-15), the UPF 440 may route packets. In addition, the UPF 540 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (100) may be omitted.

The 5$^{th}$ generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

Figure 5:
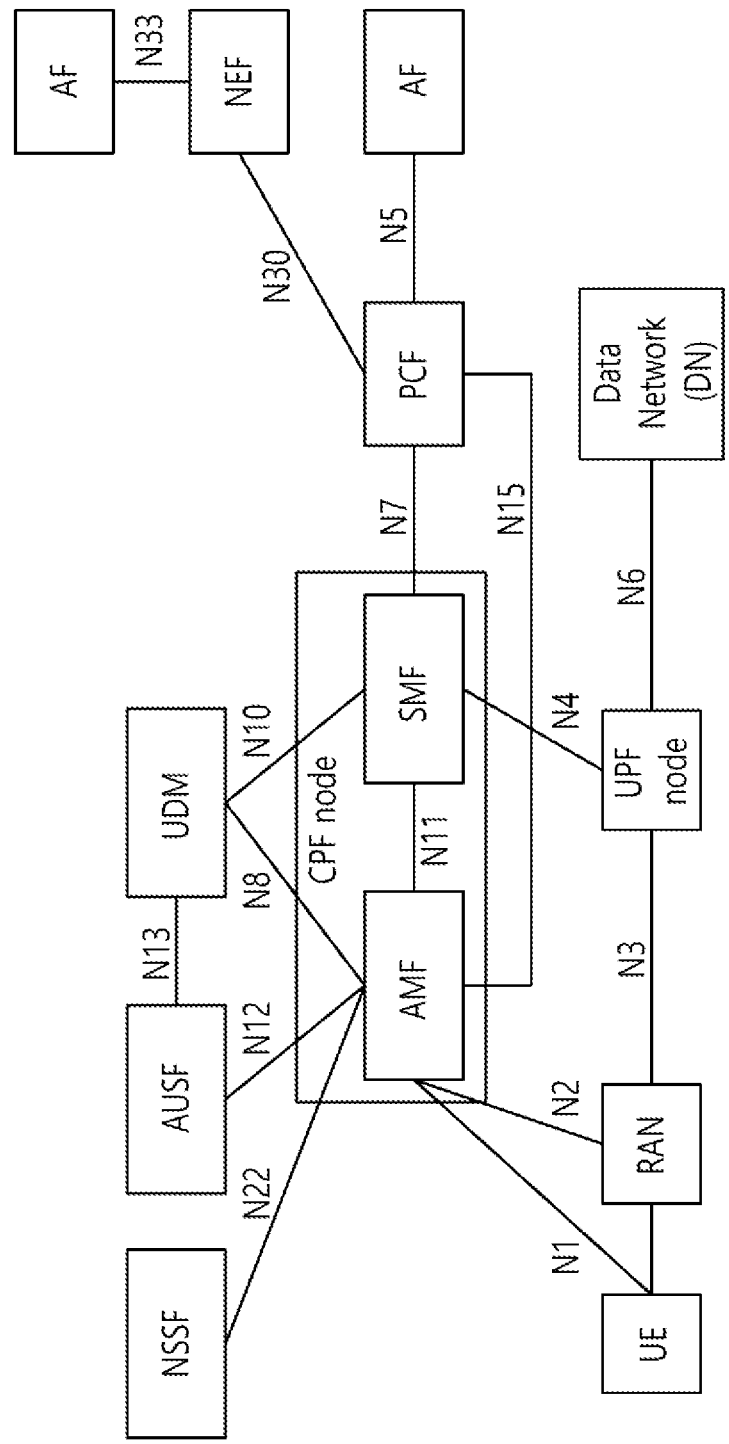
FIG. 5 is an exemplary diagram illustrating a predicted structure of a next generation mobile communication in terms of a node.

FIG. 5 is an exemplary diagram illustrating a predicted structure of a next generation mobile communication in terms of a node.

Referring to FIG. 5, the UE is connected to a data network (DN) through a next generation RAN (Radio Access Network).

The Control Plane Function (CPF) node shown in FIG. 5 may perform all or part of the Mobility Management Entity (MME) function of the fourth generation mobile communication, and all or a part of the control plane function of the Serving Gateway (S-GW) and the PDN (Packet Data Network)-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 5 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 6:
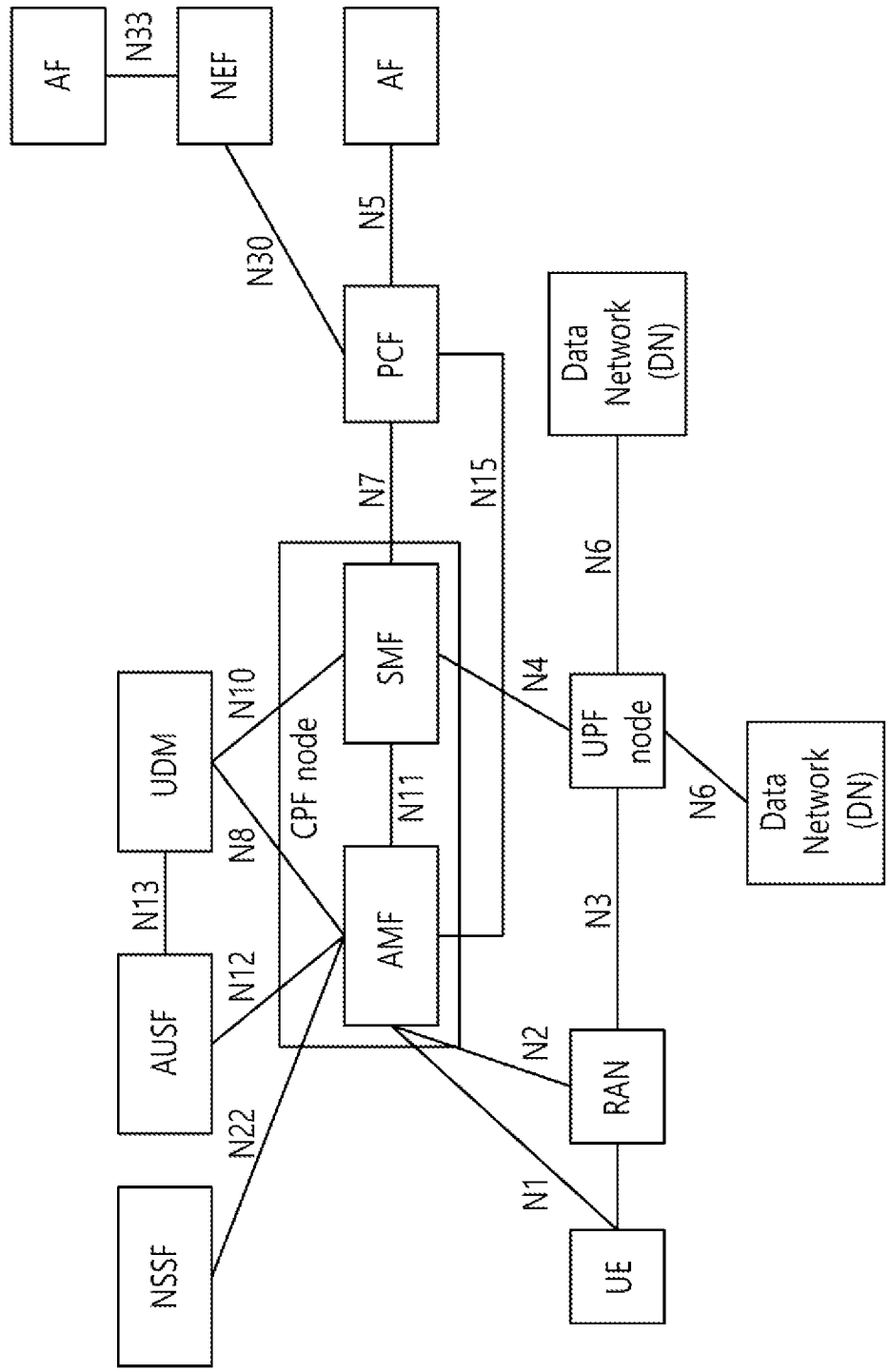
FIG. 6 is an exemplary diagram illustrating an architecture that allows the UE to simultaneously access two data networks using one PDU session.

In FIG. 6, the UE may simultaneously access two data networks using multiple PDU sessions.

FIG. 6 is an exemplary diagram illustrating an architecture that allows the UE to simultaneously access two data networks using one PDU session.

FIG. 6 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 7A:
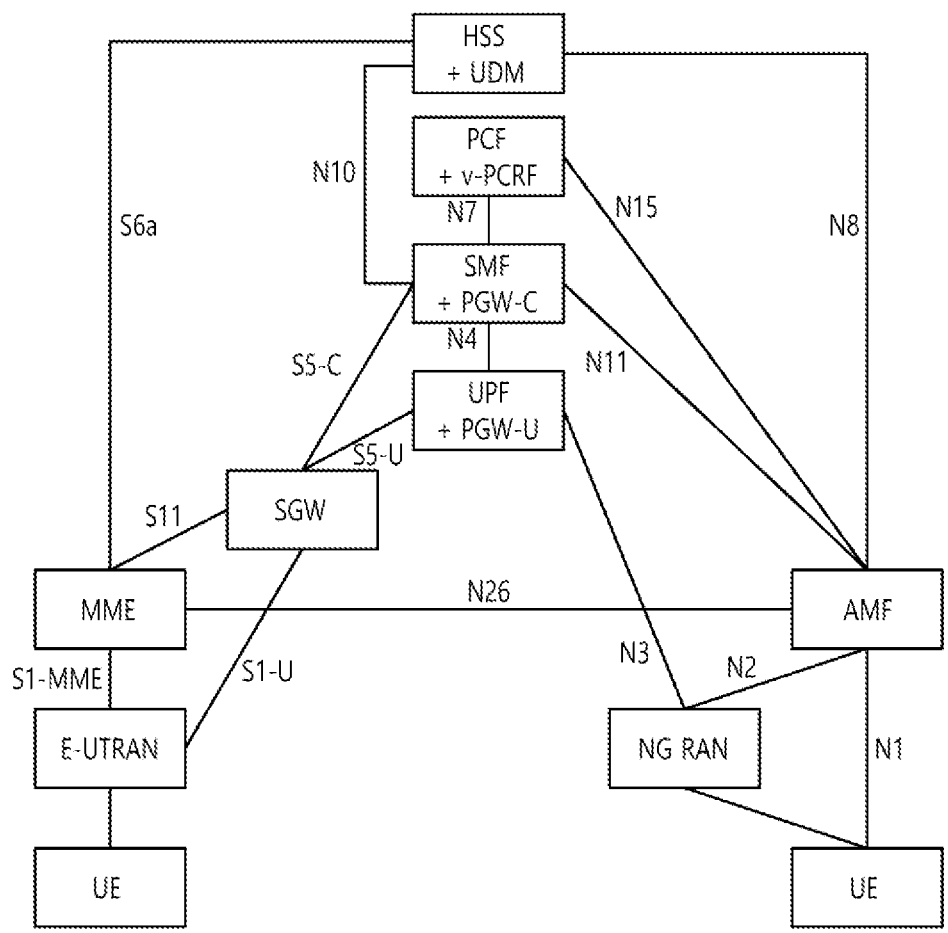
FIG. 7a shows an architecture for interworking when the UE does not roam.
Figure 7B:
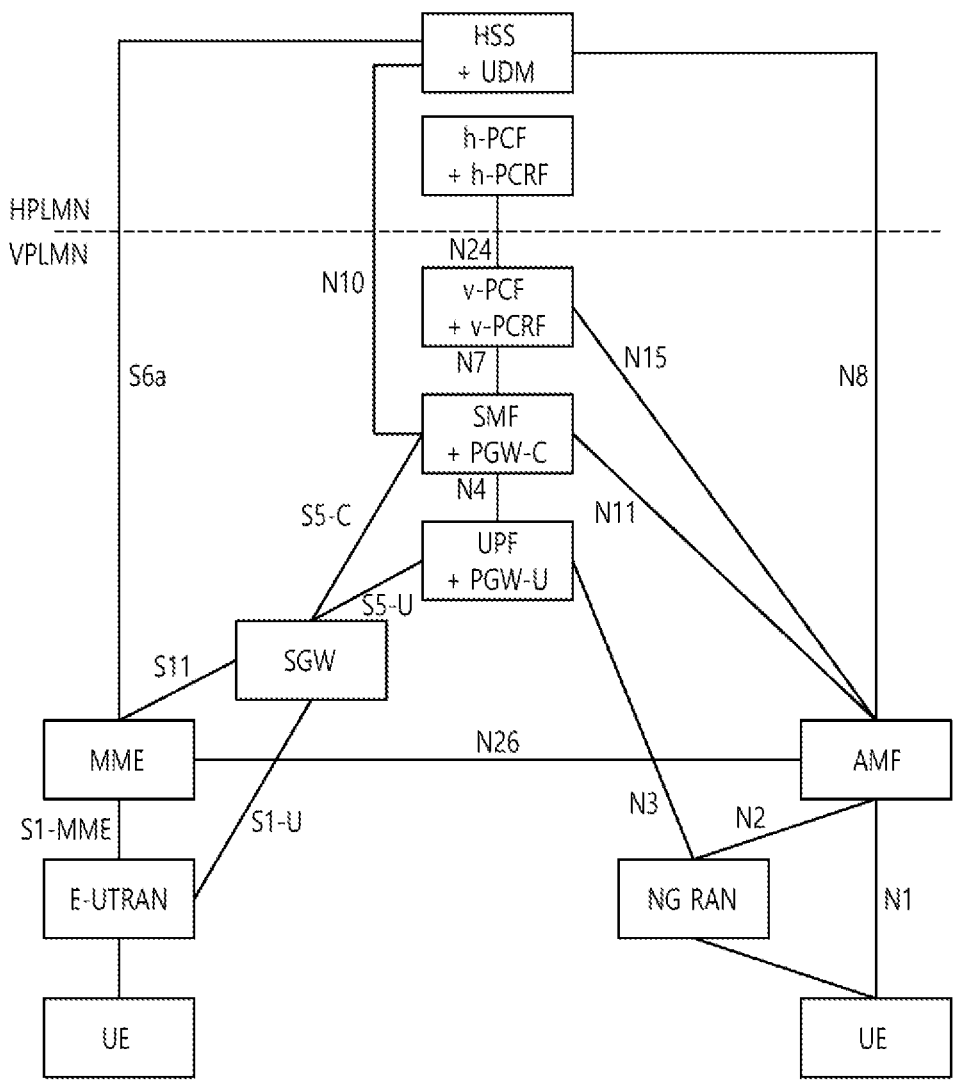
FIG. 7B shows an architecture for interworking when the UE roams.

FIG. 7a shows an architecture for interworking when the UE does not roam, and FIG. 7B shows an architecture for interworking when the UE roams.

Referring to FIG. 7a, when the UE does not roam, the existing E-UTRAN for 4G LTE, the EPC, and the 5G mobile communication network may be interworking with each other. In FIG. 7a, a packet data network gateway (PGW) for the existing EPC is divided into a PGW-U in charge of only the user plane and a PGW-C in charge of the control plane. And, the PGW-U is merged into the UPF node of the 5th generation core network, and the PGW-C is merged with the SMF node of the 5th generation core network. And the PCRF (Policy and Charging Rules Function) for the existing EPC may be merged with the PCF of the 5th generation core network. And the HSS for the existing EPC can be merged into the UDM of the 5th generation core network. The UE may access the core network through E-UTRAN, but the UE may access the core network through 5G radio access network (RAN) and AMF.

Referring to FIGS. 7a and 7b, when the UE roams to a Visited Public Land Mobile Network (VPLMN), data of the UE is transmitted via a Home PLMN (HPLMN).

Meanwhile, the N26 interface shown in FIGS. 7a and 7b is an interface connected between the MME and the AMF in order to facilitate interworking between the EPC and the NG core. Such an N26 interface may be selectively supported depending on the operator. That is, for interworking with the EPC, the network operator may provide the N26 interface or may not provide the N26 interface.

Figure 8:
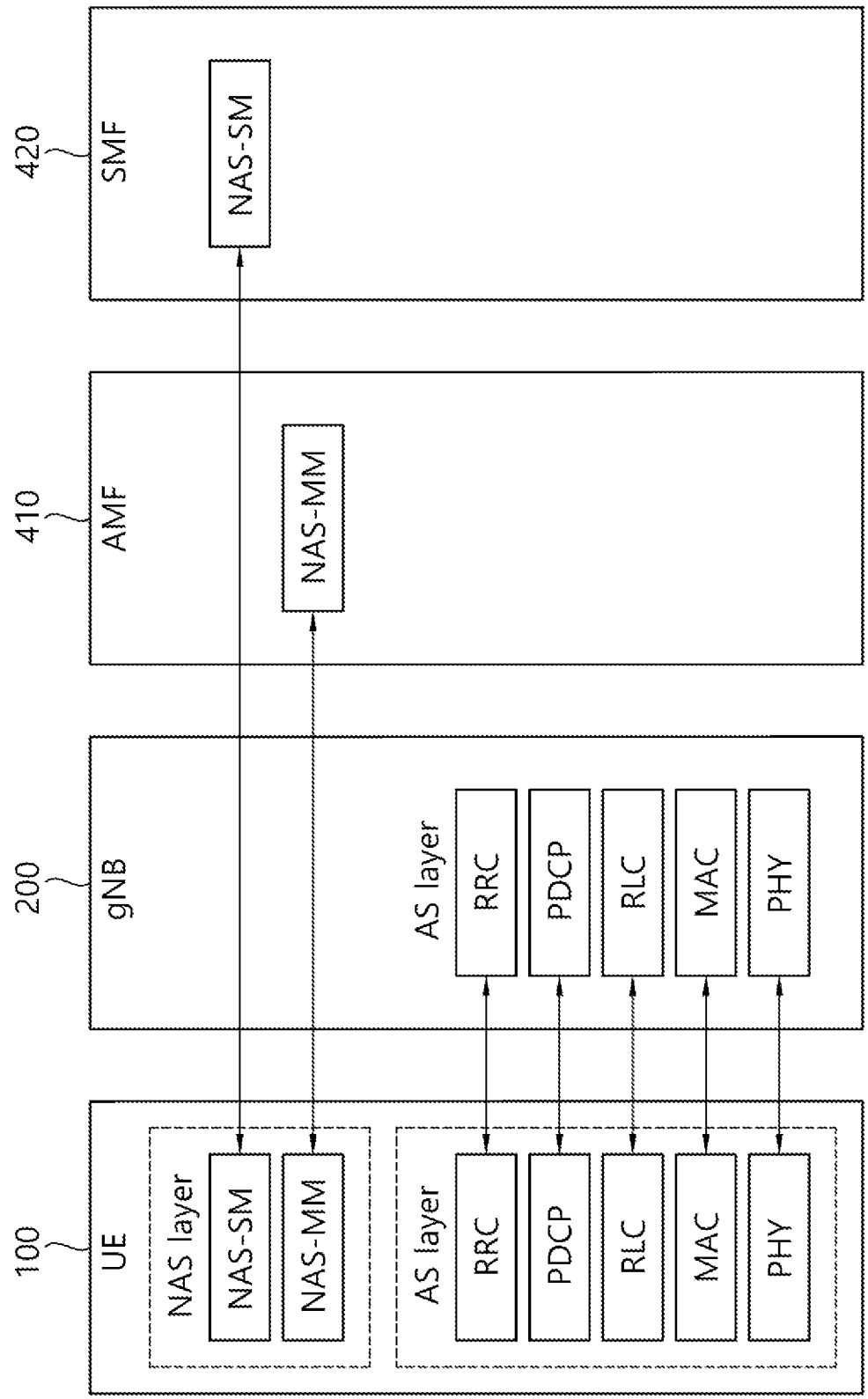
FIG. 8 is another exemplary diagram showing a structure of a radio interface protocol between a UE and a gNB.

FIG. 8 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
NAS procedures related to AMF include the following.
Registration management and access management procedures. AMF supports the following functions.
Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
The NAS entity for the MM creates a NAS-MM message that derives how and where to deliver an SM signaling message through a security header representing the NAS transmission of SM signaling and additional information on a received NAS-MM.

Upon receiving SM signaling, the NAS entity for the SM performs an integrity check of the NAS-MM message, analyzes additional information, and derives a method and place to derive the SM signaling message.

Meanwhile, in FIG. 8, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Registration Procedure>

The UE needs to obtain an authorization to enable mobility tracking and to receive data, and to receive services. For this, the UE must register with the network. The registration procedure is performed when the UE needs to do initial registration with the 5G system. In addition, the registration procedure is performed when the UE performs periodic registration update, when the UE is in an idle mode and moving to a new tracking area (TA), and when the UE needs to perform periodic registration update.

During the initial registration procedure, the ID of the UE may be obtained from the UE. AMF may pass PEI (IM-EISV) to UDM, SMF and PCF.

Figure 9A:
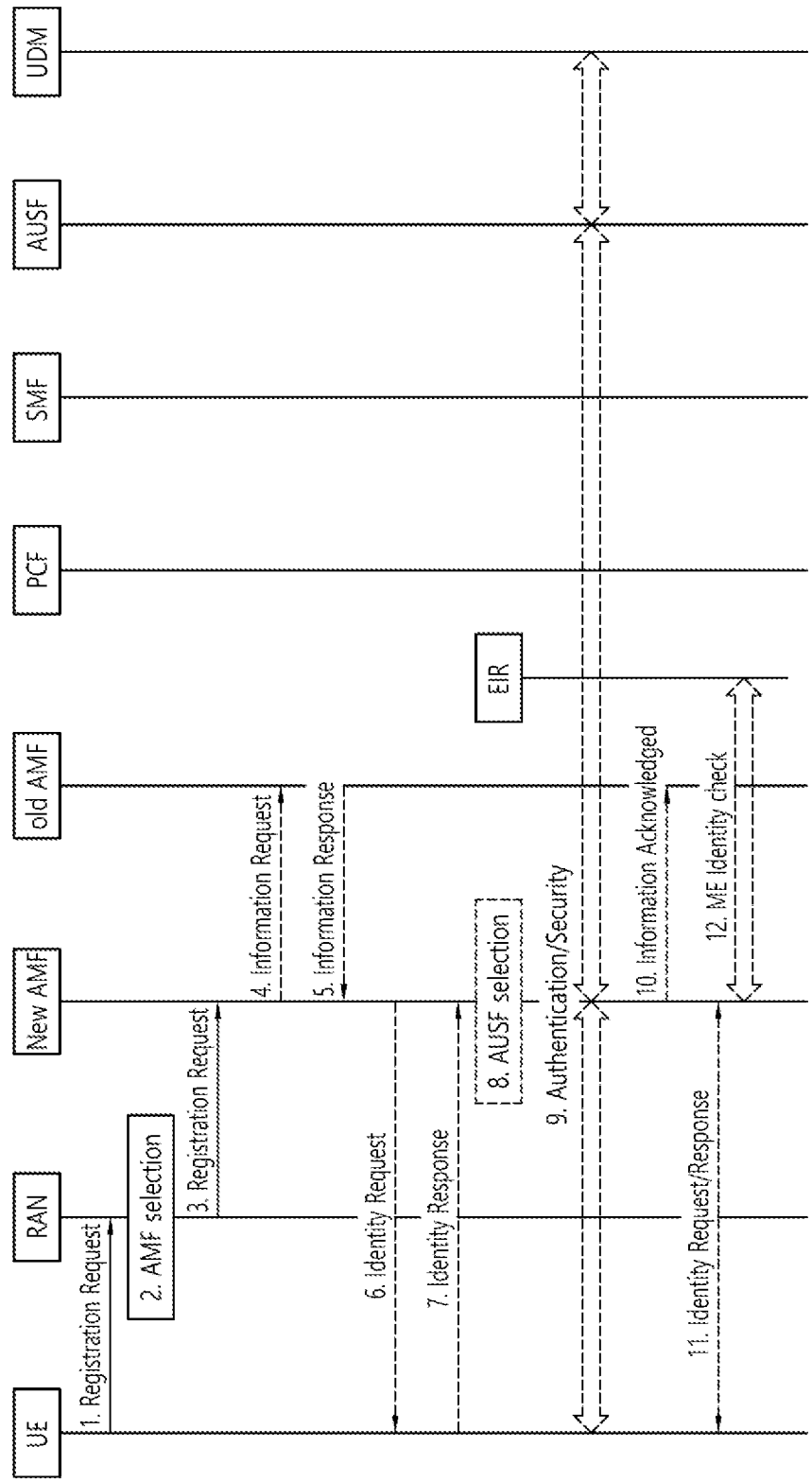
FIGS. 9a and 9b are signal flow charts showing an exemplary registration procedure.
Figure 9B:
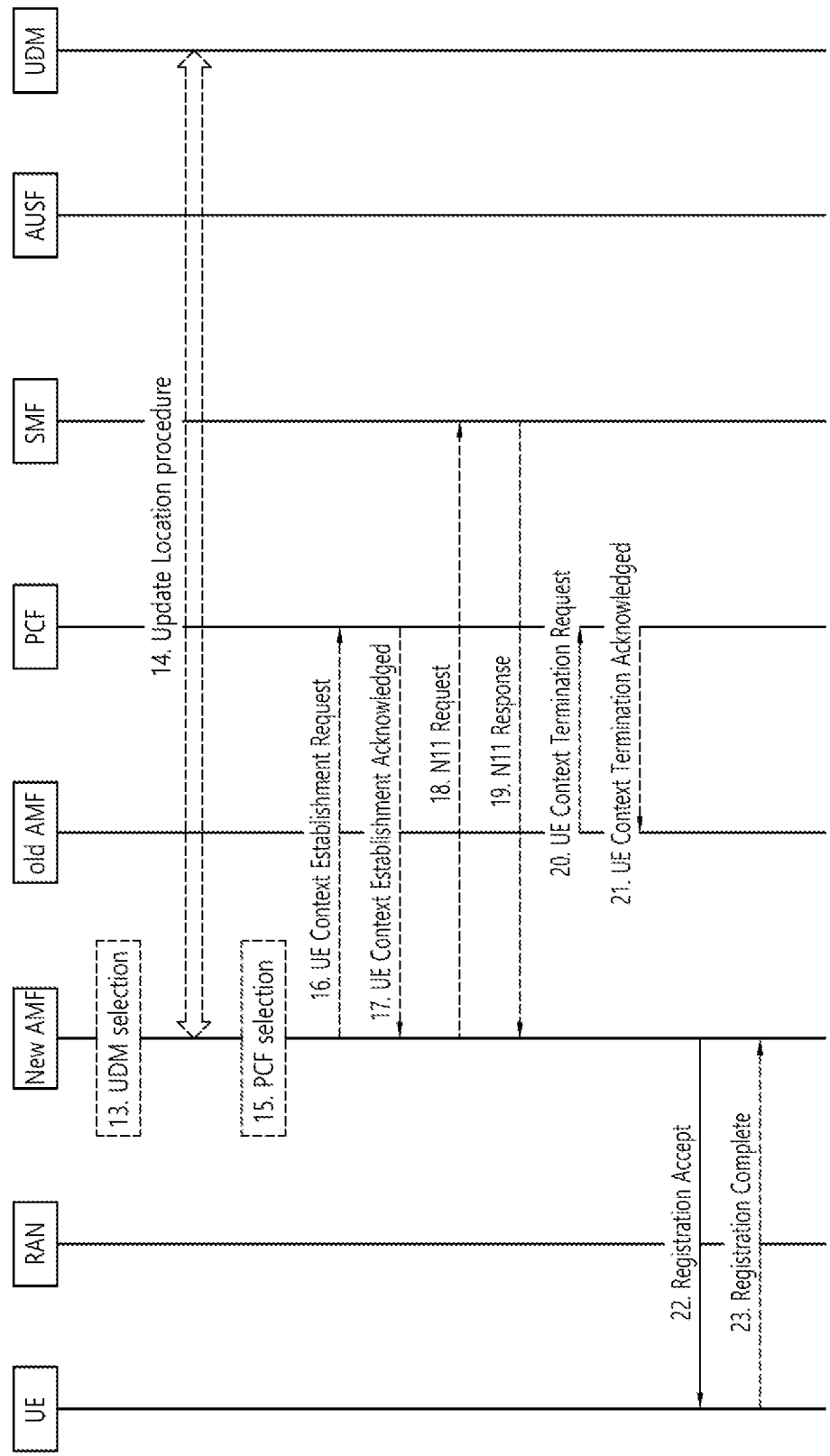

FIGS. 9a and 9b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN (Public Land Mobile Network) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 10B:
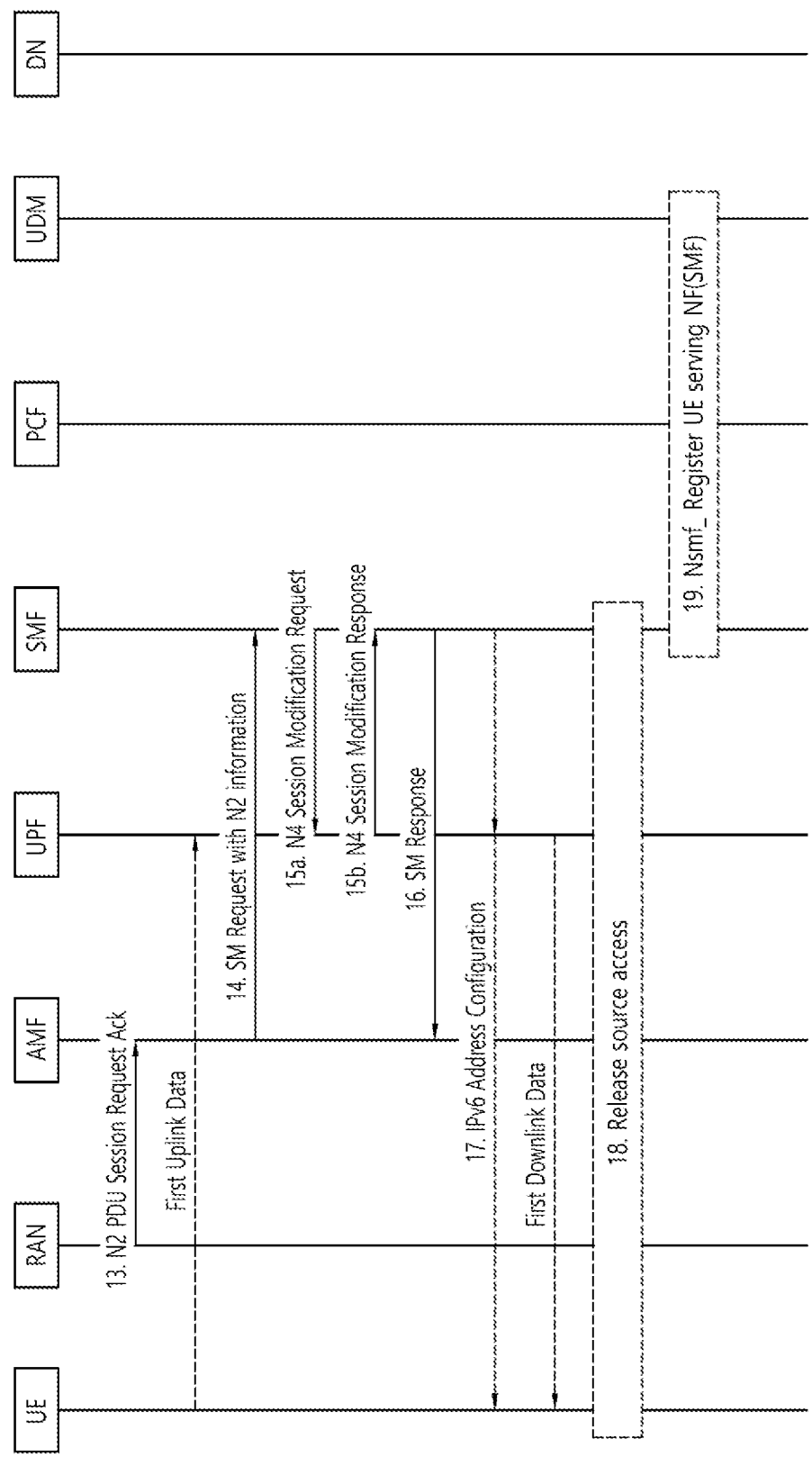

FIGS. 10a and 10b are a signal flowchart illustrating an exemplary PDU session establishment procedure.

The procedure shown in FIGS. 10a and 10b assumes that the UE has already registered on the AMF according to the registration procedure shown in FIGS. 9a and 9b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 9a and 9b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

<PDU Session Modification Procedure>

Figure 11A:
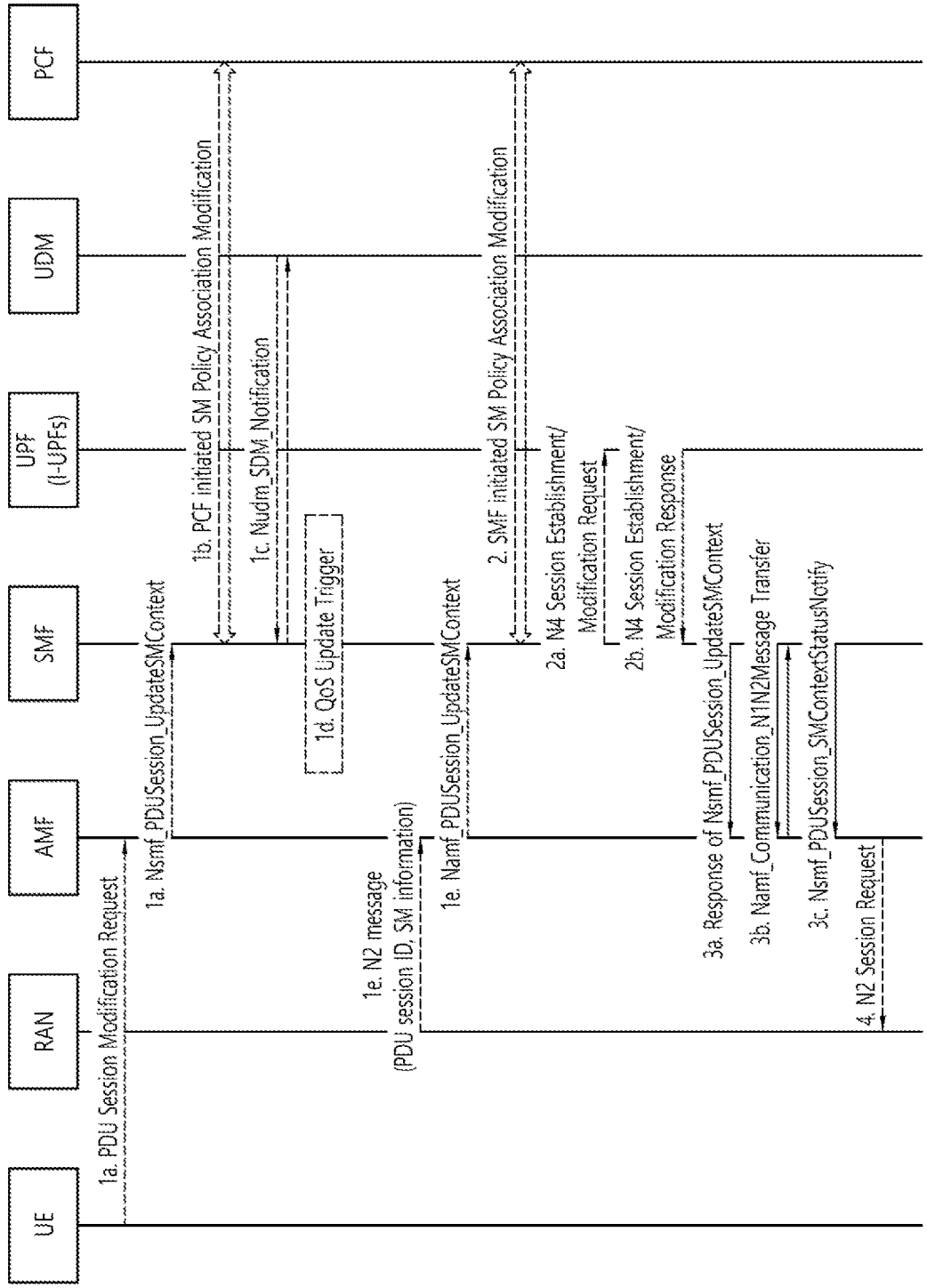
FIGS. 11a and 11b are signal flow diagrams illustrating an exemplary PDU session modification procedure.
Figure 11B:
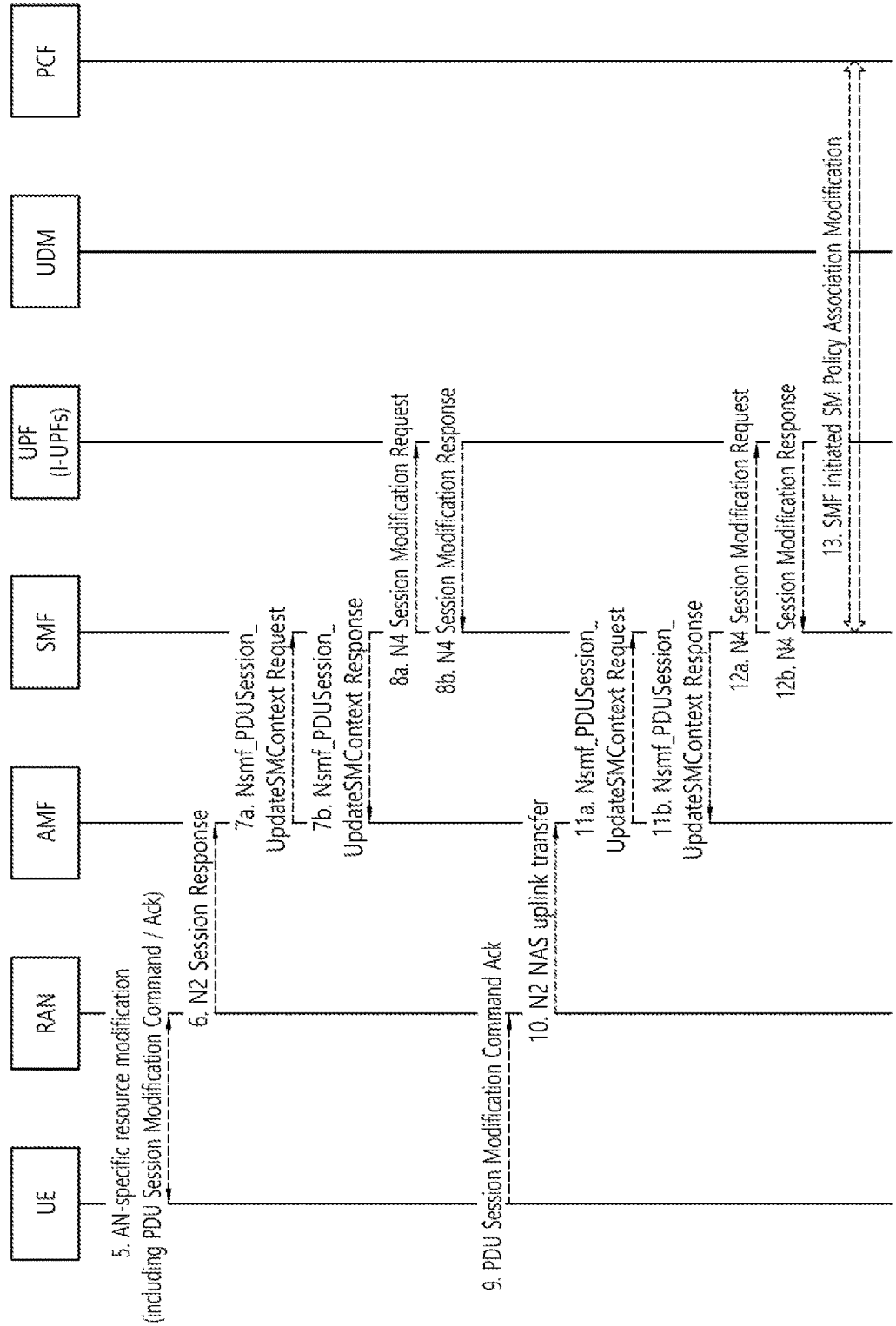

FIGS. 11a and 11b are signal flow diagrams illustrating an exemplary PDU session modification procedure.

The PDU session modification procedure may be used when one or more Quality of Service (QoS) parameters exchanged between the UE and the network are modified.

The signal flow diagram shown in FIGS. 11a and 11b is an example of a PDU session modification procedure, and specifically, a UE or network requested PDU Session Modification procedure (non-roaming case and roaming with local breakout case) is shown as an example.

An example of a PDU session modification procedure may be triggered by the following exemplary events (steps 1a) to 1e)):

1a) (UE-initiated modification) The UE may initiate a PDU session modification procedure by sending a NAS message.

For example, the UE may send a PDU session modification request message. Here, the NAS message may include an N1 SM container, a PDU session ID, and a UE Integrity Protection Maximum Data Rate. N1 SM container may include PDU session modification request (PDU Session ID, Packet Filters, Operation, Requested QoS, Segregation, 5GSM Core Network Capability, Number of Packet Filters, if Always-on PDU Session is requested, Always-on PDU Session Requested).

Depending on the access type, if the UE was in the CM-IDLE state, a service request procedure may be preceded before this SM-NAS message is transmitted. (Depending on the Access Type, if the UE was in CM-IDLE state, this SM-NAS message is preceded by the Service Request procedure.) (R) AN is delivered to the AMF along with the indication of the user location information (User location Information).

The AMF may invoke the SM context associated with the PDU session update. For example, AMF may call Nsmf_PDUSession_UpdateSMContext. Nsmf_PDUSession_UpdateSMContext may include an SM context ID and an N1 SM container (including a PDU session modification request).

When the UE requests a specific QoS handling for the selected Service Data Flow (SDF), the PDU session establishment request may include a packet filter describing the SDF, the requested packet filter operation (add, modify or delete) for the indicated packet filter, and the requested QoS. The PDU session establishment request may optionally include a Segregation indication. When the UE requests the network to bind the applicable SDF to a distinct and dedicated QoS Flow (eg, even if an existing QoS flow can support the requested QoS), segregation indication may be included in the PDU session establishment request. The network must comply with the UE's request, but the network may bind the selected SDF for the existing QoS flow instead of the UE's request.

Note 1: Only one QoS flow can be used for traffic segregation. When the UE makes a subsequent request for segregation of the additional SDF, the additional SDF is multiplexed in the existing QoS flow used for segregation.

If the UE is outside the availability area of the LADN (Local Area Data Network), the UE does not trigger a PDU session modification procedure for the PDU session corresponding to the LADN.

For a PDU session established in EPS, when the UE first moves from EPS to 5GS, when the UE wants to change the PDU session to an always-on PDU session, the UE may include an indication that an Always-on PDU session is requested in the PDU session modification request message.

1b) (Modification requested by PCF) The PCF may perform a PCF initiated SM Policy Association Modification procedure to notify the SMF of the modification of the policy. The PCF-initiated SM policy association modification procedure may be triggered, for example, by a policy decision or may be triggered when an application function (AF) requests.

1c) (Modification requested by SMF) The UDM may use Subscriber Data Management (SDM) notifications to update the subscription data of the SMF. For example, the SDM notification may be Nudm_SDM_Notification (including Subscription Permanent Identifier (SUPI) and Session Management Subscription Data). The SMF may acknowledge by updating the session management subscription data and returning SUPI and Ack.

1d) (Modification requested by SMF) The SMF may decide to modify the PDU session. Step 1d) may also be triggered from a locally configured policy or (R)AN. Step 1d) may also be triggered when the SMF marks that the UP (User Plane) connection is active and the status of one or more QoS flows has been deleted in 5GC but not synchronized with the UE.

When the SMF receives one of the triggers of steps 1b) to 1d), the SMF may initiate a PDU session modification procedure requested by the SMF.

1e) (AN-initiated modification) Regardless of whether a notification control is set or not, when an AN resource to which a QoS flow is mapped is released, (R)AN must indicate to the SMF. (R) AN may transmit an N2 message (including PDU session ID and N2 SM information) to the AMF. The N2 SM information may include a QoS flow ID (QFI), user location information, and an indication that a QoS flow has been released.

The AMF may call the SM context request associated with the update of the PDU session. For example, the AMF may invoke Nsmf_PDUSession_UpdateSMContext (including SM context ID and N2 SM information).

(AN Initiated Notification Control) When notification control is set for a GBR flow, if (R)AN determines that the QoS target of the QoS flow cannot be met or that the QoS target of the QoS flow can be met again, respectively, (R)AN may transmit an N2 message (including PDU session ID and N2 SM information) to the SMF. The N2 SM information may include an indication that the QoS target of the QFI and QoS flow cannot be met or an indication that the QoS target of the QoS flow may be met again, respectively. The AMF may call the SM context request associated with the update of the PDU session. For example, the AMF may invoke Nsmf_PDUSession_UpdateSMContext (including SM context ID and N2 SM information). When the PCF subscribed to the event, the SMF may report this event to the PCF for each PCC rule for which notification control is set (see step 2). Alternatively, if the dynamic PCC does not apply to this DNN and depends on a locally set policy, the SMF may initiate the PDU session modification procedure requested by the SMF as in the example of step 3b).

2) The SMF may report some subscribed events to the PCF by performing the SMF initiation SM policy association modification procedure. Step 2) may be omitted when the PDU session modification procedure is triggered by step 1b or 1d. If the dynamic PCC is not deployed (deployed), the SMF may apply a local policy to determine whether to change the QoS profile.

Steps 3) to 7) may not be invoked when only an operation (eg gating) in UPF is required for PDU session modification.

3a) For UE-initiated modification or AN-initiated modification, SMF may respond to AMF via PDU session update SM context. For example, the PDU session update SM context may be Nsmf_PDUSession_UpdateSMContext. Nsmf_PDUSession_UpdateSMContext may include N2 SM information (PDU session ID, QFI, QoS profile, session-Aggregate Maximum Bit Rate (AMBR)), and N1 SM container (including PDU Session Modification Command). PDU session modification command may include PDU session ID, QoS rule, QoS rule operation, QoS flow level QoS parameters if necessary for QoS related to QoS rule, Session-AMBR, Always-on PDU Session Requested if Always-on PDU Session is requested.

When PDU session modification has been requested by the UE, in order to modify the PDU session always-on PDU session, the SMF may include an Always-on PDU Session Granted indication in the PDU session modification command. The Always-on PDU session grant indication may be included to indicate whether the PDU session is changed to an Always-on PDU session or not.

The N2 SM information may carry information to be provided by the AMF to the (R)AN. To notify the (R)AN that one or more QoS flows have been added or modified, the N2 SM information may include a QoS profile and a corresponding QFI. The N2 SM information may include only the QFI to notify the (R)AN that one or more QoS flows have been removed. If the PDU session modification is triggered by the (R)AN release of step 1e), the SM information may carry the acknowledgment of the (R)AN release. When the UE requests a PDU session modification for a PDU session without an established user plane resource, the N2 SM information provided to (R)AN may include information for establishing a user plane resource.

The N1 SM container carries the PDU session modification command that the AMF should provide to the UE. In order to notify the UE that one or more QoS rules have been added, removed, or modified, the N1 SM container may include QoS rules, QoS rules and QoS related QoS rules operations, if necessary, QoS flow level QoS parameters and QoS flow level QoS parameter operation.

3b) For the modification requested by the SMF, the SMF may invoke Namf_Communication_N1N2MessageTransfer. Namf_Communication_N1N2MessageTransfer may include N2 SM information (PDU session ID, QFI(s), QoS Profile(s), session-AMBR), and N1 SM container (including PDU session modification command). The PDU session modification command may include PDU session ID, QoS rules, QoS rules and QoS flow-level QoS parameters if necessary for QoS related to QoS rules operation and QoS rules, session-AMBR.

When the UE is in the CM-IDLE state and Asynchronous Type Communication (ATC) is activated, the AMF may update and store the UE context based on Namf_Communication_N1N2MessageTransfer, and steps 4) to 7) may be omitted. For reference, when the ATC mode is activated, paging is not performed for the UE in the IDLE state. When the UE is reachable (eg, when the UE enters the CM-CONNECTED state), the AMF may forward an N1 message to synchronize the UE and the UE context.

4) AMF may transmit an N2 PDU session request message to (R)AN. The N2 PDU session request may include N2 SM information received from the SMF, a NAS message (including a PDU session ID, and an N1 SM container (including a PDU session modification command)).

5) (R)AN may issue an AN specific signaling exchange with the UE related to information received from the SMF. For example, in the case of NG-RAN, RRC Connection Reconfiguration may occur when the UE modifies necessary (R)AN resources related to the PDU session.

(R)AN may acknowledge the N2 PDU session request by sending an N2 PDU session Ack message to the AMF. The N2 PDU session Ack message may include N2 SM information (list of accepted/rejected QFIs, AN tunnel information, PDU session ID, Secondary RAT using data) and user location information. In the case of Dual Connectivity, when one or more QFIs are added to a PDU session, the master RAN node transmits one or more QFIs of these QFIs to the NG-RAN node (the NG-RAN that was not previously involved in the PDU session) node) can be assigned. In this case, the AN tunnel information may include a new N3 tunnel endpoint for the QFI allocated to the new NG-RAN node. Accordingly, when one or more QFIs are removed from the PDU session, the (R)AN node is no longer involved in the PDU session, and the corresponding tunnel endpoint is removed from the AN tunnel information. If the QFI cannot meet the user plane security enhancement information for the corresponding QoS profile (eg, due to the UE Integrity Protection Maximum Data Rate being exceeded), the NG-RAN may reject the QFI.

When the PLMN sets a second RAT usage reporting, the NG-RAN node may provide a RAN usage data report.

7) AMF may deliver N2 SM information and user location information received from AN to SMF through Nsmf_PDUSession_UpdateSMContext service operation. The SMF may reply to the AMF with an Nsmf_PDUSession_UpdateSMContext response. The N2 SM information may include second RAT usage data.

When (R)AN rejects the QFI, the SMF is responsible for updating the QoS flow level QoS parameters if necessary for the QoS rules at the UE and the QoS flows associated with the QoS rules.

8) The SMF may update the N4 session of the UPF related to the PDU session modification by sending the N4 session modification request message to the UPF (refer to Note 3).

When a new QoS flow is generated, the SMF may update the UPF with UL Packet Detection Rules of the new QoS flow.

Note 2: UL packets with QFI of new QoS flow may be delivered via update.

9) The UE may acknowledge the PDU session modification command by sending a NAS message. The NAS message may include a PDU session ID and an N1 SM container (including PDU session modification command Ack).

10) (R)AN may forward NAS message to AMF.

11) AMF may transmit N1 SM container (including PDU session modification command Ack) and user location information received from AN to SMF through Nsmf_PDUSession_UpdateSMContext service operation.

The SMF may reply using the Nsmf_PDUSession_UpdateSMContext response.

If the SMF-initiated PDU session modification procedure is to delete QoS flows that do not contain QoS flows associated with the default QoS rules (eg, when triggered by PCF), and the SMF does not receive a response from the UE, the SMF marks the state of these QoS flows to be synchronized with the UE.

12) The SMF may update the N4 session of the UPF that is not related to the modification of the PDU session by sending the N4 session modification request message (including the N4 session ID) to the UPF. For a PDU session of the Ethernet PDU session type, the SMF may notify the UPF to add or remove an Ethernet Packet Filter Set and a forwarding rule(s).

Note 3: UPFs affected by the PDU session modification procedure depend on the modified QoS parameters and deployment. For example, when the session AMBR of a PDU session having a UL CL (Uplink Classifier) is changed, only the UL CL may be related. This note can also be applied to step 8).

13) When the SMF interacts with the PCF in step 1b) or 2), the SMF may perform the SMF-initiated SM policy association modification procedure to notify the PCF whether the PCC decision is enforced or cannot be enforced.

The SMF may notify any entity subscribed to the user location information related to the PDU session change.

When step 1b) is triggered to perform an application function effect on traffic routing, the SMF may re-establish the user plane of the PDU session.

<Interworking Procedure Based on N26>

The N26 interface may be used to provide seamless session continuity to single registration mode UEs.

Interworking between EPS and 5GS may be supported by assuming Session and service continuity (SSC) mode 1 as IP address preservation.

If the UE is served by 5GC, during the PDU session establishment procedure and Guaranteed Bit Rate (GBR) Quality of Service (QoS) flow establishment procedure, PGW-C+SMF performs EPS QoS mapping from 5G QoS parameters obtained from PCF, and when Policy and Charging Control (PCC) is deployed, PGW-C+SMF may assign a Traffic Flow Template (TFT) with the PCC rule obtained from the PCF. Here, PGW-C+SMF may be a network function in which PGW-C and SMF are co-located for interworking between 5GS and EPS. For reference, in the disclosure of the present specification, PGW-C+SMF will be used interchangeably with SMF. For example, in the disclosure of the present specification, the SMF may perform an operation performed by the PGW-C+SMF. Otherwise EPS QoS mapping and TFT assignment can be mapped locally by PGW-C+SMF. PGW-C+SMF may ignore 5G QoS parameters that are not applicable to EPC (eg, QoS notification (notification control)). When a TFT is allocated to a downlink unidirectional EPS bearer mapped from a downlink-only QoS flow, the PGW-C+SMF may allocate a TFT packet filter that does not effectively allow useful uplink packets. When the SMF determines that an EPS bearer ID should be assigned to a QoS flow, the serving AMF may allocate an EPS bearer ID (EBI) according to the SMF's request. For each PDU session, an EPS bearer ID may be assigned to a default EPS bearer and a dedicated bearer. The SMF may determine a QoS flow requiring EBI based on the QoS profile and operator policy.

NOTE 1: Based on operator policies, an SMF can map all non-GBR QoS flows to default EPS bearer in which case it requests only one EBI for all the non-GBR QoS flows. Alternatively, an SMF can also map one non-GBR QoS flow to one dedicated EPS bearer in which case it requests a dedicated EBI for non-GBR QoS flow that should be mapped to dedicated EPS bearer. In between these two extreme cases, the SMF can also map more than one (but not all) non-GBR QoS Flow to the same EPS bearer (either default EPS bearer or dedicated EPS bearer).

When a new QoS Flow needs to be mapped to an EPS Bearer ID that has already been assigned for an existing QoS Flow, the SMF includes the already assigned EPS Bearer ID in the QoS Flow description sent to the UE.

For Ethernet and Unstructured PDU Session Types, only EPS Bearer ID for the default EPS Bearer is allocated. The EPS Bearer IDs for these EPS bearers are provided to the SMF+PGW-C by the AMF, and are provided to the UE and NG-RAN by the SMF+PGW-C using N1 SM NAS message and N2 SM message. The UE is also provided with the mapped QoS parameters. The UE and the SMF+PGW-C store the association between the QoS Flow and the corresponding EBI and the EPS QoS parameters. When the QoS Flow is deleted (e.g. when the QoS Flow is deleted due to PDU Session status synchronization or PDU Session Modification), the UE and the SMF+PGW-C delete any possibly existing EPS QoS parameters associated with the deleted QoS Flow.

For PDU Sessions with UP integrity protection of UP Security Enforcement Information set to Required, the SMF does not allocate any EBI or mapped QoS parameters.

When the UE is served by the EPC, during PDN connection establishment, the UE allocates the PDU Session ID and sends it to the SMF+PGW-C via PCO. During PDN Connection establishment and dedicated bearer establishment, SMF+PGW-C performs EPS QoS mappings, from the 5G QoS parameters obtained from the PCF, and allocates TFT with the PCC rules obtained from the PCF if PCC is deployed. Otherwise, EPS QoS mappings and TFT allocation are mapped by the SMF+PGW-C locally. Other 5G QoS parameters corresponding to the PDN connection, (e.g. Session AMBR, and QoS rules and QoS Flow level QoS parameters if needed for the QoS Flow(s) associated with the QoS rule(s)), are sent to UE in PCO. The UE and the SMF+PGW-C store the association between the EPS Context and the PDU Session Context to use it in the case of handover from EPS to 5GS. During the EPS bearer establishment/modification procedure, QoS rules corresponding to the related EPS bearers are allocated and sent to UE in PCO. The 5G QoS parameters are stored in the UE and are to be used when the UE is handed over from EPS to the 5GS. The 5G QoS parameters may be provided to SMF+PGW-C by the PCF, if PCC is deployed. On mobility from EPS to 5GS, the UE sets the SSC mode of the mapped PDU Session to SSC mode 1. The UE and the SMF+PGW-C store the association between the EPS bearer and the corresponding 5G QoS Rules and QoS Flow level QoS parameters if needed for the QoS Flow(s) associated with the QoS rule(s). When the EPS bearer is deleted (e.g. deleted due to EPS bearer status synchronization or bearer deactivation), the UE and the SMF+PGW-C delete any possibly existing 5G QoS Rule(s) and QoS Flow level QoS parameters if any for the QoS Flow(s) associated with the QoS rule(s) associated with the deleted EPS bearer.

In the roaming case, if the VPLMN supports interworking with N26, the UE shall operate in Single Registration mode.

During the 5GS-EPS handover, indirect forwarding may apply for the downlink data forwarding performed as part of the handover. From its configuration data the AMF knows whether indirect forwarding applies and it requests to allocate downlink data forwarding paths on UPFs for indirect forwarding. From its configuration data the MME knows whether indirect forwarding applies and it requests to allocate downlink data forwarding paths on Serving GW (Gateway)s for indirect forwarding. It is configured on AMF and MME whether indirect downlink data forwarding does not apply, applies always or applies only for inter PLMN inter RAT handovers.

During the 5GS-EPS handover, direct forwarding may apply for the downlink data forwarding performed as part of the handover. From its configuration data the source RAN node knows whether direct forwarding applies and indicates to source CN the direct data forwarding is available.

During 5GS-EPS handover, on the target side, the CN informs the target RAN node whether data forwarding is possible or not.

During interworking from EPS to 5GS, as the SMF+PGW-C may have different IP addresses when being accessed over S5/S8 and N11/N16 respectively, the AMF shall discover the SMF instance by an NF/NF service discovery procedure using the FQDN for the S5/S8 interface received from the MME as a query parameter.

This is required for both non-roaming and roaming with local breakout, as well as for home routed roaming.

NOTE 2: As the AMF is not aware of the S-NSSAI assigned for the PDN Connection, the NF/NF service discovery used to find the SMF instance can use PLMN level NRF.

During interworking from 5GS to EPS, as a PDU Session may be released while the UE is served by EPS, if Small Data Rate Control is used, the SMF+PGW-C obtains the Small Data Rate Control Status from the PGW-U+UPF in the N4 Session Modification procedure or from the SCEF+NEF. The PGW-U+UPF passes the Small Data Rate Control Status in the PDU Session Context Response to the AMF, for the AMF to store. The time to store the Small Data Rate Control Statuses is implementation specific. If the UE and PGW-U+UPF/SCEF+NEF have stored Access Point Name (APN) Rate Control parameters and optionally APN Rate Control Status they are only applied when the UE is served by EPS.

During interworking from EPS to 5GS the UE and PGW-U+UPF/SCEF+NEF store the APN Rate Control parameters and APN Rate Control Status while the UE is served by 5GS, so they can be used if the UE moves back to EPS.

Hereinafter, an example of a handover procedure will be described. For example, an example of a 5GS to EPS handover procedure using an N26 interface will be described below with reference to FIGS. 12a and 12b.

Figure 12A:
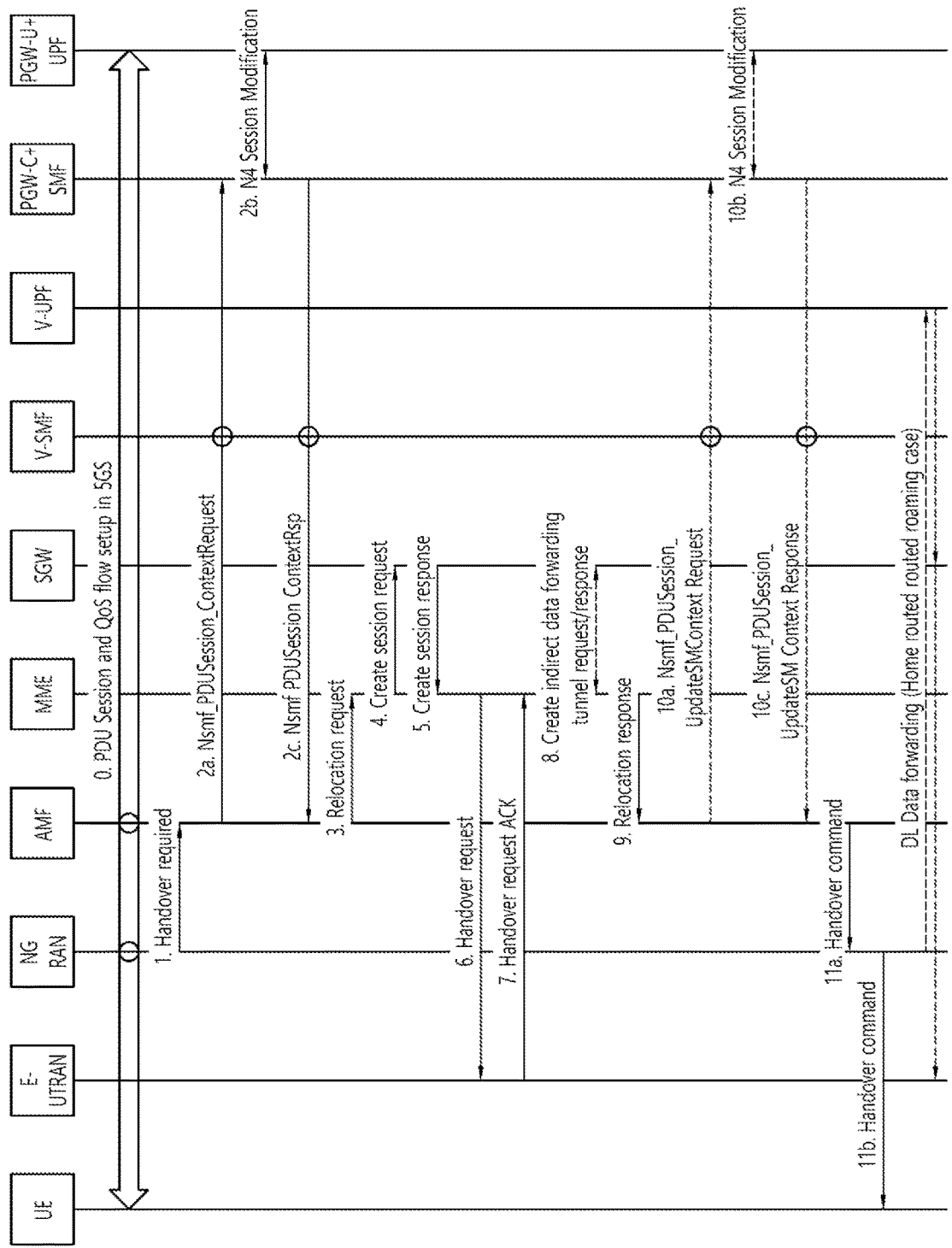
FIGS. 12a and 12b shows an example of a handover procedure from 5GS to EPS to which the implementation of the present specification is applied.
Figure 12B:
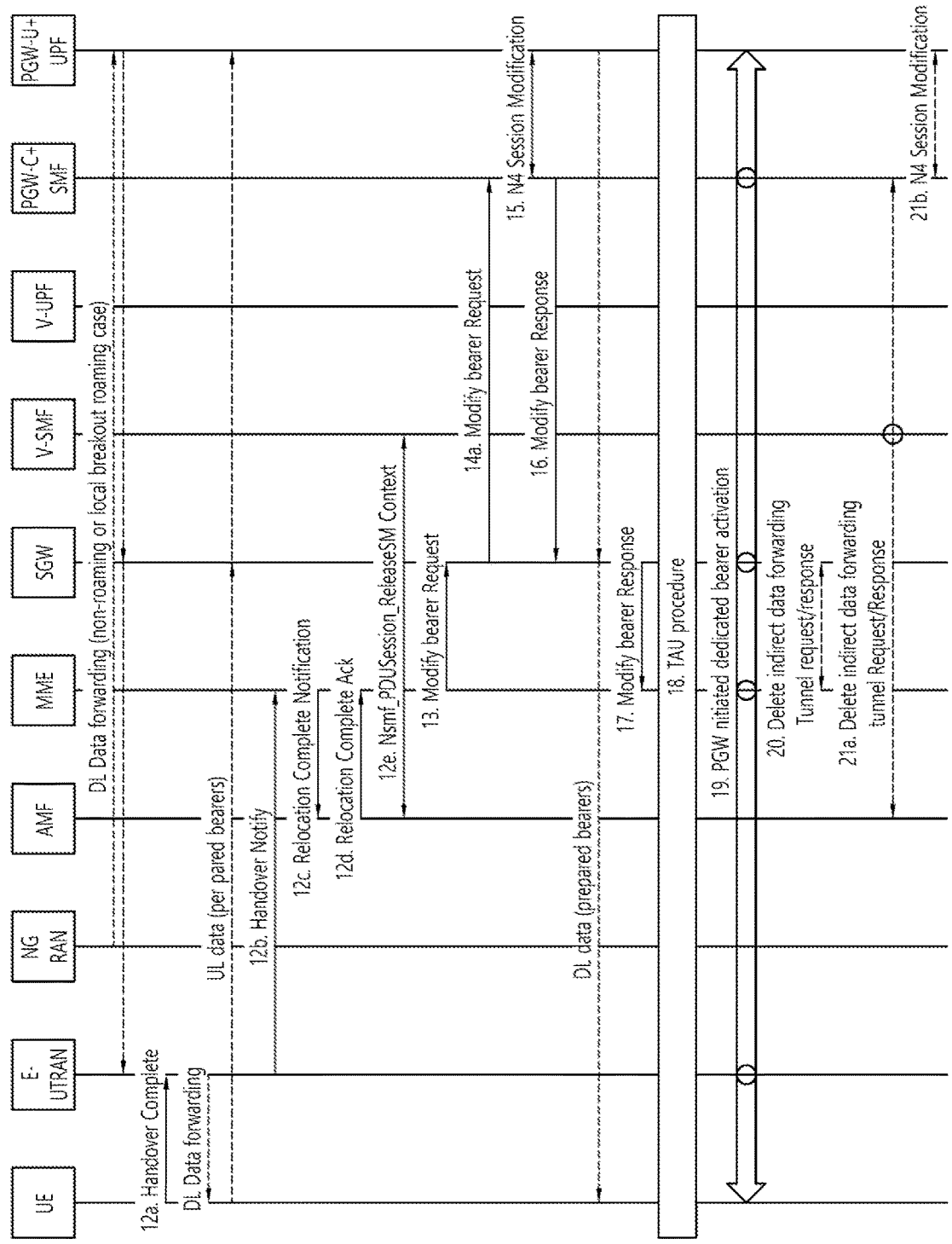

The example of FIGS. 12a and 12b shows an example of a handover procedure from 5GS to EPS when the N26 interface is supported.

FIGS. 12a and 12b shows an example of a handover procedure from 5GS to EPS to which the implementation of the present specification is applied.

The example of FIGS. 12a and 12b shows an example of a 5GS to EPS handover procedure for single-registration mode with N26 interface.

In the case of handover to a shared EPS network, the source NG-RAN may determine a PLMN to be used in the target network. The source NG-RAN shall indicate the selected PLMN ID to be used in the target network to the AMF as part of the Tracking Area Identity (TAI) sent in the HandOver (HO) Required message.

In the case of handover from a shared NG-RAN, the AMF may provide the MME with an indication that the 5GS PLMN is a preferred PLMN at later change of the UE to a 5GS shared networks.

During the handover procedure, the source AMF shall reject any SMF+PGW-C initiated N2 request received since handover procedure started and shall include an indication that the request has been temporarily rejected due to handover procedure in progress.

Steps 1) to 16) in a procedure shown in FIGS. 12a and 12b, includes a handover to EPC and setup of default EPS bearer and dedicated bearers for QoS Flows that have EBI assigned, in EPC and re-activation, if required, of dedicated EPS bearers for non-GBR QoS Flows that have no EBI assigned, in step 19. This procedure can be triggered, for example, due to new radio conditions, load balancing or in the presence of QoS Flow for normal voice or IMS emergency voice, the source NG-RAN node may trigger handover to EPC.

For Ethernet and Unstructured PDU Session Types, the PDN Type Ethernet and non-IP respectively are used, when supported, in EPS.

When EPS supports PDN Type non-IP but not PDN type Ethernet, PDN type non-IP is used also for Ethernet PDU sessions. The SMF shall also set the PDN Type of the EPS Bearer Context to non-IP in this case. After the handover to EPS, the PDN Connection will have PDN Type non-IP, but it shall be locally associated in UE and SMF to PDU Session Type Ethernet or Unstructured respectively.

In the roaming home routed case, the SMF+PGW-C always provides the EPS Bearer ID and the mapped QoS parameters to UE. The V-SMF caches the EPS Bearer ID and the mapped QoS parameters obtained from H-SMF for this PDU session. This also applies in the case that the HPLMN operates the interworking procedure without N26.

NOTE 1: The IP address preservation cannot be supported, if SMF+PGW-C in the HPLMN doesn't provide the mapped QoS parameters.

0) In 5GS, a PDU session may be established and a QoS flow may be set up.

1) NG-RAN decides that the UE should be handed over to the E-UTRAN. If NG-RAN is configured to perform Inter RAT mobility due to IMS voice fallback triggered by QoS flow setup and request to setup QoS flow for IMS voice was received. In this case, NG-RAN responds indicating rejection of the QoS flow establishment because of mobility due to fallback for IMS voice via N2 SM information and triggers handover to E-UTRAN. The NG-RAN sends a Handover Required (including Target eNB ID, Direct Forwarding Path Availability, Source to Target Transparent Container, inter system handover indication) message to the AMF. NG-RAN may indicate bearers corresponding to the 5G QoS Flows for data forwarding in Source to Target Transparent Container.

Direct Forwarding Path Availability indicates whether direct forwarding is available from the NG-RAN to the E-UTRAN. This indication from NG-RAN can be based on e.g. the presence of IP connectivity and security association (s) between the NG-RAN and the E-UTRAN.

If the handover is triggered due to Emergency fallback, the NG-RAN may forward the Emergency indication to the target eNB in the Source to Target Transparent Container, and the target eNB allocates radio bearer resources taking received indication into account.

2) The AMF determines from the 'Target eNB Identifier' Information Element (IE) that the type of handover is Handover to E-UTRAN. The AMF selects an MME.

In the case of HR(Home Routed) roaming, the AMF by using Nsmf_PDUSession_Context Request requests the V-SMF to provide SM Context that also includes the mapped EPS Bearer Contexts. The AMF provides the target MME capability to SMF in the request to allow the V-SMF to determine whether to include EPS Bearer context for Ethernet PDN Type or non-IP PDN Type or not. For PDU Sessions with PDU Session Type Ethernet, if the UE and target MME supports Ethernet PDN type, the SMF provides SM Context for Ethernet PDN Type, otherwise if the target MME does not support Ethernet Type but support non-IP Type, the SMF provides SM Context for non-IP PDN Type. For PDU Sessions with PDU Session Type Unstructured, the SMF provides SM Context for non-IP PDN Type.

In the case of non-roaming or Local Break Out (LBO) roaming, the AMF request PGW-C+SMF to provide SM Context by using Nsmf_PDUSession_ContextRequest. The AMF provides the target MME capability to PGW-C+SMF in the request to allow the PGW-C+SMF to determine whether to include EPS Bearer context for Ethernet Type or non-IP PDN Type or not. For PDU Sessions with PDU Session Type Ethernet, if the UE and target MME supports Ethernet PDN type, the SMF provides SM Context for Ethernet PDN Type, otherwise if the target MME does not support Ethernet but support non-IP PDN Type, the SMF provides SM Context for non-IP PDN Type. For PDU Sessions with PDU Session Type Unstructured, the SMF provides SM Context for non-IP PDN Type. The PGW-C+SMF send N4 Session modification to PGW-U+UPF to establish the CN tunnel for each EPS bearer and provide EPS Bearer Contexts to AMF. The PGW-U+UPF is ready to receive the uplink packet from E-UTRAN.

Step 2) is performed with all the PGW-C+SMFs corresponding to PDU Sessions of the UE which are associated with 3GPP access and have EBI(s) allocated to them.

NOTE 2: The AMF knows the MME capability to support Ethernet PDN type and/or non-IP PDN type or not through local configuration.

NOTE 3: In home routed roaming scenario, the UE's SM EPS Contexts are obtained from the V-SMF.

3. The AMF sends a Forward Relocation Request message with the following modifications and clarifications:

Parameter "Return preferred" may be included in Relocation Request message. Return preferred is an optional indication by the MME of a preferred return of the UE to the 5GS PLMN at a later access change to a 5GS shared network.

The SGW address and TEID for both the control-plane or EPS bearers in the message are used by target MME to select a new SGW.

The AMF determines, based on configuration and the Direct Forwarding Path Availability, the Direct Forwarding Flag to inform the target MME whether direct data forwarding is applicable.

The AMF includes the mapped SM EPS UE Contexts for PDU Sessions with and without active UP connections.

4-5) The MME may send a Create session request message to the SGW. The SGW may send a Create session response message to the MME.

6) The MME may transmit a handover request message to the E-UTRAN. When step 6) is performed, the following may be applied:

The target eNB should establish E-RABs indicated by the list of EPS bearer to be setup provided by the MME, even if they are not included in the source to target container.

Handover Request may include information Handover Restriction List with information about PLMN IDs for eNodeB functions.

The target eNB may establish E-RABs indicated by the list of EPS bearer to be setup provided by the MME, even if they are not included in the source to target container.

7-9) The E-UTRAN may transmit a handover request ACK message to the MME. The MME may optionally transmit a Create indirect data forwarding tunnel request to the SGW, and the SGW may transmit a Create indirect data forwarding tunnel response to the MME. The MME may transmit a Relocation response message to the AMF.

10a) If data forwarding applies, the AMF sends the Nsmf_PDUSession_UpdateSMContext Request (including data forwarding information) to the PGW-C+SMF. If multiple PGW-C+SMFs serves the UE, the AMF maps the EPS bearers for Data forwarding to the PGW-C+SMF address(es) based on the association between the EPS bearer ID(s) and PDU Session ID(s). In home-routed roaming case, the AMF requests the V-SMF to create indirect forwarding tunnel if indirect forwarding applies.

10b) If indirect data forwarding applies, the PGW-C+SMF may select an intermediate PGW-U+UPF for data forwarding. The PGW-C+SMF maps the EPS bearers for Data forwarding to the 5G QoS flows based on the association between the EPS bearer ID(s) and QFI(s) for the QoS flow(s) in the PGW-C+SMF. And then PGW-C+SMF may send the QFIs, Serving GW Address(es) and TEID(s) for data forwarding to the PGW-U+UPF. If CN Tunnel Info for Data Forwarding is allocated by the PGW-C+SMF, the CN Tunnel Info for Data Forwarding is provided to PGW-U+UPF in this step 10b). The PGW-U+UPF acknowledges by sending a response. If CN Tunnel Info is allocated by the PGW-U+UPF, the CN Tunnel Info is provided to PGW-C+SMF in this response. In home-routed roaming case, the V-SMF selects the V-UPF for data forwarding.

10c) The PGW-C+SMF returns an Nsmf_PDUSession_UpdateSMContext Response (including Cause, Data Forwarding tunnel Info, QoS flows for Data Forwarding). Based on the correlation between QFI(s) and Serving GW Address(es) and TEID(s) for data forwarding, the PGW-U+UPF maps the QoS flow(s) into the data forwarding tunnel(s) in EPC.

11) The AMF sends the Handover Command message (including Transparent container (radio aspect parameters that the target eNB has set-up in the preparation phase), Data forwarding tunnel info, QoS flows for Data Forwarding) to the source NG-RAN. The source NG-RAN commands the UE to handover to the target access network by sending the HO Command. The UE correlates the ongoing QoS Flows with the indicated EPS Bearer IDs to be setup in the HO command. The UE locally deletes the PDU Session if the QoS Flow associated with the default QoS rule in the PDU Session does not have an EPS Bearer ID assigned. If the QoS Flow associated with the default QoS rule has an EPS Bearer ID assigned, the UE keeps the PDU Session (PDN connection) and for the remaining QoS Flow(s) that do not have EPS bearer ID(s) assigned. And, the UE locally deletes the QoS rule(s) and the QoS Flow level QoS parameters if any associated with those QoS Flow(s) and notifies the impacted applications that the dedicated QoS resource has been released. The UE deletes any UE derived QoS rules. The EPS Bearer ID that was assigned for the QoS flow of the default QoS rule in the PDU Session becomes the EPS Bearer ID of the default bearer in the corresponding PDN connection.

If indirect data forwarding is applied, Data forwarding tunnel info includes CN tunnel info for data forwarding per PDU session. For the QoS Flows indicated in the "QoS Flows for Data Forwarding", NG-RAN initiate data forwarding via to the PGW-U+UPF based on the CN Tunnel Info for Data Forwarding per PDU Session. Then the PGW-U+UPF maps data received from the data forwarding tunnel(s) in the 5GS to the data forwarding tunnel(s) in EPS, and sends the data to the target eNodeB via the Serving GW.

If direct data forwarding is applied, Data forwarding tunnel info includes E-UTRAN tunnel info for data forwarding per EPS bearer. NG-RAN initiate data forwarding to the target E-UTRAN based on the Data Forwarding Tunnel Info for Data Forwarding per EPS bearer.

12a-12c) The UE may transmit a Handover Complete message to the E-UTRAN. The E-UTRAN may transmit a Handover Notify message to the MME. The MME may transmit a Relocation Complete Notification message to the AMF. The following explanations may be applied to steps 12a) to 12c):

The AMF request the release of the PDU Session which is associated with 3GPP access, not expected to be transferred to EPC (i.e. PDU session to which no EBI(s) allocated), and corresponding to the PGW-C+SMF which is not contacted by AMF for SM context at step 2).

12d) The AMF acknowledges MME by transmitting Relocation Complete Ack message to MME. A timer in AMF is started to supervise when resource inNG-RAN shall be released.

12e) In case of home routed roaming, the AMF may transmit Nsmf_PDUSession_ReleaseSMContext Request message (including V-SMF only indication) to the V-SMF. This service operation request the V-SMF to remove only the SM context in V-SMF, i.e. V-SMF does not release PDU Session context in the PGW-C+SMF.

If indirect forwarding tunnel(s) were previously established, the V-SMF starts a timer and releases the SM context on expiry of the timer. If no indirect forwarding tunnel has been established, the V-SMF immediately releases the SM context and its UP resources for this PDU Session in V-UPF locally.

13) The MME may send a Modify bearer Request message to the SGW.

14a) The SGW may send a Modify Bearer Request message to the PGW-C+SMF. The following explanation may be applied to step 14a):

If the PDU Session (PDN connection) has QoS Flows that do not have EPS bearer ID(s) assigned, the PGW-C+SMF deletes the PCC rule(s) associated with those QoS Flows and informs the PCF about the removed PCC rule(s).

NOTE 4: If the QoS flow is deleted, the IP flows of the deleted QoS rules will continue flowing on the default EPS bearer if it does not have an assigned TFT. If the default EPS bearer has an assigned TFT, the IP flows of the deleted QoS Flow may be interrupted until step 19 when dedicated bearer activation is triggered by a request from the PCF.

The PGW-C+SMF may report some subscribed event to the PCF by performing an SMF initiated SM Policy Association Modification procedure as defined in clause 4.16.5.

15. The PGW-C+SMF may initiate a N4 Session Modification procedure towards the UPF+PGW-U to update the User Plane path, i.e. the downlink User Plane for the indicated PDU Session is switched to E-UTRAN. The PGW-C+SMF may release the resource of the CN tunnel for PDU Session in UPF+PGW-U.

16) The PGW-C+SMF may transmit a Modify bearer Response message to the SGW. At this step, the User Plane path may be established for the default bearer and the dedicated EPS bearers between the UE, target eNodeB, Serving GW and the PGW-U+UPF. The PGW-C+SMF uses the EPS QoS parameters as assigned for the dedicated EPS bearers during the QoS Flow establishment. PGW-C+SMF maps all the other IP flows to the default EPS bearer (see NOTE 4).

If indirect forwarding tunnel(s) were previously established, the PGW-C+SMF starts a timer, to be used to release the resource used for indirect data forwarding.

17) The SGW may transmit a Modify bearer Response message to the MME.

18) The UE may initiate the Tracking Area Update procedure.

In step 18), deregistration of the old AMF for 3GPP access in HSS+UDM may also be performed. All registrations related to non-3GPP access in old AMF are not removed (Example: AMF that was serving the UE over 3GPP and non-3GPP access does not consider the UE as deregistered through non-3GPP access, and the UE does not consider the UE as unregistered through non-3GPP access, and the UE is registered in non-3GPP access, remain subscribed).

NOTE 5: The operation whereby the HSS+UDM cancels location of CN node of the another type, i.e. AMF, is similar to HSS behavior for MME and Gn/Gp Serving General Packet Radio Service (GPRS) Support Node (SGSN) registration. The target AMF that receives the cancel location from the HSS+UDM is the one associated with 3GPP access.

When the UE decides to deregister over non-3GPP access or the old AMF decides not to maintain a UE registration for non-3GPP access anymore. In this case, the old AMF then deregisters from UDM by sending a Nudm_UECM_Deregistration service operation, unsubscribes from Subscription Data updates by sending an Nudm_SDM_Unsubscribe service operation to UDM and releases all the AMF and AN resources related to the UE.

19. If PCC is deployed, the PCF may decide to provide the previously removed PCC rules to the PGW-C+SMF again. And PCF may trigger the PGW-C+SMF to initiate dedicated bearer activation procedure. This step is applicable for PDN Type IP or Ethernet, but not for non-IP PDN Type.

20) The MME and the SGW may transmit and receive the Delete indirect data forwarding Tunnel request/response message.

21) In the case of home routed roaming, at the expiry of the timer at V-SMF started at step 12e), the V-SMF may locally release the SM context and the UP resource for the PDU Session including the resources used for indirect forwarding tunnel(s) that were allocated at step 10).

In non-roaming or local breakout roaming, if PGW-C+SMF has started a timer in step 16), at the expiry of the timer, the PGW-C+SMF sends N4 Session Modification Request to PGW-U+UPF to release the resources used for the indirect forwarding tunnel(s) that were allocated at step 10).

When the timer set in step 12d expires, AMF also sends a UE Context Release Command message to the source NG RAN. The source NG RAN releases its resources related to the UE and responds with a UE Context Release Complete message.

Hereinafter, an example of an EBI allocation procedure will be described with reference to FIGS. 13a and 13b.

Figure 13B:
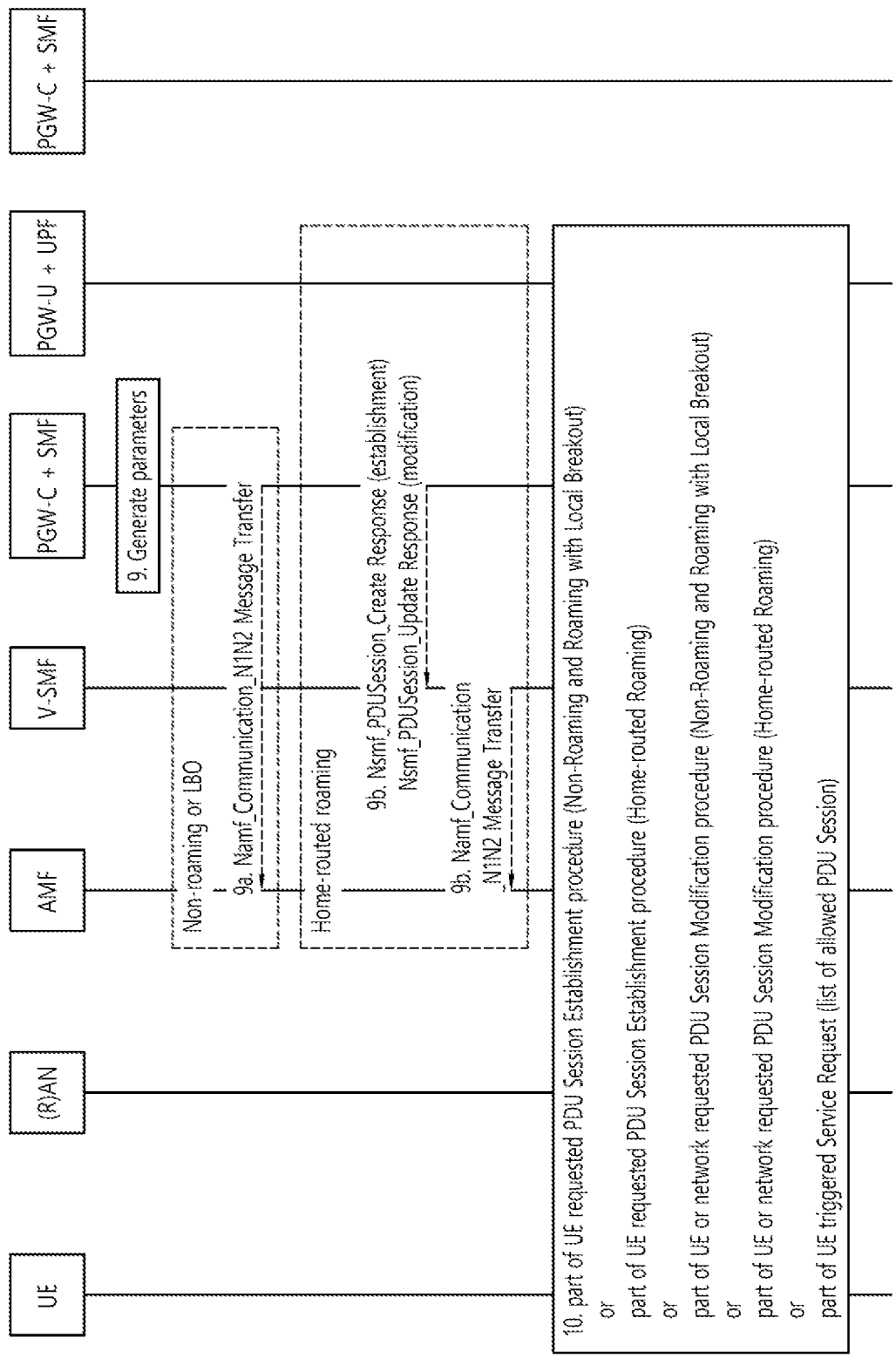

FIGS. 13a and 13b show an example of an EBI allocation procedure to which the implementation of the present specification is applied.

FIGS. 13a and 13b are examples of EBI allocation procedures. The example of FIGS. 13a and 13b may be applied to the following procedures for allocating EBI to the mapped EPS bearer in a QoS flow and providing the EBI to the NG-RAN:

UE requested PDU Session Establishment procedure (Non-roaming and Roaming with Local Breakout).

Part of UE requested PDU Session Establishment (Home-routed Roaming).

UE or network requested PDU Session Modification procedure (non-roaming and roaming with local breakout).

UE or network requested PDU Session Modification (home-routed roaming).

UE Triggered Service Request to move PDU Session(s) from untrusted non-3GPP access to 3GPP access EBI allocation shall apply to PDU Session via 3GPP access supporting EPS interworking with N26. EBI allocation shall not apply to PDU Session via 3GPP access supporting EPS interworking without N26 and shall not apply to PDU Session via non-3GPP access supporting EPS interworking.

1) A part of the UE request PDU session establishment procedure (Non-roaming and Roaming with Local Breakout), a part of the UE request PDU session establishment procedure (Home-routed Roaming), a part of the UE or network request PDU session modification procedure (Non-roaming and Roaming with Local Breakout), a part of the UE or network request PDU session modification procedure (Home-routed Roaming), or a part of the UE initiated service request procedure may be performed.

For example, a part of the UE request PDU session establishment procedure (Non-roaming and Roaming with Local Breakout) may be steps 1) to 9b) of FIGS. 10*a* to 10*b*. In other words, in step 1) of FIGS. 13*a* and 13*b*, operations such as, the UE sends a PDU session establishment request to the AMF, AMF sends SMF request message to SMF (or V-SMF), network nodes perform PDU session approval/authentication procedures, the SMF (H-SMF) and the UPF (or H-UPF) performing the N4 session establishment/modification procedure, may be performed.

2) When PGW-C+SMF (or H-SMF in home routed roaming case) determines that EBI needs to be assigned to a QoS flow in a PDU session, PGW-C+SMF may call an EBI assignment request. That is, the PGW-C+SMF (or H-SMF in case of home routed case) may transmit message for requesting EBI allocation to AMF. For example, the PGW-C+SMF (or H-SMF in case of home routed case), may determine that EBI needs to be assigned to a QoS flow in a PDU session, based on operator policies (e.g. User Plane Security Enforcement information, Access Type). And, PGW-C+SMF may transmit Namf_Communication_EBIAssignment Request message (including PDU Session ID, ARP (Allocation and Retention Priority) list) to AMF. For home-routed roaming, the PGW-C+SMF may send Nsmf_PDUSession_Update to the V-SMF. When the V-SMF receives a PDU session update request (eg, Nsmf_PDUSession_Update) for the EBI allocation request from the H-SMF, the V-SMF calls the EBI allocation request. For example, the EBI assignment request may be a Namf_Communication_EBIAssignment Request (including a PDU session ID and ARP list).

If the PGW-C+SMF (or H-SMF in case of home-routed roaming) serves multiple PDU sessions for the same DNN but different S-NSSAIs for a UE, then the SMF shall only request EBIs for PDU sessions served by a common UPF (PSA). In case different UPF (PSA) are serving those PDU sessions, then the SMF chooses one of the UPF (PSA) for this determination based on operator policy. When the PDU session is established via non-3GPP access, the PGW-C+SMF shall not trigger EBI allocation procedure.

Steps 3 to 6 may be performed conditionally, steps 3) to 6) may be performed only when AMF needs to revoke EBI previously allocated for an UE in order to serve a new SMF request of EBI for the same UE.

3) [Conditional] If the AMF has no available EBIs, the AMF may revoke an EBI that was assigned to QoS flow(s) based on the ARP(s) and S-NSSAI stored during PDU Session establishment, EBIs information in the UE context and local policies. If an assigned EBI is to be revoked, the AMF invokes PDU session update to request the related SMF (called "SMF serving the released resources") to release the mapped EPS QoS parameters corresponding to the EBI to be revoked. PDU session update may be Nsmf_PDUSession_UpdateSMContext (including information on EBI(s) to be revoked) The AMF stores the association of the assigned EBI, ARP pair to the corresponding PDU Session ID and SMF address.

4) The "SMF serving the released resources" that receives the request in step 3 shall invoke message to be transferred to AMF, to inform the (R)AN and the UE to remove the mapped EPS QoS parameters corresponding to the EBI(s) to be revoked. For example, message to be transferred to AMF may be Namf_Communication_N1N2Message Transfer. Namf_Communication_N1N2Message Transfer may include N2 SM information (PDU Session ID, EBI(s) to be revoked), N1 SM container (PDU Session Modification Command (including PDU Session ID, EBI(s) to be revoked)).

In home routed roaming scenario, the H-SMF includes EBI(s) to be revoked to V-SMF to inform V-SMF to remove the mapped EPS bearer context corresponding to the EBI(s) to be revoked NOTE 1: The SMF can also decide to remove the QoS flow if it is not acceptable to continue the service when no corresponding EPS QoS parameters can be assigned.

For home routed roaming scenario, the "SMF serving the released resources" sends an N4 Session Modification Request to request the PGW-U+UPF to release N4 Session corresponding to the revoked EBI(s).

In home routed roaming case, the V-SMF starts a VPLMN initiated QoS modification for the PDU Session. The Namf_Communication_N1N2Message Transfer is invoked by the V-SMF based on the corresponding QoS modification message received from H-SMF.

5) If the UE is in CM-CONNECTED state, the AMF sends N2 PDU Session Request message to (R)AN. N2 PDU Session Request message may include N2 SM information received from SMF, NAS message (PDU Session ID, N1 SM container (PDU Session Modification Command)) Message to the (R)AN.

If the UE is in CM-IDLE state and an ATC is activated, the AMF updates and stores the UE context based on the Namf_Communication_N1N2MessageTransfer and step 5-6 are skipped. When the UE is reachable, e.g. when the UE enters CM-CONNECTED state, the AMF forwards the N1 message to synchronize the UE context with the UE.

6) If the EBI is released (or revoked), part of the network request PDU session modification procedure (Non-roaming and Roaming with Local Breakout), or, a part of the network request PDU session modification procedure (Home-routed Roaming) may be performed.

7) If the AMF has successfully allocated the EBI, the AMF transmits a response message (eg, Namf_Communication_EBIAssignmentResponse) including the allocated EBI to the V-SMF or PGW-C+SMF. Otherwise, the AMF transmits a response message including the cause indicating the EBI allocation failure to the V-SMF or PGW-C+SMF. If the PDU session is connected to the S-NSSAI subject for authentication and authorization for each network slice, the AMF may indicate EBI allocation failure.

If a PDU Session from another SMF already exists towards the same DNN, the AMF either rejects the EBI assignment request, or revokes the EBI(s) from the existing PDU Session(s) to the same DNN but different SMFs. The AMF may decide whether to reject the EBI allocation request or retrieve the EBI of the PDU session based on the operator policy. If the AMF makes this decision, the existing PDU session cannot support EPS interworking N26.

The AMF stores the DNN and PGW-C+SMF in which the PDU Session(s) support EPS interworking to UDM.

NOTE 2: Step 7) applies only when the S-NSSAI(s) for the PDU Sessions are different, otherwise the same SMF is selected for PDU Sessions to the same DNN.

8. The PGW-C+SMF transmits an N4 Session Establishment/Modification Request to the PGW-U+UPF.

For home routed roaming scenario, if the EBI is assigned successfully, the PGW-C+SMF prepares the CN Tunnel Info for each EPS bearer. If the CN Tunnel info is allocated by the PGW-C+SMF, the PGW-U tunnel info for the EPS bearer may be provided to PGW-U+UPF. If the CN Tunnel info is allocated by PGW-U+UPF, the PGW-U+UPF sends the PGW-U tunnel info for the EPS bearer to the PGW-C+SMF. The PGW-U+UPF is ready to receive uplink packets from E-UTRAN.

NOTE 3: In the home routed roaming scenario the PGW-C+SMF prepares the CN Tunnel Info for each EPS bearer and provide it to V-SMF. Thus when the UE move to EPC network, the V-SMF does not need interact with the PGW-C+SMF to get the EPS bearer context(s).

NOTE 4: If the CN Tunnel info is allocated by the PGW-C+SMF and not provided to PGW-U+UPF at PDU Session establishment, when the UE moves to the target RAT the PGW-U+UPF cannot receive UL data until the PGW-C+SMF has provided the Tunnel Info to the PGW-U+UPF in N4 Session Modification. This causes a short interruption to the UL data during the intersystem handover execution.

9) If the PGW-C+SMF receives any EBI(s) from the AMF, it adds the received EBI(s) into the mapped EPS bearer context(s).

In home routed roaming scenario, the PGW-C+SMF generates EPS bearer context which includes per EPS bearer PGW-U tunnel information. In addition, if the default EPS bearer is generated for the corresponding PDN Connection of PDU Session (i.e. during the PDU Session establishment procedure), the PGW-C+SMF generates the PGW-C tunnel information of the PDN connection and include it in UE EPS PDN connection.

9a. [Conditional] In non-roaming or LBO scenario, the PGW-C+SMF includes the mapped EPS bearer context(s) and the corresponding QoS Flow(s) to be sent to the UE in the N1 SM container. PGW-C+SMF also indicates the mapping between the QoS Flow(s) and mapped EPS bearer context(s) in the N1 SM container. The PGW-C+SMF may transmit the N1 SM container and N2 SM information to the AMF through, for example, Nsmf_PDUSession_UpdateSMContext Response, in case of the PDU Session Modification procedure triggered by UE or AN, or UE Triggered Service Request procedure that results in session transfer from N3GPP to 3GPP. Otherwise, the PGW-C+SMF may transmit the N1 SM container and N2 SM information to the AMF through, for example, Namf_Communication_N1N2MessageTransfer.

9b) [Conditional] In home routed roaming scenario, the PGW-C+SMF sends mapped EPS bearer context(s), the mapping between the received EBI(s) and QFI(s), and EPS bearer context to V-SMF. For example, the PGW-C+SMF sends mapped EPS bearer context(s) via Nsmf_PDUSession_Create Response in case of PDU Session Establishment. Or, the PGW-C+SMF sends mapped EPS bearer context(s) via Nsmf_PDUSession_Update Request in case of PDU Session Modification. The V-SMF stores the EPS bearer context, and generates N1 SM container and N2 SM information. And, the V-SMF forwards N1 SM container and N2 SM information to AMF via the Nsmf_PDUSession_UpdateSMContext Response in case of the PDU Session Modification procedure. Otherwise, the V-SMF may deliver the N1 SM container and N2 SM information to the AMF, for example, through Namf_Communication_N1N2MessageTransfer.

10) N1 SM container and N2 SM information is transmitted to each of the UE and NG-RAN. And, a part of the UE request PDU session establishment procedure (Non-roaming and Roaming with Local Breakout), part of the UE request PDU session establishment procedure (Home-routed Roaming), part of the UE or network request PDU session modification procedure (Non-roaming and Roaming with Local Breakout), part of UE or Network Request PDU Session Modification Procedure (Home-routed Roaming), or part of the UE initiated service request procedure may be performed.

For example, a part of the UE request PDU session establishment procedure (Non-roaming and Roaming with Local Breakout) may be steps 11) to 19) of FIGS. 10a to 10b. In other words, in step 10) of FIGS. 13a and 13b, an operation such as, the AMF transmits an N2 PDU session request message to the RAN, UE and RAN perform AN-specific resource setup, RAN sends N2 PDU session response to AMF, UE sends uplink data to UPF, the UPF transmitting downlink data to the UE may be performed.

Hereinafter, EBI revocation (or release or revocation) will be described.

For reference, in the disclosure of this specification, EBI revocation, EBI release, and EBI cancellation may be used as terms having the same meaning.

The operation of retrieving the EBI allocated to the QoS flow can be applied to a procedure such as the following example:

UE or network requested PDU Session Release for Non-roaming and Roaming with Local Breakout.

UE or network requested PDU Session Release for Home-routed Roaming.

UE or network requested PDU Session Modification (non-roaming and roaming with local breakout).

UE or network requested PDU Session Modification (home-routed roaming).

Handover of a PDU Session procedure from 3GPP to untrusted non-3GPP access (non-roaming and roaming with local breakout)

Handover of a PDU Session procedure from 3GPP to untrusted non-3GPP access (home routed roaming)

When the PDU Session is released, and the SMF may transmit Nsmf_PDUSession_StatusNotify to notify AMF that the SM context for this PDU Session is released (e.g.

SMF may invoke Nsmf_PDUSession_StatusNotify to notify AMF). Then, the AMF releases the association between the SMF ID and the PDU Session ID, and releases the EBIs assigned for this PDU Session. When all the PDU sessions which are allocated with EBIs are released in the same SMF, the AMF may revoke DNN and PGW-C+SMF FQDN for S5/S8 interface in the UDM using Nudm_UECM_Update service operation.

If the PGW-C+SMF in which the PDU sessions support EPS interworking is changed for the same DNN, the AMF can update the DNN and new PGW-C+SMF FQDN for S5/S8 interface in the UDM using Nudm_UECM_Update service operation When the UE initiates a PDU Session Modification, and the SMF needs to release the assigned EBI from a QoS flow, the SMF can indicate the Released EBI list in the Nsmf_PDUSession_UpdateSMContext Response to the AMF. The AMF releases the corresponding EBI allocation for this PDU Session.

When the AMF decides to revoke some EBI(s), e.g. when the AMF receives a new EBI allocation request but there is no EBI available, the AMF may decide to revoke EBI(s) for another PDU Session, the AMF initiates a PDU Session Modification. And, the AMF includes EBI list to be revoked in the Nsmf_PDUSession_UpdateSMContext Request (Example: Request message sent by AMF to SMF). The SMF releases the indicated EBI(s) for the PDU Session.

When the AMF initiates a PDU Session Modification to change the status of EPS interworking with N26 to "not supported", the AMF releases the EBIs assigned for this PDU Session and SMF release the assigned EBIs from the QoS Flows belonging to this PDU Session.

When the SMF initiates a PDU Session Modification, and the SMF needs to release the assigned EBI from a QoS flow (e.g. when the QoS flow is released), the SMF invokes Namf_Communication_EBIAssignment and indicates the Released EBI list to the AMF. The AMF releases the corresponding EBI allocation for this PDU Session.

When the handover of a PDU Session procedure from 3GPP to untrusted non-3GPP access is performed, the AMF, the SMF and the UE releases locally the EBI(s) allocated for this PDU Session.

When the handover of a PDU Session procedure from 3GPP to untrusted non-3GPP access is performed, the H-SMF invokes Nsmf_PDUSession_StatusNotify to notify V-AMF to release the association between the SMF ID and the PDU Session ID. As a result, the EBI(s) assigned for this PDU Session are released. The UE releases locally the EBI(s) allocated for this PDU Session.

II. Problems to be Solved in the Disclosure of this Specification

Hereinafter, examples of problems to be solved in the disclosure of the present specification will be described.

A plan to support MBS (Multicast-Broadcast Services) in 5GS is being discussed. For example, architectural enhancements for 5G MBS are being discussed. Supporting MBS in 5GS is being discussed to achieve the following goals, for example:

The goal of discussing how to support MBS in 5GS may be to identify and evaluate potential enhancements of the 5G system architecture, in order to provide MBS service that can be used for various vertical businesses. An example of the goal of a scheme to support MBS in 5GS is the following example:

To support multicast/broadcast services, a framework including a functional split between (R)AN and CN can be defined. For example, a multicast/broadcast service may include ad-hoc multicast/broadcast stream, transparent IPv4/IPv6 multicast delivery, IPTV, software delivery over wireless, group communication and broadcast/multicast Internet on Things (IoT) applications, V2X applications, public safety, etc.

It can support various levels of service. For example, a transport only mode and a full service mode may be supported.

Enables flexible network deployment (eg, distributed and/or centralized) and flexible network operation (eg, CP (Control Plane)-UP (User Plane) separation).

Describe whether QoS and PCC rules are applicable to multicast/broadcast services and how QoS and PCC rules relate to multicast/broadcast services.

Can support requirements for public safety (eg service continuity) and use cases.

A method of supporting MBS in 5GS with a focus on radio access technology according to NR among NG-RANs may be discussed. Support for UEs using access that does not support multicast/broadcast or moving to such access may be considered.

Regarding MBS in 5GS, issues such as the following examples are being discussed. For example, a method for minimizing interruption of public safety services in a situation in which a transition between NR/5GC and E-UTRAN/EPC is performed is being discussed.

The detailed explanation of this issue is as follows. As previously discussed, in the high-level MBS architecture, only NR based on NG-RAN (eg, NG-RAN connected to 5GC) is considered as RAT. That is, a support plan for MBS through E-UTRA connected to 5GC was not discussed.

This issue, together with the public safety service, can be applied to PLMN with 5G MBS through Evolved Universal Terrestrial Radio Access Network (E-UTRAN)/Evolved Packet Core (EPC) based evolved Multimedia Broadcast & Multicast Service (eMBMS) installation/deployment and NR/5GC.

There may be a case where a UE receiving a service subject to multicast delivery through NR/5GC moves to E-UTRAN/EPC and uses eMBMS. Also, the opposite may be the case. How to handle this service through both EPC and 5GC and how to handle mobility between RATs (RATs) should be considered.

Therefore, a solution to this issue focusing on public safety services may satisfy the following:

For UEs camping on E-UTRAN (eMBMS) and connected via NR connected to 5GC (via 5G MBS solution), AF (e.g. Public Safety Group Communication System (GCS) Application Server (AS)) may be allowed to provide the same multicast/broadcast service.

A procedure for UE performing inter-CN mobility between EPC and 5GC during a multicast session may be defined.

A goal to address this issue may be to minimize service disruption and packet loss, and to achieve re-connection as quickly as possible during transitions between various systems.

Various solutions related to multicast transmission are defined in prior art documents (eg, 3GPP TR 23.757 v0.3.0). For example, Solution #3: Integrated Multicast and Unicast Transport in Section 6.3, Solution #4: Multicast session management with dedicated MBS network functions in Section 6.4, and Solution #6: Multicast service initiation in Section 6.6 are defined.

However, according to the prior art, multicast transmission for MBS is not supported in EPS. Therefore, when the UE receives MBS traffic in the multicast method in 5GS, when the UE moves from 5GS to the EPS, a method in which the UE can continuously receive the MBS traffic in the unicast method in the EPS should be supported.

Multicast communication (eg, transmission) for MBS performed in 5GS may not be traffic transmission through a Protocol Data Unit (PDU) session established by the UE. For example, multicast communication (eg, transmission) for MBS performed in 5GS may be interpreted as transmitting traffic using a path/tunnel/resource formed (or established) for a multicast group. A detailed interpretation of the method of transmitting traffic using the (or established) path/tunnel/resource formed for the multicast group is as follows. For multicast communication (eg, transmission) for MBS performed in 5GS, an Application Server or Content Provider that provides multicast traffic may provide MBS data packets to the core network. For the provided MBS data packets, the core network may transmit MBS data packets to the NG-RAN without the core network copying the MBS data packets as many as the number of UEs (UEs that will receive MBS data packets) and providing them to each UE. For example, when the core network needs to transmit MBS data packets to multiple NG-RANs, the core network may transmit one copy of MBS data packets per NG-RAN. Then, the NG-RAN does not copy the received MBS data packets as many as the number of UEs (UEs that will receive MBS data packets) and transmit them to each UE through the radio, NG-RAN can transmit only one copy of MBS data packets through the radio. A multicast radio bearer may be used for the NG-RAN to transmit one copy of MBS data packets over the radio. When the NG-RAN transmits one copy of MBS data packets through the multicast radio bearer, all UEs (UEs that will receive MBS data packets) can receive them.

Here, using the (or established) path/tunnel/resource formed for the multicast group may be referred to as, for example, using a shared resource. In this case, a shared resource may be used in both the core network section and the radio section, shared resource can be used only in the core network section. For example, if the shared resource is used only in the core network section, in the radio section, the NG-RAN copies MBS data packets received from the core network as many as the number of UEs, the NG-RAN may transmit to each UE through radio.

On the other hand, when the UE moves from 5GS to EPS, among the QoS flows of the UE, only QoS flows to which EBI (EPS Bearer ID) is allocated may be moved to EPS. For a related description, refer to the description of the <N26-based interworking procedure>. However, conventionally, when a UE performing multicast communication in 5GS (eg, multicast communication based on MBS) moves to EPS, a method for providing multicast communication to the UE has not been discussed.

III. Disclosure of the Present Specification

The disclosures described below in this specification may be implemented in one or more combinations (eg, a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementarily.

In this specification, the following methods are proposed to solve the problem. The methods below may be performed or used in combination or complementary.

The disclosure of the present specification describes a method for effectively supporting multicast communication between a UE and a network when it is difficult to perform multicast communication using a multicast method. For example, a method for supporting the conversion of 5GS multicast communication (eg, transmission) to EPS unicast communication (eg, transmission) will be described. A method for supporting the conversion of 5GS multicast communication (eg, transmission) to EPS unicast communication (eg, transmission) may be configured by a combination of one or more operations, configurations, and/or steps among various examples described below.

In the disclosure of this specification, MBS may be interpreted the same as MBMS (Multimedia Broadcast/Multicast Service).

In the disclosure of this specification, the MBS session may be interpreted as including an MBS multicast session and an MBS broadcast session. MBS data may be interpreted as including MBS multicast data and MBS broadcast data.

In this specification, multicast session, multicast service, and multicast group may be used interchangeably with the same or similar meaning.

When the UE moves from 5GS to EPS, only QoS Flow(s) to which EBI is assigned can be moved to EPS. In the disclosure of this specification, an operation of allocating EBI for Multicast QoS Flow may be proposed. In addition, in the disclosure of the present specification, an operation of allocating an EBI to a unicast QoS flow corresponding to a multicast QoS flow may also be proposed.

Allocating EBI to Multicast QoS Flow or allocating EBI to Unicast QoS Flow corresponding to Multicast QoS Flow may be performed in the case of the following example.

When activating/initiating multicast session for UE
When providing multicast service for UE
When UE requests join to multicast session/group/service or after processing join
When QoS Flow is added or changed in multicast session Hereinafter, the disclosure of the present specification will be specifically described with reference to the first to the seventh disclosures of the present specification. For reference, the first to seventh disclosures of the disclosure of the present specification may be implemented in combination with each other.

1. First Disclosure of the Present Specification

In the first disclosure of the present specification, an example an operation of SMF and/or AMF performing allocating EBI for Multicast QoS Flow will be described.

Hereinafter, the first disclosure of the present specification will be described with reference to a procedure for supporting multicast transmission according to the example of FIGS. 14a and 14b.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 14A:
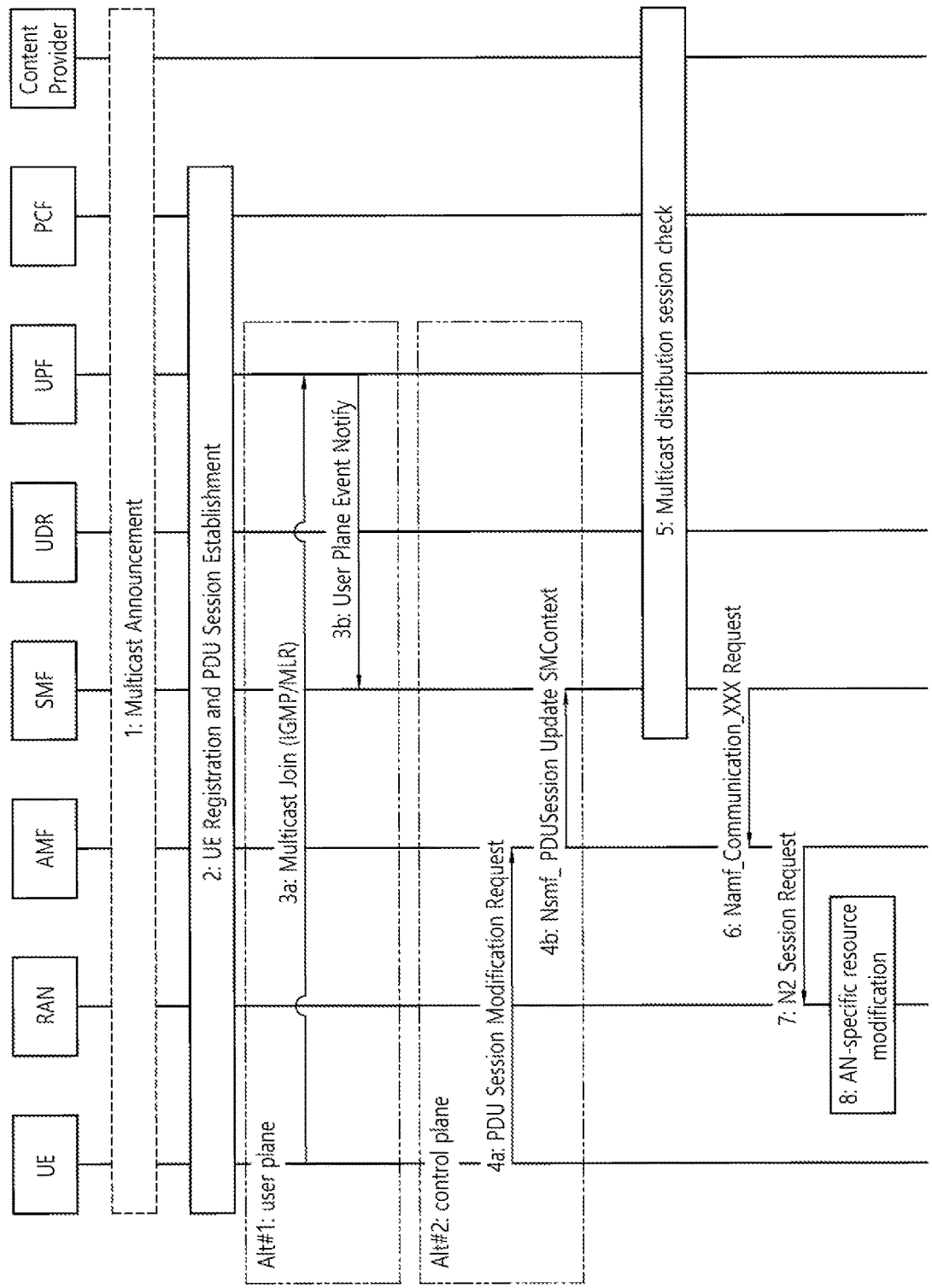
FIGS. 14a and 14b shows an example of the operation of the terminal and the network according to the first disclosure of the present specification.
Figure 14B:
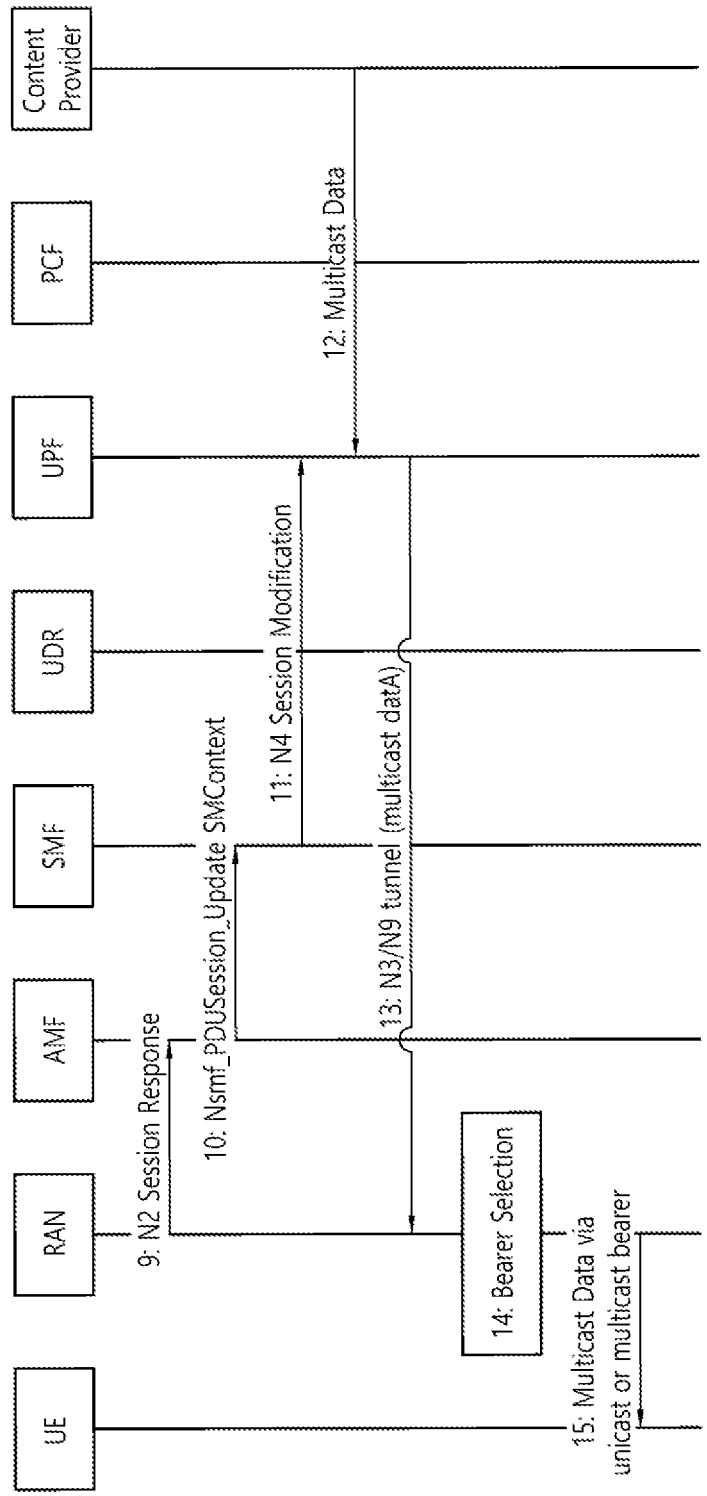

FIGS. 14a and 14b shows an example of the operation of the terminal and the network according to the first disclosure of the present specification.

The example of FIGS. 14a and 14b will be described in detail as follows. The example of FIGS. 14a and 14b shows an example of a procedure for setting and/or modifying a multicast context and a multicast flow through a PDU session modification procedure. The example of FIGS. 14a and 14b may be a PDU session modification procedure for multicast.

A procedure for setting and/or modifying a multicast context and a multicast flow according to the example of FIGS. 14a and 14b may use a PDU session modification procedure for unicast traffic.

1) A content provider may announce the availability of multicast using an upper layer (eg, an application layer). The announcement may include information on a multicast address of a multicast group in which the UE can participate.

The content provider may also transmit a request to reserve a resource for a corresponding multicast session to the NEF and perform communication related to a related multicast address.

A content provider may invoke a service provided by PCF or NEF to provide multicast information. Multicast information can be used to identify and reserve resources for multicast (eg, IP address of multicast data). The multicast information may further include QoS requirements, UE authentication information, a service area identifying the service scope, and start and end times of the MBS.

NOTE 1: A resource reservation request for the corresponding multicast session may be selectively performed, and this reservation request may be replaced with data established based on commercial agreements. If IP multicast is used on the external network, the content provider may not require information about where to send the multicast data.

2) The UE may register with the PLMN and request establishment of a PDU session. The AMF may obtain information on whether the UE can participate in the multicast session from the UDM as part of the SMF Selection Subscription data. In this case, for direct discovery, the AMF may select an SMF capable of processing a multicast session based on locally set data or a corresponding SMF capability stored in the NRF.

Hereinafter, step 3) or step 4) may be selectively performed. For example, neither step 3) nor step 4) may be performed, only step 3) may be performed, or only step 4) may be performed. In the following, Step 3) (including Steps 3a and 3b) is referred to as Alternative 1, and Step 4) (including Steps 4a and 4b) is referred to as Alternative 2 (Alternative 2).

3) Alternative 1: User plane signal. In alternative 1, a user plane signal may be used.

3a) The UE may participate in a multicast group. The UE may transmit a multicast join message (eg, including Internet Group Management Protocol (IGMP) and multicast listener report (MLR)) to the UPF.

3b) The UPF may be a multicast capable router. When the UPF receives the join message, the UPF may notify the SMF. The UPF may be optimized to transmit a notification to the SMF only when the state of the UE with respect to the number of multicast groups is changed (eg, when the UE joins or leaves the group). When the SMF receives a notification from the UPF, the SMF may initiate a PDU session modification procedure.

4) Alternative 2: Control plane signal. In alternative 2 a control plane signal may be used.

4a) The UE may transmit a PDU session establishment request message or a PDU session modification request message to the AMF according to a request from a higher layer or detection (e.g. detection of IGMP or MLR and detection of changes in the content of these messages) by a lower layer of the UE to participate in the multicast group. The PDU session modification request message may include information (such as multicast addresses listed in IGMP and MLR messages) on a multicast group that the UE wants to participate in. This information may be needed to use the appropriate packet filter to configure the UPF.

4b. AMF invokes Nsmf_PDUSession_UpdateSMContext (SM context ID, N1 SM container (PDU session modification request with multicast information)). For example, the AMF may transmit a request message for updating the SM context (including an SM context ID and an N1 SM container (a PDU session modification request with multicast information)) to the SMF.

5) The SMF may check whether a multicast context (eg, address) for the multicast group exists in the system (eg, whether there is a UE that has already joined the multicast group). If the multicast context for the multicast group does not exist, the SMF may generate the multicast context when the first UE joins the multicast group. If the UE in the example of FIGS. 14a and 14b is the first UE to join the multicast group, the UPF may participate in a multicast tree towards the content provider.

6) The SMF may request the AMF to deliver a message to the RAN node by using the Namf_Communication service. This message may include an indication that the UE has joined a multicast session identified by a multicast address.

7) The AMF may transmit a session modification request message (eg, an N2 session request message) to the RAN. The request may be transmitted by being included in the UE context using a message enhanced with multicast-related information including a multicast group ID. For example, the multicast group ID may include a multicast address itself, a multicast session context ID, or multicast flow information such as a multicast QoS flow ID and associated QoS information. The RAN may use the multicast group ID to determine whether the session modification procedure of two or more UEs corresponds to one multicast group. That is, the RAN may recognize which UEs receive the same multicast based on the multicast group ID. When the RAN receives a session modification request for a previously unknown multicast group ID, the RAN may be configured to serve this multicast group.

8) The RAN may perform necessary access network resource modification (eg, establishment of a broadcast bearer).

9) The RAN may send a session modification response that may include downlink tunnel information to the AMF (see step 6)).

10) The AMF may deliver the downlink tunnel information received in step 9) to the SMF. The SMF may store information about a multicast distribution session towards the RAN node serving the UE (multicast distribution session towards the RAN node) and the received downlink termination information. For reference, when the SMF previously processed a multicast service request of another UE served by the same RAN node, if such information was not stored, the SMF may store information on the multicast distribution session and the received downlink tunnel information.

11) If the RAN node serving the UE has not yet received the multicast distribution session, when unicast tunneling is used, the SMF processing the multicast distribution session may transmit an N4 session modification request including tunnel information to the UPF.

12) The UPF may receive a multicast PDU according to the setting in step 11).

13) The UPF may transmit the multicast PDU of the N3/N9 tunnel associated with the multicast distribution session to the RAN. There can be only one tunnel per multicast distribution session and RAN node. For example, all associated PDU sessions may share this tunnel.

14) The RAN may select a multicast radio bearer or a unicast radio bearer to deliver a multicast PDU to a UE that has joined the multicast group.

15) The RAN may perform transmission using the selected bearer. For example, the RAN may transmit multicast data to the UE via a unicast bearer or a multicast bearer.

In the first disclosure of the present specification, the description applied with reference to the example of FIGS. 14a and 14b is as follows.

SMF may perform EBI assignment for Multicast QoS Flow together with AMF. The operation of allocating the EBI for the Multicast QoS Flow may be performed after the SMF obtains (eg, may obtain from a PCF or other SMF) or generates QoS/context information for the Multicast QoS Flow. For example, the operation of allocating EBI for Multicast QoS Flow may be performed after step 5) is performed in the procedure according to the example of FIGS. 14a and 14b.

For a detailed example of operation for allocating EBI for Multicast QoS Flow or operation for allocating EBI for Unicast QoS Flow corresponding to Multicast QoS Flow, refer to the content described in the second disclosure of the present specification below.

When EBI is allocated for Multicast QoS Flow, in order to provide information on the allocated EBI to the UE, the SMF may transmit a NAS message to the UE.

The operation of the SMF requesting the AMF to allocate EBI for Multicast QoS Flow may be performed unconditionally, or may be performed based on various conditions (eg, local configuration/policy, operator policy, subscriber information, type/characteristics of multicast service, etc.). This can be applied throughout the disclosure of this specification, and when an NF other than SMF (MB-SMF, etc.) initiates EBI allocation, the description of the operation for requesting the EBI allocation may be applied to the operation performed by the corresponding NF in the same way. Here, MB-SFM may mean Multicast Broadcast (MB)-SMF. MB-SMF may be an SMF that manages and/or serves sessions (eg, multicast sessions) related to multicast and broadcast communication.

2. Second Disclosure of the Present Specification

In the second disclosure of the present specification, an example of a method of allocating EBI for Multicast QoS Flow will be described.

Based on the EPS bearer ID allocation procedure according to the example of FIGS. 15a and 15b, the second disclosure of the present specification will be described. For reference, the procedure according to the example of FIGS. 15a and 15b may be performed based on the description of the example of FIGS. 13a and 13b. Hereinafter, the examples of FIGS. 15a and 15b will be described with a focus on differences from the examples of FIGS. 13a and 13b. For a description commonly applied to the example of FIGS. 15a and 15b and the example of FIGS. 13a and 13b, reference will be made to the content described in the example of FIGS. 13a and 13b above.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 15A:
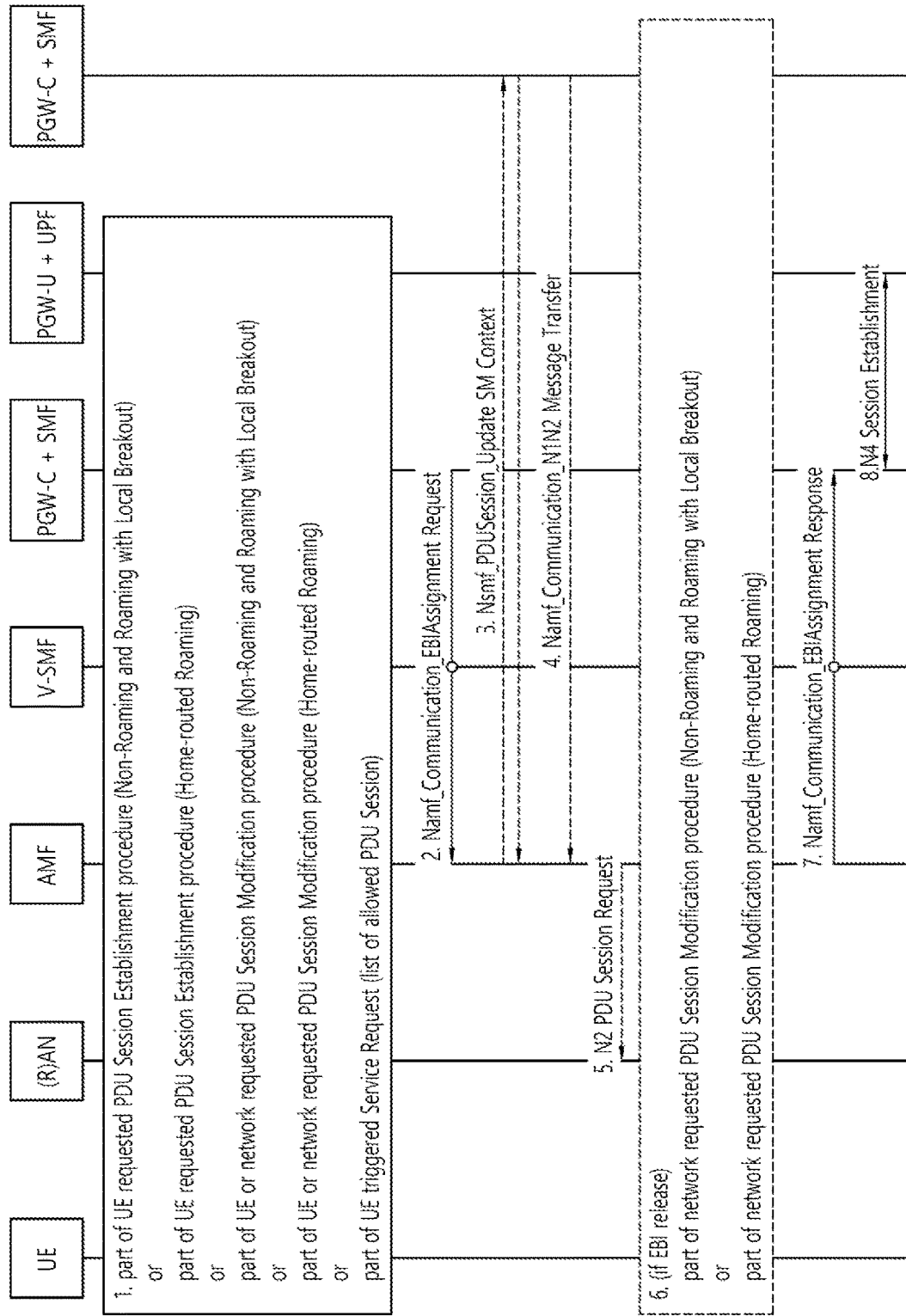

FIGS. 15a and 15b show examples of operations of a terminal and a network according to the second disclosure of the present specification.

Hereinafter, a first example of the second disclosure of the present specification and a second example of the second disclosure of the present specification will be described with reference to the examples of FIGS. 15a and 15b.

2-1. A First Example of the Second Disclosure of the Present Specification

In a first example of the second disclosure of the present specification, the SMF may be MB-SMF.

1) Step 1) may be replaced with a step of initiating a multicast service for the UE. For example, step 1) of FIGS. 15a and 15b may be replaced with a step of initiating a multicast service for the UE. As an example, step 1) may be replaced to steps performed before the SMF requests the AMF to allocate an EBI (eg, steps 1 to 5 in FIGS. 14a and 14b) in the procedure according to the example of FIGS. 14a and 14b.

2) In the existing procedure (eg, the procedure according to the example of FIGS. 13a and 13b), in order to identify a PDU session including a QoS Flow for which EBI allocation is requested, PDU Session ID is used. In the first example of the second disclosure of the present specification, the PDU Session ID may be replaced with information identifying a multicast session. For example, the PDU Session ID may be replaced with information identifying a multicast session including a multicast QoS flow for which EBI allocation is requested. Here, the information identifying the multicast session may be, for example, a multicast session ID, a multicast session context ID, a multicast PDU Session ID, and the like.

In step 2), the PGW-C+SMF may transmit an EBI assignment request message (eg, a Namf_Communication_EBI-Assignment Request message) to the AMF. In the first example of the second disclosure of the present specification, when the PGW-C+SMF performs an operation of requesting the AMF to allocate an EBI, the following description may be applied. For example, for the operation to request EBI allocation, the Namf_Communication_EBI-Assignment service operation may be extended and used, a new service operation may be defined and used. When a new service operation is defined and used, the newly defined service operation is based on the Namf_Communication_EBIAssignment service operation, may be a newly defined service operation applicable to multicast communication.

For reference, the following description may be applied to the Namf_Communication_EBIAssignment service operation:

Description: A consumer NF can use this service operation to request an EPS bearer ID for a PDU session and optionally indicate to the AMF a list of EBIs to be released.

Input information (required): Subscription Permanent Identifier (SUPI), PDU Session ID, Allocation and Retention Priority (ARP) list Input information (optional): Released EBI list.

Output information (required): None.

Output information (optional): a list of <ARP, EBI> pair, <ARP, Cause> pair.

When the consumer NF determines that one or more EBIs are required for EPS QoS mapping for PDU sessions, the consumer NF may invoke Namf_Communication_EBIAAssignment service operation. The ARP list may indicate the number of requested EBIs and the corresponding ARPs. AMF can prioritize EBI requests using ARP list (including ARP priority level, the pre-emption capability and the pre-emption vulnerability) and S-NSSAI. When the number of EBIs reaches the maximum number of EBIs, and a high-priority session requests EBI, the AMF may release (or revoke) EBIs in an ongoing low-priority PDU session. AMF can respond to consumer NF by sending a cause value indicating whether the allocation was successful or not. If the assignment is successful, the AMF may provide a list of <ARP, EBI> pairs to the consumer NF.

If the consumer NF determines that some EBI is not required, the consumer NF may indicate an EBI that can be released in the Released EBI list.

When the SMF requests the AMF to allocate an EBI, the SMF may explicitly or implicitly inform the AMF that the EBI allocation is for a multicast session or a multicast QoS Flow. For example, by including information indicating that it relates to a multicast session or multicast QoS flow in "message sent to AMF to request EBI allocation", SMF may inform the AMF that the EBI assignment is for a multicast session or a multicast QoS flow. Alternatively, the SMF may include the Multicast Session ID instead of the PDU Session ID in the "message sent to the AMF to request EBI assignment", such that the SMF may inform the AMF that the EBI assignment is for a multicast session or a multicast QoS flow. Or, the SMF through an operation such as using a new service operation for EBI allocation of Multicast QoS Flow, SMF may inform the AMF that the EBI assignment is for a multicast session or a multicast QoS flow.

As an example, when the conventional Namf_Communication_EBIAssignment service operation is extended and used. The SMF may transmit a request message such as, for example, a Namf_Communication_EBIAssignment Request message (including Multicast Session ID and ARP list) to the AMF.

Additionally, when the SMF requests the AMF to allocate an EBI, the SMF may include the PDU Session ID of the PDU Session used when the UE joins the multicast session/group/service in the request message transmitted to the AMF. Hereinafter, the PDU Session ID of the PDU Session used when the UE joins the multicast session/group/service will be referred to as a "Linked PDU Session ID (or Associated PDU Session ID)". The Linked PDU Session ID (or Associated PDU Session ID) transmitted when the SMF requests EBI allocation from the AMF is not the PDU Session ID of the PDU Session used when the UE joins the multicast session/group/service, but the multicast session/group/service/QoS Flow may be the PDU Session ID of the associated PDU Session. This may mean that the PDU Session used by the UE to transmit the join request and the PDU Session used to transmit the traffic of the joined multicast service may be different from each other. The PDU Session associated with the multicast session/group/service/QoS Flow may mean a PDU Session to be used when moving the Multicast QoS Flow from 5GS to EPS. This may apply throughout the description of the disclosure herein.

For reference, the following steps 3) to 6) may be conditionally performed only when AMF needs to revoke an EBI previously allocated to the UE, in order to provide a new SMF request of EBI for the same UE. For the description of steps 3) to 6) below, basically refer to the contents described in steps 3) to 6) of FIG. 13a, hereinafter, parts different from steps 3) to 6) of FIG. 13a will be mainly described.

3) When there is no EBI available to the AMF, and the AMF needs to revoke the EBI that has already been allocated, the AMF may additionally consider whether the QoS Flow is a QoS Flow for multicast service/session. For example, if the QoS Flow for which EBI allocation is requested is a QoS Flow for multicast service/session, the AMF may consider the priority of QoS Flow for multicast service/session higher than that of unicast QoS Flow. Therefore, if there are multicast QoS Flow and unicast QoS Flow among QoS Flows assigned to EBI, among them, it can be considered to make available EBI by revoking EBI for unicast QoS Flow.

7) AMF may allocate EBI (eg, AMF may allocate EBI for Multicast QoS Flow). In this case, the AMF may store the corresponding multicast session identification information, EBI allocated together with the SMF address (or SMF ID) and multicast QoS flow information (allocation and retention priority (ARP) information or pair information of ARP, etc.). In addition, when the SMF additionally transmits the Linked PDU Session ID (or Associated PDU Session ID) to the AMF in step 2) described above, the AMF may also store Linked PDU Session ID (or Associated PDU Session ID) together. Alternatively, the AMF may store all information (eg, multicast session identification information, EBI allocated with SMF address (or SMF ID), multicast QoS flow information (ARP (allocation and retention priority) information or ARP pair information, etc.) and Linked PDU Session ID (or Associated PDU Session ID) as part of the context of this PDU Session.

SMF may be allocated EBI for Multicast QoS Flow from AMF. The SMF may store the corresponding Multicast Session identification information, and may also store the allocated EBI and ARP pair information. In addition, the SMF may also store information (eg, Multicast QoS Flow ID, etc.) on the Multicast QoS Flow to which the EBI is assigned. In addition, the SMF may also store Linked PDU Session ID information.

8-9) Refer to steps 8) to 9) of FIGS. 13a and 13b.

The following description of steps 9a) or 9b) will basically refer to the contents described in 9a) or 9b) of FIG. 13a, and the following description will be focused on parts different from those of 9a) or 9b) of FIG. 13a.

After the SMF has successfully allocated the EBI from the AMF, in order to transmit EBI information to the UE and the RAN, the SMF may generate a NAS message and an N2 message, and may transmit the generated NAS message and the N2 message to the AMF. The SMF may perform an operation of transmitting a NAS message and an N2 message in the same manner as in the prior art. The PDU Session ID (ie, Linked PDU Session ID) of the PDU Session associated with the Multicast QoS Flow may be explicitly or implicitly included in the messages (eg, NAS message and N2 message). These descriptions may equally apply throughout the disclosure of this specification.

10) Refer to step 10) of FIG. 13b.

2-2. Second Example of the Second Disclosure of the Present Specification

In a first example of the second disclosure of the present specification, the SMF may be MB-SMF.

1) Step 1) may be replaced with a step of initiating a multicast service for the UE. For example, step 1) of FIGS. 15a and 15b may be replaced with a step of initiating a multicast service for the UE. As an example, step 1) may be replaced with steps (eg, steps 1) to 5) of FIGS. 14a and 14b) performed before the SMF requests the AMF to allocate an EBI in the procedure according to the example of FIGS. 14a and 14b.

2) The SMF may set the PDU session ID used when requesting EBI allocation to the AMF as the PDU Session ID of the PDU Session used when the UE joins the multicast session/group/service. In step 2), the SMF may transmit a request message to the AMF to request EBI allocation. Here, the request message may include the PDU Session ID of the PDU Session used when the UE joins the multicast session/group/service. As described in the first example of the second disclosure of the present specification, the PDU Session ID of the PDU Session used when the UE joins the multicast session/group/service may be referred to as "Linked PDU Session ID (or Associated PDU Session ID)".

For example, the SMF may transmit a request message such as a Namf_Communication_EBIAssignment Request message (including PDU Session ID and ARP list) to the AMF. Here, the PDU Session ID may be a Linked PDU Session ID (or Associated PDU Session ID).

Additionally, when the SMF requests EBI allocation from the AMF, the SMF may additionally include information indicating that it is a request for a multicast service/session or a multicast QoS flow in a request message (eg, a request message transmitted by the SMF to the AMF).

For reference, the following steps 3) to 6) are conditionally performed only when AMF needs to revoke an EBI previously allocated to the UE, in order to provide a new SMF request of EBI for the same UE. For the description of steps 3) to 6) below, basically refer to the contents described in steps 3) to 6) of FIG. 13a, hereinafter, parts different from steps 3) to 6) of FIG. 13a will be mainly described.

3) When there is no EBI available to the AMF, and the AMF needs to revoke the EBI that has already been allocated, the AMF may additionally consider whether the QoS Flow is a QoS Flow for multicast service/session. For example, if the QoS Flow for which EBI allocation is requested is a QoS Flow for multicast service/session, the AMF may consider the priority of QoS Flow for multicast service/session higher than that of unicast QoS Flow. Therefore, if there are multicast QoS Flow and unicast QoS Flow among QoS Flows assigned to EBI, among them, it can be considered to make available EBI by revoking EBI for unicast QoS Flow. 7) AMF may allocate EBI (eg, AMF may allocate EBI for Multicast QoS Flow). In this case, the AMF may store the corresponding PDU Session ID and SMF address (or SMF ID), and may store the allocated EBI and ARP pair information.

SMF may be allocated EBI for Multicast QoS Flow from AMF. The SMF may store a corresponding Linked PDU Session ID (or Associated PDU Session ID), and may store allocated EBI and ARP pair information. In addition, the SMF may additionally store one or more pieces of information among Multicast Session identification information to which EBI is assigned, information about Multicast QoS Flow (eg, Multicast QoS Flow ID, etc.), or information indicating that the assigned EBI is for multicast session/service.

8-9) Refer to steps 8) to 9) of FIGS. 13A and 13B.
9a) or 9b) Reference is basically made to step 9a) or 9b) of FIG. 13b.
10) Refer to step 10) of FIG. 13B.

3. Third Disclosure of the Present Specification

In the third disclosure of the present specification, an example of an operation performed when moving from 5GS to EPS is described. For example, an example of an operation performed when a UE moves from 5GS to EPS is described.

Hereinafter, with reference to the first example and the second example of the third disclosure of the present specification, when the first example of the second disclosure of the present specification is performed and the first example or the second example of the second disclosure of the present specification is performed An example of the operation according to each case will be described.

3-1. A First Example of the Third Disclosure of the Present Specification

A first example of the third disclosure of the present specification describes an example of an operation performed when the UE moves from 5GS to EPS when the first example of the second disclosure of the present specification described above is applied.

AMF performs an operation to move EBI-allocated Multicast QoS Flow(s) from 5GS to EPS. The operation for moving the EBI-allocated Multicast QoS Flow(s) from 5GS to the EPS may include the operation of the AMF acquiring the SM context for the EBI-allocated Multicast QoS Flow(s) from the SMF.

The operation for moving the Multicast QoS Flow(s) to which EBI is assigned from 5GS to EPS may include operations as in the example below:

i) The AMF may perform step 2) of the procedure according to the example of FIGS. 12a and 12b above with PGW-C+SMF (used in combination with SMF in the disclosure of this specification) corresponding to the Multicast Session (Multicast Session of UE) to which EBI(s) is assigned. As previously described in the first example of the second disclosure of the present specification, the AMF may know Linked PDU Session ID (or Associated PDU Session ID) information. In this case, if there is a QoS Flow with EBI assigned for this PDU Session, AMF instead of separately performing SM context request for multicast QoS flow to which EBI is assigned, the AMF may perform the SM context request for the multicast QoS flow to which the EBI is assigned together with the SM context request for the PDU Session.

ii) Or in parallel with step 2) or after step 2) of the procedure according to the example of FIGS. 12a and 12b, AMF requests SM context for Multicast QoS Flow(s) to which EBI is assigned to SMF, the AMF may acquire the SM context for the Multicast QoS Flow(s) to which the EBI is assigned from the SMF.

In order for the AMF to request the SM context and perform the operation to obtain the SM context, the conventional Nsmf_PDUSession_ContextRequest service operation may be extended and used, or a new service operation may be defined and used.

When AMF requests SM context from SMF (eg, when AMF sends a message requesting SM context to SMF), AMF may include UE identification information (eg, SUPI, Permanent Equipment Identifier (PEI), etc.) in a message transmitted to the SMF.

3-2. Second Example of the Third Disclosure of the Present Specification

The second example of the third disclosure of the present specification describes an example of an operation performed when the UE moves from 5GS to EPS when the first example or second example of the second disclosure of the present specification described above is applied.

AMF may request SM context from SMF. The SMF may provide the SM context (eg, Packet Data Network (PDN) Connection Context) requested from the AMF to the AMF. In this case, the SMF may transform the SM context for Multicast QoS Flow(s) into QoS information applicable to unicast-based communication (eg, transmission) and provide it to the AMF. This is because, in EPS, traffic must be transmitted in a unicast method rather than a multicast method. For this reason, when SMF requires modification and/or processing for QoS Flow (eg, Multicast QoS Flow(s) in 5GS) in accordance with the unicast transmission method, SMF transforms and/or processes the SM context for Multicast QoS Flow(s) into QoS information applicable to unicast-based communication (eg, transmission), such that the SMF may provide SM context to AMF. For example, SMF uses the 5G QoS Identifier (5QI) value of the Multicast QoS Flow as it is, instead of using the QoS Class Identifier (QCI) value, SMA may replace (or transform) the 5QI value of the Multicast QoS Flow with a QCI value suitable for (applicable) unicast transmission.

In order to allow multicast traffic to be transmitted in a unicast manner to the UE moving to the EPS, SMF may perform an operation to change the path through which multicast traffic is transmitted. For example, because multicast traffic was transmitted in the multicast method in 5GS, a shared tunnel/resource between UEs may be used between UPFs and between UPF and NG-RAN. In EPS, multicast traffic must be transmitted to the UE through the UE's PDN connection, the SMF may enable this through the setting of PGW-U+UPF. That is, through configuration of PGW-U and/or UPF, so that multicast traffic may be transmitted to the UE through the PDN connection of the UE, the SMF may perform an operation to change the path through which multicast traffic is transmitted can be performed.

The AMF may request the PDN Connection Context from the SMF based on the SM context. As the AMF requests the PDN Connection Context as the SM context, the SMF may know that the UE moves from 5GS to the EPS, so the SMF may perform the operation described in the second example of the third disclosure of this specification.

4. Fourth Disclosure of the Present Specification

In the fourth disclosure of the present specification, an example of EBI revocation for Multicast QoS Flow will be described.

The operation of releasing the EBI allocated for the Multicast QoS Flow may be performed in the following cases:

When the UE requests leave for multicast session/group/service or after the UE processes leave for multicast session/group/service When QoS Flow to which EBI is assigned is removed from multicast session When multicast session/service including QoS Flow to which EBI is assigned is terminated (or removed)

SMF may release EBI allocated for Multicast QoS Flow. When the SMF releases the EBI allocated for the Multicast QoS Flow, the SMF may notify the AMF that the EBI is released.

5. Fifth Disclosure of the Present Specification

In the fifth disclosure of the present specification, an example of performing EBI allocation for Multicast QoS Flow will be described.

Hereinafter, an example of EBI allocation for multicast QoS Flow will be described with reference to the procedure for supporting multicast transmission shown in the example of FIGS. 16a and 16b.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 16B:
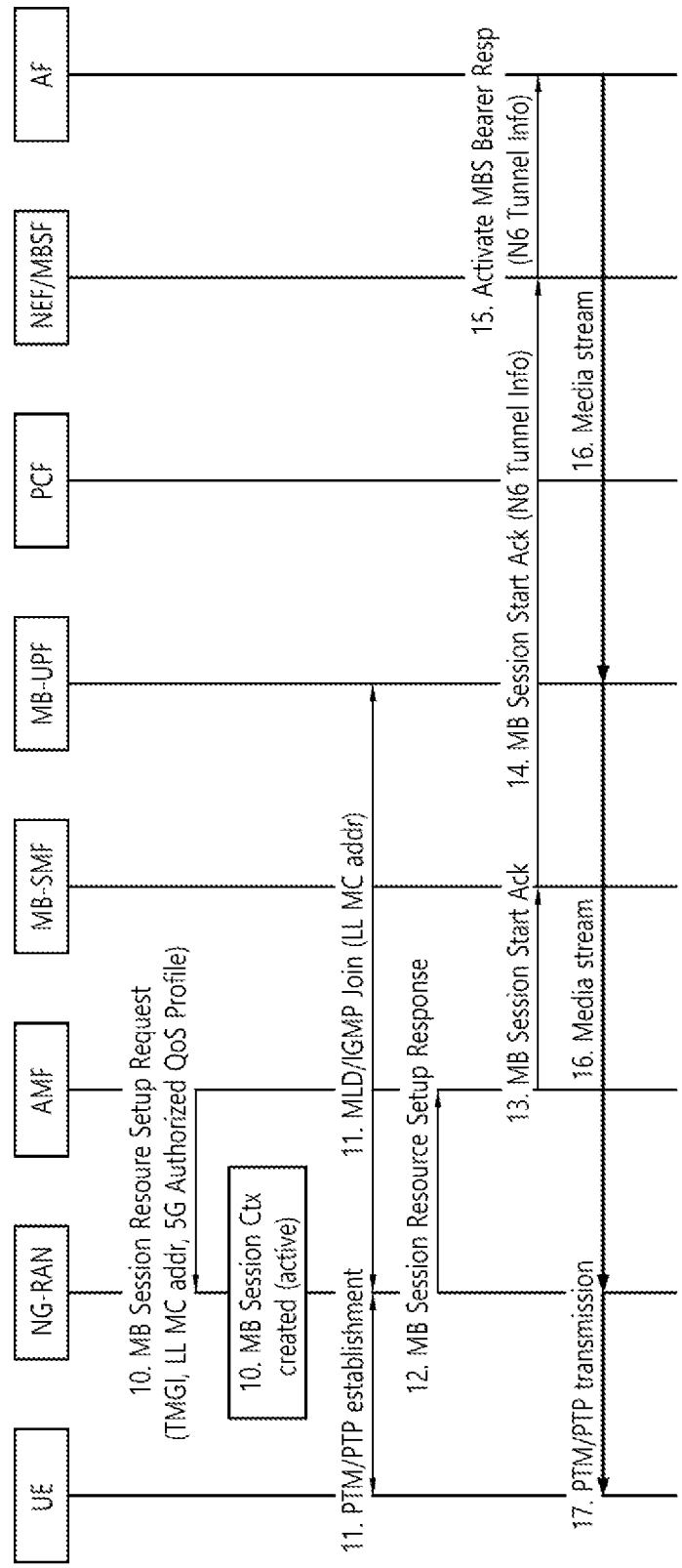

FIGS. 16a and 16b shows an example of the operation of the terminal and the network according to the fifth disclosure of the present specification.

An example shown in FIGS. 16a and 16b will be described as follows.

The example shown in FIGS. 16a and 16b shows an example of a session start procedure for activating a multicast/broadcast (MB) session and starting transmission of multicast/broadcast data.

To activate an MB session and start transmitting multicast/broadcast data, the session start procedure according to the example shown in FIGS. 16a and 16b may be used by AF. While the session initiation procedure is performed, resources for the MB session may be set up in MB-UPF and NG-RAN. MB-UPF may be a UPF used to transmit traffic related to multicast and broadcast communication to the NG-RAN.

The UE, NG-RAN, AMF, etc. may be in a state that has performed a registration procedure, a group control procedure, and a session join procedure.

1) AF transmits Activate MBS Bearer Request message (including TMGI, HL MC addr, Service Requirement) to NEF/MBSF (Multicast-Broadcast Service Function), AF may request activation of the MB session. AF may allocate a Higher Layer IP Multicast Address (eg, HL MC addr). Service requirements for MB sessions may be included in the Activate MBS Bearer Request message.

2) NEF/MBSF can check whether input parameters (eg, HL MC addr) are valid. NEF/MBSF sets the MB session Context to active. NEF/MBSF may send MB session start message (including Temporary Mobile Group Identity (TMGI), service requirements) to MB-SMF.

3) MB-SMF may transmit a message including TMGI and service requirements for MB session to PCF. PCF allows MB-SMF to send 5G QoS Profile to be use as 5G Authorized QoS Profile for MB session to MB-SMF.

4) MB-SMF may set up N6 resources for MB session in MB-UPF, and MB-SMF may set up N3 resources for transport multicast tunneling by using the LL MC address (Lower Layer Multicast IP Address) allocated for TMGI. Optionally, media reception within MB-UPF may not be tunneled, in this case, MB-SMF also provides the HL MC address, so MB-UPF sends an IGMP/MLD join, MB-SMF may receive (untunneled) IP multicast media stream.

When N6 tunneling is used, MB-UPF allocates N6 tunnel information (eg UDP port and IP address), may transmit N6 tunnel information to MB-SMF. MB-SMF stores the received information in MB Session Context.

5) MB-SMF may set MB session context to active and transmit an MB session start message (including TMGI, LL MC addr, 5G Authorized QoS Profile) to all AMFs that have previously joined the MB session.

When the AMF receives the MB session start message, the AMF may set the MB session context to an active state. AMF may perform steps 6) and 10) in parallel.

6) If there is Connection Management (CM)-IDLE UE participating in MB session to AMF, AMF may perform group paging in the registration area of the CM-IDLE UE. For example, AMF may include a Group Paging Identity (eg TMGI) in a Paging message. The NG-RAN node may trigger group paging.

7-9) UE may respond to group paging. For example, the UE may respond to the group paging by sending a UL NAS MB session join request message (eg, TMGI) to the AMF. In one example, the UE transmits a UL NAS MB session join request message (eg, TMGI) to the AMF to the AMF, the AMF may send a DL NAS MB session join acceptance message to the UE. For example, the AMF may transmit an MB session join message (including NGAP ID and TMGI) to the NG-RAN through the N2 interface.

10) AMF may transmit MB Session Resource Setup Request message (TMGI, LL MC, 5G Authorized QoS Profile) to all RAN nodes where CM CONNECTED UEs subscribed to TMGI reside. NG-RAN can create MB session context (if it does not already exist), set MB session context to 'active' state, and store TMGI, QoS profile and AMF ID list in MB session context. When the NG RAN node receives multiple MB session resource establishment request messages for the same TMGI (eg, when NG-RAN receives from multiple connected AMFs), the NG-RAN stores each sender AMF ID in the MB session context, and may perform step 11) once (instead, step 11) may be continued in step 12).

11) NG-RAN joins a multicast group (eg, LL MC addr), the NG-RAN may establish a point-to-multipoint (PTM) or point-to-point (PTP) DL resource for an MB session. If there is a UE in CM-Connected state with RRC_INACTIVE state with TMGI in UE Context, the NG-RAN may perform a network triggered transition from RRC_INACTIVE to RRC_CONNECTED for the corresponding UE.

12) NG-RAN may report successful establishment of MB session resource by sending an MB session resource establishment response message (eg, including TMGI) to the AMF.

13) AMF may transmit MB session start Ack message (eg, including TMGI) to MB-SMF to MB-SMF.

For reference, the AMF may transmit an Ack for each response received from the NG-RAN node (eg, useful for small MCPTT areas). That is, steps 13) to 15) may be repeated several times (once for each NG RAN node). AMF may also use an upper limit on the number of ACKs transmitted, and if the number of RAN acks exceeds the limit (eg upper limit), AMF can fallback to aggregated Acks (to reduce signal load). In other words, AMF can collect status from all or several downstream nodes (with timeouts) and then create an aggregated report.

14-15) MB-SMF may transmit an MB Session Start Ack (MGI) message (eg, including TMGI) to the NEF/MBSF. If it has not yet been provided to AF, N6 tunnel information may be included in a message transmitted by MB-SMF. The NEF/MBSF may transmit an MBS bearer activation response including N6 tunnel information to the AF.

16) The MB session is now active. AF starts sending DL media stream using N6 Tunnel Info, or AF can optionally transmit an untunneled ie IP multicast stream using the HL MC address.

17) The NG-RAN may transmit the received DL media stream to the UE using a DL PTM or PTP resource.

Based on the following options 1 to 3, the fifth disclosure of the present specification will be described. The following options 1 to 3 may be applied based on the example of FIGS. 16a and 16b. For reference, option 1 to option 3 may be applied independently, or at least one of option 1 to option 3 may be applied in combination.

1) Option 1

When AMF receives information about Multicast QoS Flow (eg QoS Profile, etc.) from MB-SMF, thereafter (ie, after step 5 of FIGS. 16a and 16b), the AMF may determine the EBI allocation for the Multicast QoS Flow for the corresponding UE. In this case, in the prior art, as the SMF requests the AMF to allocate EBI for QoS Flow, although the AMF does the EBI assignment, in the fifth disclosure of the present specification, unlike the prior art, the AMF may initiate EBI allocation.

When the AMF allocates the EBI, the AMF may store the related information (eg MB-SMF information, multicast service/session information, multicast QoS flow information (ARP information, etc.), allocated EBI information, etc.) in the UE context. Additionally, the AMF may provide information on the allocated EBI to the UE and the NG-RAN.

Then, when the UE moves from 5GS to EPS, The AMF may obtain the MB-SMF by requesting the SM Context for moving to the EPS (eg, interworking between 5GS and EPS) for the Multicast QoS Flow to which the EBI is allocated.

2) Option 2

MB-SMF may generate or obtain QoS/context information for Multicast QoS Flow (from PCF, etc.). MB-SMF may perform AMF and EBI assignment after generating or acquiring QoS/context information for Multicast QoS Flow. Or after receiving a join message for multicast service (e.g. IGMP or NAS signaling) from the terminal, MB-SMF may perform AMF and EBI allocation. For example, after step 3) of FIGS. 16a and 16b is performed, MB-SMF may perform AMF and EBI allocation.

By MB-SMF and AMF, EBI can be allocated for Multicast QoS Flow. In this case, in order to provide the UE with information on the EBI allocated for the Multicast QoS Flow, MB-SMF or AMF may send a NAS message to the UE. In addition, in order to provide EBI information to the NG-RAN, MB-SMF or AMF may also transmit an N2 message while transmitting the NAS. At this time, MB-SMF uses one of the pre-made (or established) PDU Sessions for unicast (e.g., using a unicast PDU Session ID), MB-SMF may transmit EBI information (eg, information on EBI allocated for Multicast QoS Flow) to UE and/or NG-RAN. Here, the Unicast PDU Session may be a PDU session separately created (or established) by the UE for the multicast service (it may be a PDU session created (or established) after the UE registers with 5GS), or it may be a PDU session used for other services (the Unicast PDU Session may be the PDU session created after the UE registers with 5GS, which could be, for example, a PDU session for Internet service). If an SMF other than MB-SMF manages the Unicast PDU Session, the MB-SMF may obtain (or established) PDU session information for the UE from UDM. Based on the PDU session information obtained from the UDM, MB-SMF may select a unicast PDU Session to transmit multicast data based on operator policy.

After AMF allocates EBI for Multicast QoS Flow, AMF may store information (eg, MB-SMF information, Multicast service/session information, Multicast QoS Flow information (ARP information, etc.), associated unicast PDU Session information, allocated EBI information, etc.) related to EBI allocated for Multicast QoS Flow in UE context.

Afterwards, when the UE moves from 5GS to EPS, the AMF may request and obtain the SM Context for moving (e.g. interworking between 5GS and EPS) to the EPS for the Multicast QoS Flow to which the EBI is assigned from the MB-SMF.

3) Option 3

When moving the multicast session/service/QoS Flow for one of the PDU Sessions created (or established by the UE) (this may be interpreted as the UE's DNN+S-NSSAI, where DNN+S-NSSAI may mean the combination of DNN and S-NSSAI used by the UE to create the PDU Session) from 5GS to EPS, the contents described in Option 3 may be applied. Here, this PDU session may be referred to as a Linked PDU Session. It may be determined which PDU Session corresponds to the Linked PDU Session among the PDU Sessions generated by the UE, based on local configuration/policy of 5GC, operator policy, subscriber information, type/characteristics of multicast service, and the like.

When the SMF serving the PDU Session generates a multicast session/QoS Flow corresponding to the PDU Session, the SMF may subscribe (or request) the AMF to notify the SMF of these events (e.g., create multicast session/QoS Flow corresponding to PDU Session).

When the event (eg, multicast session/QoS Flow corresponding to PDU Session is generated) occurs, the AMF may notify the SMF of this. For example, after step 5 of FIGS. 16a and 16b is performed, if the event (eg, multicast session/QoS Flow corresponding to PDU Session is generated) occurs, the AMF may notify the SMF. At this time, the AMF may provide information about the Multicast QoS Flow to the SMF.

The SMF may request the AMF to allocate EBI for Multicast QoS Flow. For details related to EBI allocation, refer to the second disclosure of the present specification described above.

When EBI is allocated for Multicast QoS Flow, SMF or AMF may transmit a NAS message to the UE in order to provide the UE with EBI information allocated for Multicast QoS Flow.

When the AMF allocates the EBI, the AMF may store Information related to this (eg, SMF information, Multicast service/session information, Multicast QoS Flow information (ARP information, etc.), EBI information allocated, PDU Session information corresponding to Multicast service/session (ie, Linked PDU Session ID), etc.) in the UE context.

Then, when the UE moves from 5GS to EPS, the AMF may request and obtain the SM Context for moving to EPS (eg, interworking between 5GS and EPS) for the Multicast QoS Flow to which the EBI is assigned from the SMF.

6. Sixth Disclosure of the Present Specification

In the sixth disclosure of the present specification, a method for supporting EPS interworking (eg, interworking between 5GS and EPS) in NW-level (Network-level) will be described.

The network may inform the UE whether the network supports interworking between EPS and 5GS. Based on whether the network supports interworking between EPS and 5GS, when moving between EPS/5GS (eg, moving from EPS to 5GS or moving from 5GS to EPS), the UE may determine whether the NW supports interworking or should support interworking at the application level. While the terminal performs the Registration procedure and/or Attach procedure, the network may inform the UE of whether the network supports interworking between EPS and 5GS through network capability information. Or when the UE establishes (or creates) a PDU Session or PDN connection for multicast (e.g. a session using a specific DNN, S-NSSAI or APN), the network may inform the UE of whether the network supports interworking between EPS and 5GS through SM signaling. In this case, different APN, DNN, and S-NSSAI may be used for each multicast, and different values may be set for each session. For example, PDU Session #1 may be used for multicast #1, and PDU Session #2 may be used for multicast #2. In this situation, a value may be set such that interworking between EPS and 5GS is supported for PDU Session #1, and interworking between EPS and 5GS is not supported for PDU Session #2.

The network informs the UE whether EPS interworking (eg, interworking between EPS and 5GS) is supported, the network may also inform whether interworking between EPS and 5GS is supported at any level (eg, core network-level/service-level/application-level, etc.). For example, in the case of core network-level interworking, through operations such as EBI allocation, the network may inform the UE that the network supports HO (handover) between EPS/5GS and the like. In the case of service-level interworking, the UE may be informed that the network is providing a service through the same TMGI between EPS and 5GS. Based on information on whether to support interworking between EPS and 5GS in core network-level interworking and/or service-level interworking, etc., the UE may know that the UE can receive service through broadcast in EPS and multicast service in 5GS. In the case of application-level interworking, since the network may not support operations related to application-level interworking, interworking can also be performed by directly creating a unicast session in the application of the terminal.

7. Seventh Disclosure of the Present Specification

The seventh disclosure of the present specification describes content that may be applied throughout the disclosure of the present specification. For example, the content described in the seventh disclosure of the present specification may be applied in combination with at least one or more of the first to sixth disclosures of the present specification described above.

In the first disclosure of the present specification, content related to EBI allocation has been described. However, this is merely an example, and the contents described in the first disclosure of the present specification may be applied as follows. For example, the operation of allocating an EBI in the first disclosure of the present specification may be interpreted as that the SMF corresponding to the following example performs EBI allocation operation for AMF and Multicast QoS Flow. Here, SMF may be i) SMF that knows information about Multicast QoS Flow for providing multicast service to UE, or SMF may be ii) SMF that provides information/context/profile (which includes information on Multicast QoS Flow) about multicast session to NG-RAN to provide multicast service to UE, or, the SMF may be iii) an SMF that receives/processes a Join request for a multicast service (or multicast group) from the UE.

In the disclosure of this specification, when the UE requests a join for multicast session/group/service, the UE may use a NAS message (eg, NAS signaling) transmitted to the SMF. Or, when the UE requests a join for multicast session/group/service, the UE may also request a join through the user plane to UPF. In the latter case, the UPF informs the SMF that the UE has requested a join for multicast session/group/service, the SMF may recognize the join request of the UE.

Instead of EBI assignment for Multicast QoS Flow, EBI allocation may be performed for a Unicast QoS Flow corresponding to a Multicast QoS Flow. For example, when SMF creates a Multicast QoS Flow, in case it is impossible to transmit multicast traffic using the multicast method in the future (eg, when NG-RAN does not support multicast/MBS transmission, or when the UE moves from 5GS to EPS, etc.), SMF can create Unicast QoS Flow corresponding to Multicast QoS Flow in advance. In the above, the SMF may be MB-SMF, the former SMF may be MB-SMF, and the latter SMF may be an SMF serving a linked PDU Session. In this case, the operation of allocating EBI for Multicast QoS Flow by SMF and/or AMF in the disclosure of the present specification may be considered to allocate EBI for the unicast QoS flow (eg, this unicast QoS flow may be referred to as a dummy QoS flow). For example, in the disclosure of this specification, the operation of SMF and/or AMF allocating EBI for Multicast QoS Flow may be replaced with an operation of the SMF and/or AMF allocating an EBI for the unicast QoS flow (eg, this unicast QoS flow may be referred to as a dummy QoS flow). For reference, the unicast QoS flow corresponding to the multicast QoS flow may be referred to as a linked unicast QoS Flow, an associated unicast QoS Flow, a mapped unicast QoS Flow, and the like. As an example, when the description according to the second example of the second disclosure of the present specification described above is applied, the Unicast QoS Flow corresponding to the Multicast QoS Flow may be a QoS Flow belonging to a linked PDU Session (eg, an associated PDU Session). For reference, when SMF and/or AMF allocates EBI for linked unicast QoS Flow (or associated unicast QoS Flow or mapped unicast QoS Flow), when the UE moves from 5GS to EPS, the operation of the AMF and the operation of the SMF may be performed in the same manner as the previously defined operation.

Instead of AMF and/or SMF performing EBI assignment for Multicast QoS Flow, EBI allocation can be performed for Unicast QoS Flow corresponding to Multicast QoS Flow. In this case, an operation related to EBI revocation described in the fourth disclosure of the present specification may be interpreted as an EBI revocation operation for a linked unicast QoS Flow (or associated unicast QoS Flow or mapped unicast QoS Flow) (ie, Unicast QoS Flow corresponding to Multicast QoS Flow). Here, releasing the EBI allocated for the linked unicast QoS Flow (or the associated unicast QoS Flow) may be performed for one or more of the following cases:

When the UE requests leave to a multicast session/group/service that corresponds to/connects with the unicast QoS Flow to which the EBI is assigned, or after the leave is processed;

When the multicast QoS Flow corresponding to the unicast QoS Flow to which the EBI is assigned is removed from the multicast session;

When the multicast session corresponding to/connected with the unicast QoS Flow to which EBI is assigned is terminated/removed; or When A PDU Session (ie, a linked PDU Session or an associated PDU Session) corresponding to/connected to a multicast session/group/service no longer responds/connects to the multicast session/group/service.

When the SMF releases the EBI allocated for the linked unicast QoS Flow (or the associated unicast QoS Flow or the mapped unicast QoS Flow), the SMF may notify the AMF that the allocated EBI is released.

Here, a multicast session corresponding to/associated with a unicast QoS Flow may be interpreted as a multicast session corresponding/associated with a PDU Session to which the unicast QoS Flow belongs. In addition, a multicast session corresponding to/associated with a unicast QoS Flow may be interpreted as a multicast session to which a multicast QoS Flow corresponding to a unicast QoS Flow belongs.

In the disclosure of this specification, when multiple Multicast QoS Flows are generated at the same time, EBI allocation may be performed for all or part of Multicast QoS Flows among a plurality of Multicast QoS Flows.

Hereinafter, a seventh disclosure of the present specification will be specifically described with reference to the examples of FIGS. 17 to 20. For reference, the contents described with reference to the examples of FIGS. 17 to 20 may be applied throughout the disclosure of the present specification (eg, the first to sixth disclosures of the present specification).

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 17 shows an example of the operation of the terminal and the network according to the first example of the seventh disclosure of the present specification.

1) AF (or Content Provider) can perform multicast group configuration in 5GC. For example, AF (or Content Provider) may perform multicast group configuration with network nodes of 5GC such as UDR and MB-SMF. Here, as AF (or Content Provider) provides information on multicast service to 5GC, the multicast group configuration can be interpreted as an operation to create a multicast session for this in 5GC.

For reference, step 1) may be optionally performed. That is, step 1) may not be performed.

For reference, in the disclosure of the present specification, multicast group configuration or multicast session creation may be interpreted as multicast session establishment, multicast session start, and multicast session activation.

2) UE may register with 5GS. And the UE may form (or establish) a PDU Session. For example, the UE may perform a registration procedure and a PDU session establishment procedure.

3) AF (or Content Provider) may notify or inform the UE about the multicast service using a higher layer (eg, using application layer signaling). The notification may include an address or identification information (eg, TMGI, multicast address) of a multicast group to which the UE can join.

For reference, step 3) may be optionally performed. That is, step 3) may not be performed.

4) The UE may transmit a message requesting Join to the multicast group to 5GC. Here, the message requesting Join may include the address or identification information of the multicast group to which the UE wants to join.

A Join request (a message requesting a Join) may be transmitted through the control plane or may be transmitted through the user plane. In the example of FIG. 17, after the PDU Session is formed (or established) by performing step 2), the UE may transmit the Join request (a message requesting a Join) using a PDU Session Modification Request message for this PDU Session. That is, the UE may transmit a PDU session modification request message including a Join request (a message requesting a Join).

For reference, in the example of FIG. 17, the Join request (a message requesting a Join) is included in the PDU session modification request message and transmitted is only an example, the scope of the disclosure of the present specification is not limited by the illustration of FIG. 17. For example, unlike shown in the example of FIG. 17, the UE sends a PDU session establishment request message to form a PDU Session, a Join request (a message requesting a Join) may be included in the PDU session establishment request message.

The UE may transmit a Join request (a message requesting a Join) through the user plane. For example, the UE may transmit a Join request (a message requesting a Join) to the UPF through the formed (or established) PDU Session. Then, the UPF can transmit a Join request (a message requesting a Join) to the SMF.

5) The AMF may receive an SM NAS message including a Join request (eg, a PDU session modification request message or a PDU session establishment request message) from the UE. The AMF may deliver an SM NAS message (eg, a PDU session modification request message or a PDU session establishment request message) including a Join request to the SMF serving the PDU Session.

If the SMF does not have a context related to the multicast group requested to join, steps 6) to 7) may be performed.

6) The SMF may request the UDR for information on MB-SMF serving the multicast group, and obtain information on MB-SMF from the UDR. If step 1) has been performed, the UDR may store information on MB-SMF serving a multicast group through step 1).

Instead of UDR, another NF (eg, NEF, etc.) may store information on MB-SMF serving each multicast group. In this case, the SMF may acquire MB-SMF information by contacting the NF storing the MB-SMF information.

7) SMF may obtain QoS information including information on multicast QoS Flow(s) from MB-SMF.

The SMF may determine a unicast QoS Flow corresponding to the multicast QoS Flow. The unicast QoS Flow corresponding to the multicast QoS Flow may be a QoS Flow belonging to the PDU Session used when the UE requests a Join. The operation in which the SMF determines a unicast QoS Flow corresponding to the multicast QoS Flow may be interpreted as an operation in which the SMF maps QoS information of the multicast QoS Flow to QoS information of the unicast QoS Flow. Alternatively, the operation in which the SMF determines a unicast QoS Flow corresponding to the multicast QoS Flow may be interpreted as an operation in which the SMF creates (or adds) a unicast QoS Flow corresponding to the multicast QoS Flow. The QoS information may include one or more of QoS parameters and QoS characteristics.

The SMF may acquire QoS information including information on multicast QoS Flow(s) from other NFs (eg, PCF, etc.) other than MB-SMF. Alternatively, the SMF may be an SMF serving the multicast session. That is, since the SMF supports a function of serving a multicast session as well as a function of serving a PDU session, the SMF and MB-SMF shown in FIG. 17 may be the same SMF.

Instead of the SMF determining the unicast QoS Flow corresponding to the multicast QoS Flow, the SMF may receive unicast QoS Flow information corresponding to the multicast QoS Flow from the MB-SMF. Alternatively, the SMF may be provided with unicast QoS Flow information corresponding to a multicast QoS Flow through interaction with another NF (eg, PCF).

An operation of SMF determining a unicast QoS Flow corresponding to a multicast QoS Flow may be performed based on operator's policy, local configuration of NF (e.g. SMF) that performs this, subscriber information of UE, location of UE, service area of multicast session (e.g., if multicast is local multicast serviced only in a specific area, multicast is serviced in a specific area) region) and the like. For example, if the SMF determines that MBS cannot transmit in the future multicast transmission method/form, in preparation for this, the SMF may determine a unicast QoS Flow corresponding to a multicast QoS Flow. Here, cases in which it is determined that the MBS cannot transmit in the future multicast transmission method/form may be, for example, i) when all NG-RANs do not support multicast/MBS transmission, ii) when the UE is likely to move from 5GS to EPS, iii) In the case of local multicast, the serviced area may include an NG-RAN that does not support multicast/MBS transmission or may be outside of 5GS coverage.

8) The SMF may request the AMF to allocate EBI for unicast QoS Flow(s) corresponding to multicast QoS Flow(s). For example, the SMF may transmit a message requesting EBI assignment (eg, a Namf_Communication_EBIAssignment Request message) to the AMF.

9) AMF may allocate EBI for unicast QoS Flow(s) corresponding to multicast QoS Flow(s). In addition, the AMF may provide information on the allocated EBI to the SMF. For example, the AMF may transmit a response message (eg, a Namf_Communication_EBIAssignment Response message) including information on the allocated EBI to the SMF.

10) SMF may transmit an SM NAS messages (such as PDU session modification command message or PDU session establishment acceptance message, etc.) including information on unicast QoS Flow(s) corresponding to multicast QoS Flow(s) to the UE. In addition, the SMF may transmit N2 SM information including information on the unicast QoS Flow(s) corresponding to the multicast QoS Flow(s) to the NG-RAN. The information on the unicast QoS Flow(s) may include EBI information allocated for the unicast QoS Flow(s) corresponding to the multicast QoS Flow(s).

For example, the SMF may transmit an SM NAS message and a message including N2 SM information (eg, an Nsmf_PDUSession_UpdateSMContext Response message) to the AMF.

In the example of FIG. 17, Nsmf_PDUSession_UpdateSMContext Response is shown as an example of a message including an SM NAS message and N2 SM information, but the scope of the disclosure of the present specification is not limited by the illustration of FIG. 17. For example, unlike the example of FIG. 17 (Nsmf_PDUSession_UpdateSMContext Response), another message (eg, Namf_N1N2MessageTransfer) may be used.

A message transmitted by the SMF to the AMF in step 10 (this message may include an SM NAS message and/or N2 SM information) may include information about a multicast session.

11) The AMF may transmit a message (eg, including an SM NAS message and N2 SM information) received from the SMF to the NG-RAN.

12) NG-RAN may transmit an SM NAS message to the UE.

Hereinafter, in the second example of the seventh disclosure of the present specification, an example in which the UE leaves the multicast group will be described with reference to the example of FIG. 18.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 18:
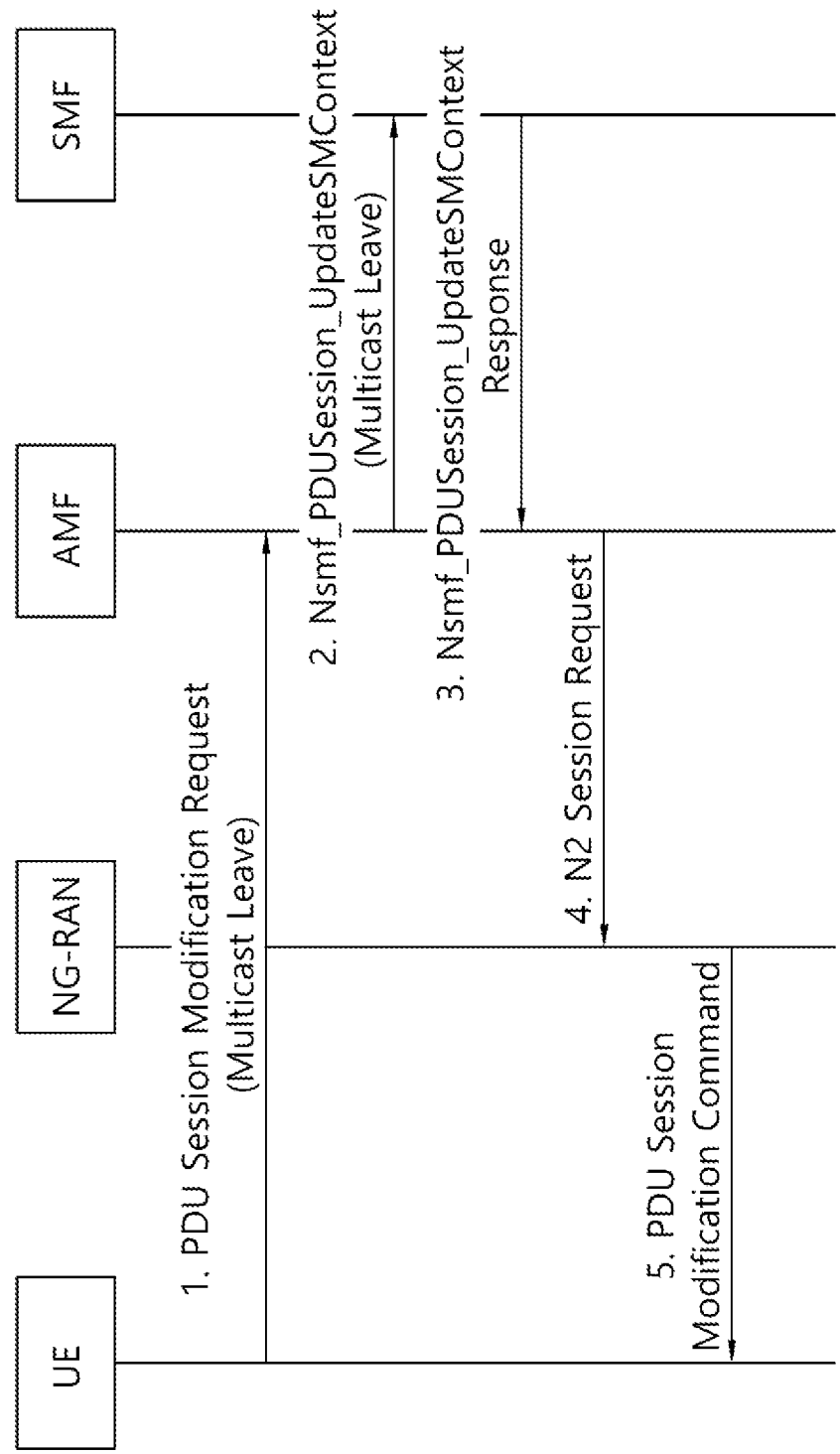
FIG. 18 shows an example of operation of a terminal and a network according to a second example of the seventh disclosure of the present specification.

FIG. 18 shows an example of operation of a terminal and a network according to a second example of the seventh disclosure of the present specification.

In the example of FIG. 18, it is assumed that the UE joins a multicast group and receives a multicast service.

1) The UE may decide to leave the multicast group. If the UE decides to leave the multicast group, the UE transmits a message requesting leave for the multicast group to 5GC. The leave request (eg, a message requesting leave) may include information related to a multicast group, such as an address and/or identification information of a multicast group that the UE intends to leave.

The leave request (eg, a message requesting leave) may be transmitted through a control plane or a user plane. FIG. 18 illustrates an example in which the UE transmits a PDU Session Modification Request message including a leave request (eg, a message requesting leave).

However, this is only an example, and the scope of the disclosure of the present specification is not limited by the example of FIG. 18. For example, unlike the example of FIG. 18 in which a PDU Session Modification Request message including a leave request (eg, a message requesting leave) is transmitted, while the UE sends a PDU Session Release message to release the PDU Session, the UE may include a Leave request in the PDU session release message. In this way, when the UE requests the release of the PDU Session while requesting the leave of the multicast group, it may be regarded as a case in which the PDU Session corresponding to/connected to the multicast session/group/service no longer corresponds/connected to the multicast session/group/service The UE may transmit a leave request (eg, a message requesting leave) through the user plane. For example, the UE may transmit a Leave request (eg, a message requesting leave) to the UPF. Then, the UPF can deliver a leave request (eg, a message requesting leave) to the SMF.

2) The AMF may deliver an SM NAS messages (eg, including PDU session modification request message or PDU session release request message, etc.) including a leave request (eg, a message requesting leave) received from the UE to the SMF serving the PDU Session.

3) The SMF may determine the removal (or release) of the unicast QoS Flow(s) corresponding to the multicast QoS Flow(s) configuring the multicast session for which the UE has requested leave. When the EBI is allocated to the unicast QoS Flow(s) to be removed (or released), the SMF may release the allocated EBI.

The SMF may transmit a message including information on the released EBI to the AMF. In the example of FIG. 18, the Nsmf_PDUSession_UpdateSMContext Response message is used, but this is only an example, and the scope of the disclosure of the present specification is not limited by the example of FIG. 18. For example, instead of the Nsmf_PDUSession_UpdateSMContext Response message, another message (eg, Namf_N1N2MessageTransfer) may be used.

The SMF may transmit an SM NAS message (eg, a PDU session modification request message or a PDU session release request message) including information on the removed/released unicast QoS Flow(s) to the UE. In addition, the SMF may transmit N2 SM information including information on the removed/released unicast QoS Flow(s) to the NG-RAN.

For example, when the SMF transmits a message including information on the released EBI to the AMF, the SMF may include the SM NAS message and the N2 SM information in the message transmitted to the AMF.

A message transmitted by the SMF to the AMF (this message may include an SM NAS message and/or N2 SM information) may include information on a multicast session that the UE leaves.

Alternatively, the SMF may separately perform an operation for notifying the information on the released EBI to the AMF and an operation for transmitting an SM NAS message/N2 SM information to the NG-RAN.

If the unicast QoS Flow corresponds to a multicast session other than the multicast session requested by the UE to leave (example: When one unicast QoS Flow corresponds to a multicast QoS Flow for another multicast session), the SMF may decide not to remove/release the unicast QoS Flow. In this case, since the unicast QoS Flow is continuously maintained, the SMF may not release the EBI allocated to the unicast QoS Flow. In this case, the SMF does not need to inform the AMF of the information about the EBI release.

Instead of determining the removal/release of the unicast QoS Flow(s) corresponding to the multicast QoS Flow(s) configuring the multicast session for which the SMF requested leave, the SMF, the SMF may be provided with information related to removal/release of unicast QoS Flow(s) corresponding to multicast QoS Flow(s) from MB-SMF. Alternatively, the SMF may be provided with the information (information related to removal/release of unicast QoS Flow(s) corresponding to multicast QoS Flow(s)) through interaction with other NFs (eg, PCF, UDR).

4) The AMF may transmit the message received from the SMF to the NG-RAN. For example, the AMF may transmit an N2 session request message (including an SM NAS message and/or N2 SM information) including a message received from the SMF to the NG-RAN.

When the SMF provides the information on the released EBI to the AMF, the AMF may perform the EBI release. For example, the AMF may delete EBI allocation information from the corresponding PDU Session.

5) The NG-RAN may transmit an SM NAS message (eg, a PDU session modification command message) to the UE.

Hereinafter, in a third example of the seventh disclosure of the present specification, an update related to a QoS flow will be described with reference to the example of FIG. 19.

The following drawings were created to explain a specific example of the present specification. Since the names of specific devices described in the drawings or the names of specific signals/messages/fields are presented by way of example, the technical features of the present specification are not limited to the specific names used in the following drawings.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 19:
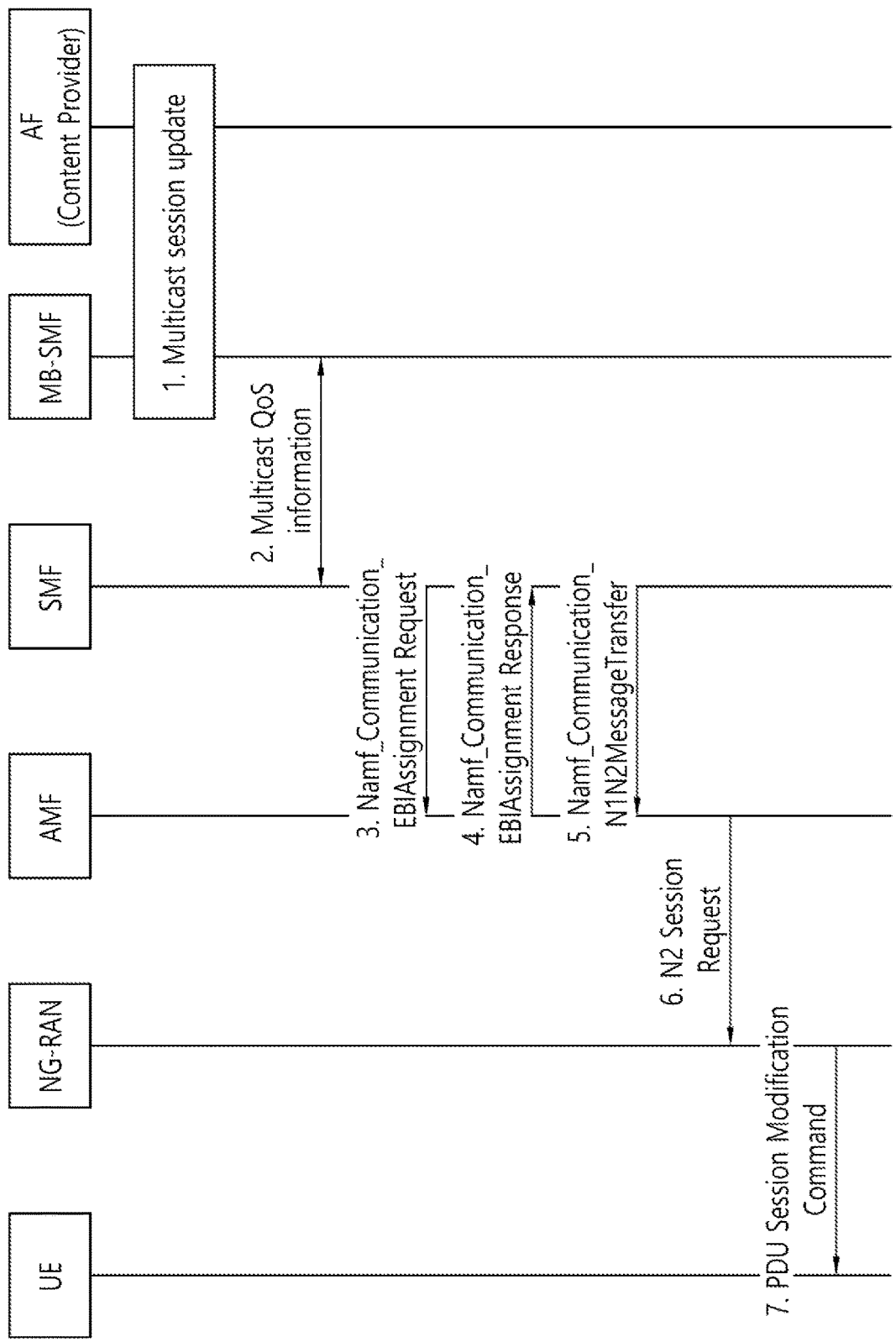
FIG. 19 shows an example of operation of a terminal and a network according to a third example of the seventh disclosure of the present specification.

FIG. 19 shows an example of operation of a terminal and a network according to a third example of the seventh disclosure of the present specification.

In the example of FIG. 19, it is assumed that the UE joins a multicast group and receives a multicast service.

1) AF (or Content Provider) can perform multicast session update procedure with 5GC. As AF (or Content Provider) provides update information for multicast service to 5GC, the multicast session update procedure may be to update the multicast session for the multicast service in 5GC. In particular, in the third example of the seventh disclosure of the present specification, it is assumed that an update related to a QoS flow occurs. When the multicast session update procedure is performed, some of the multicast QoS Flows constituting the multicast session may be removed or released. Such QoS update may not be performed by input (or request) of AF (or Content Provider). For example, instead of the AF (or content provider) performing update, QoS update for multicast session may be determined or performed within 5GC.

2) The SMF may obtain information that one or more multicast QoS Flows have been removed/released from the MB-SMF in the multicast session. As such, in order for the SMF to be notified of the update status of the multicast session from MB-SMF, the SMF may subscribe to a service that notifies the update status of the multicast session provided by the MB-SMF (eg, the update status may include termination of the multicast session). For example, after step 7) in the example of FIG. 17 is performed, the SMF may subscribe to a service in which the MB-SMF notifies the update status. The SMF may be notified of the update status of the multicast session from an NF other than MB-SMF (eg, UDR, PCF). To this end, the SMF may subscribe to a service that notifies the update status of the multicast session provided by the corresponding NF. For example, when SMF subscribes to a service that notifies the update status of multicast session provided by UDR, when performing step 6) in the example of FIG. 17 or after step 6) is performed, the SMF may subscribe to the service of the UDR.

3) The SMF may decide to remove or release the unicast QoS Flow(s) corresponding to the removed or released multicast QoS Flow(s). When an EBI is allocated to the removed or released unicast QoS Flow(s), the SMF may release the allocated EBI.

The SMF may transmit a message including information on the released EBI to the AMF. In the example of FIG. 19, the SMF transmitted the Namf_Communication_EBIAssignment Request message to the AMF, but this is only an example, and the SMF may use another message (eg, a Namf_N1N2MessageTransfer message).

4) The AMF may receive information about the released EBI from the SMF. AMF may perform EBI release. EBI release may mean that the AMF deletes EBI allocation information from the corresponding PDU Session.

The AMF may transmit a response message (eg, Namf_Communication_EBIAssignment Response message) to the SMF.

5) The SMF may transmit an SM NAS message (eg, PDU Session Modification Command) including information on the removed or released unicast QoS Flow(s) to the UE. In addition, the SMF may transmit N2 SM information including information on the removed or released unicast QoS Flow(s) to the NG-RAN.

For example, the SMF may transmit the SM NAS message and a message including the N2 SM information (eg, a Namf_Communication_N1N2MessageTransfer message) to the AMF.

Here, the message transmitted by the SMF to the AMF (this message may include an SM NAS message and/or N2 SM information) may include information about the updated multicast session.

If the unicast QoS Flow corresponds to a multicast session other than the multicast session requested by the UE to leave (example: When one unicast QoS Flow corresponds to a multicast QoS Flow for another multicast session), the SMF may decide not to remove/release the unicast QoS Flow. In this case, since the unicast QoS Flow is continuously maintained, the SMF may not release the EBI allocated to the unicast QoS Flow. In this case, the SMF does not need to inform the AMF of the information about the EBI release.

Instead of determining the removal/release of the unicast QoS Flow(s) corresponding to the multicast QoS Flow(s) constituting the multicast session for which the SMF requested leave, the SMF may receive information related to removal/release of unicast QoS Flow(s) corresponding to multicast QoS Flow(s) from MB-SMF. Alternatively, the SMF may be provided with the information (information related to removal/release of unicast QoS Flow(s) corresponding to multicast QoS Flow(s)) through interaction with other NFs (eg, PCF, UDR).

For reference, in the example of FIG. 19, although steps 3) and 5) are shown to be independently performed, this is only an example, and the scope of the disclosure of the present specification is not limited by the example of FIG. 19. For example, steps 3) and 5) of FIG. 19 may be combined and performed. For example, the SMF may transmit the information transmitted to the AMF in step 3) and the information transmitted to the AMF in step 5) to the AMF together.

6) The AMF may transmit the message received from the SMF to the NG-RAN. For example, the AMF may transmit an N2 session request message (including an SM NAS message and/or N2 SM information) including a message received from the SMF to the NG-RAN.

7) NG-RAN may transmit an SM NAS message to the UE.

Hereinafter, in the fourth example of the seventh disclosure of the present specification, a procedure related to multicast termination will be described with reference to the example of FIG. 20.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 20:
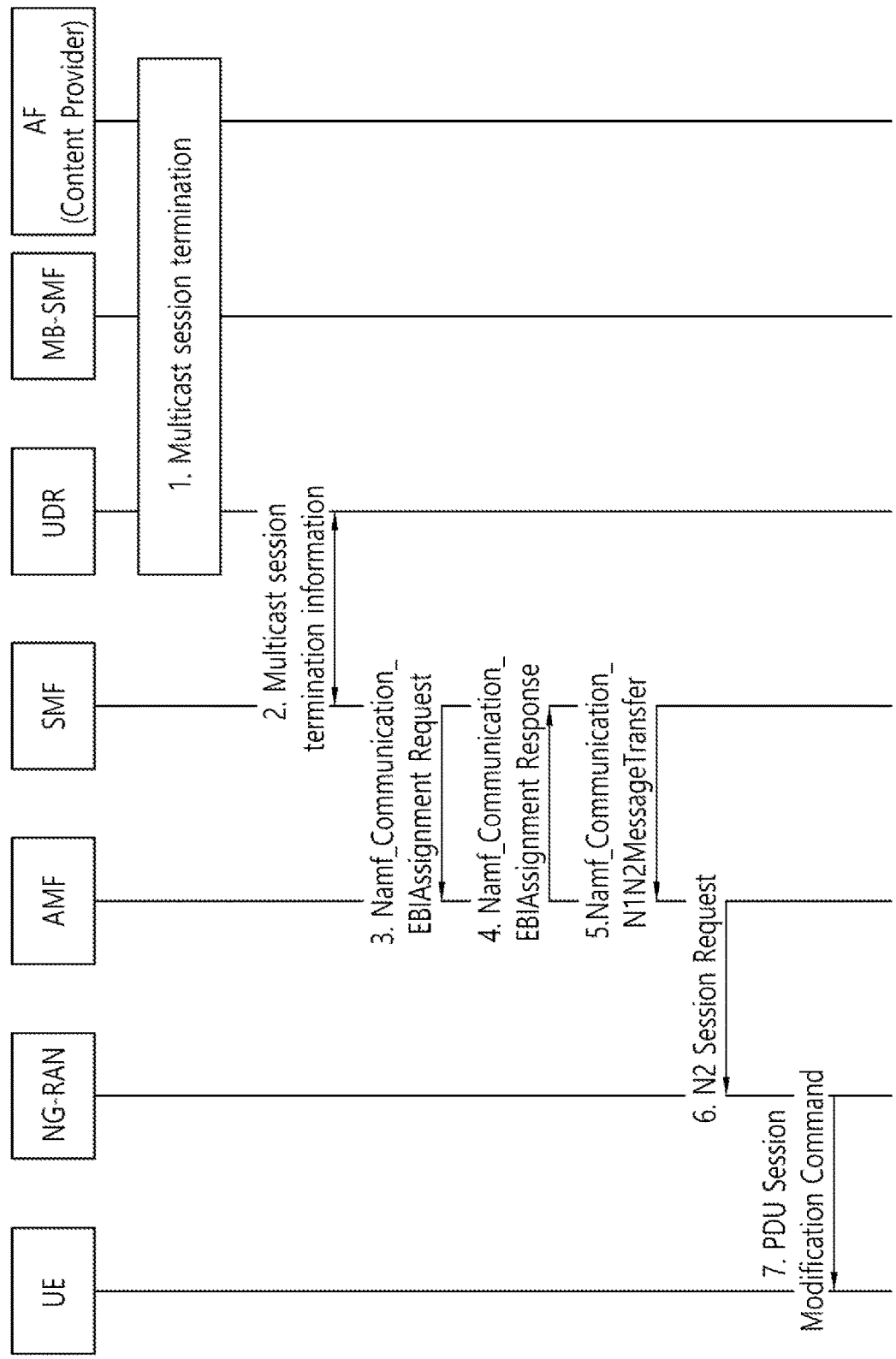
FIG. 20 shows an example of operation of a terminal and a network according to a fourth example of the seventh disclosure of the present specification.

FIG. 20 shows an example of operation of a terminal and a network according to a fourth example of the seventh disclosure of the present specification.

In the example of FIG. 20, it is assumed that the UE joins a multicast group and receives a multicast service.

1) AF (or Content Provider) may perform multicast session termination procedure with 5GC. As AF (or Content Provider) provides termination information for multicast service as 5GC, the multicast session termination procedure may be to terminate the multicast session in 5GC. Such multicast session termination may not be performed by input (or request) of AF (or content provider). For example, instead of the AF (or Content Provider) performing multicast session termination, AF (or Content Provider) may determine or perform termination of the multicast session within 5GC.

In the disclosure of this specification, multicast session termination may be interpreted as multicast session stop, multicast session release, and multicast session deactivation.

2) SMF may obtain information on multicast session termination from UDR. In this way, in order for the SMF to be notified of the update status of the multicast session including the multicast session termination from the UDR, SMF can subscribe to a service that notifies the update status (e.g. update status may include termination of multicast session) of multicast session provided by UDR. For example, when performing step 6) in the example of FIG. 17 or after step 6) is performed, SMF can subscribe to a service where UDR notifies of update status. The SMF may be notified of the update status of the multicast session from an NF other than UDR (eg, MB-SMF, PCF). To this end, the SMF may subscribe to a service that notifies the update status of the multicast session provided by the corresponding NF. For example, after step 7) in the example of FIG. 17 is performed, the SMF can subscribe to a service that notifies the update status of the multicast session provided by the corresponding NF.

3) The SMF may determine the removal or release of unicast QoS Flow(s) corresponding to multicast QoS Flow(s) constituting the terminated multicast session. If EBI is allocated to the unicast QoS Flow(s) to be removed or released, the SMF releases the allocated EBI.

The SMF may transmit a message including information on the released EBI to the AMF. In the example of FIG. 20, the SMF sent a Namf_Communication_EBIAssignment Request message to the AMF, this is only an example, and the SMF may use other messages (eg, Namf_N1N2MessageTransfer message).

4) The AMF may receive information about the released EBI from the SMF. AMF may perform EBI release. EBI release may mean that the AMF deletes EBI allocation information from the corresponding PDU Session.

The AMF may transmit a response message (eg, Namf_Communication_EBIAssignment Response message) to the SMF.

5) The SMF may transmit an SM NAS message (eg, PDU Session Modification Command) including information on the removed or released unicast QoS Flow(s) to the UE. In addition, the SMF may transmit N2 SM information including information on the removed or released unicast QoS Flow(s) to the NG-RAN.

For example, the SMF may transmit the SM NAS message and a message including the N2 SM information (eg, a Namf_Communication_N1N2MessageTransfer message) to the AMF.

Here, the message transmitted by the SMF to the AMF (this message may include an SM NAS message and/or N2 SM information) may include information on the terminated multicast session.

If the unicast QoS Flow corresponds to a multicast session other than the terminated multicast session (eg, when one unicast QoS Flow also corresponds to a multicast QoS flow for another multicast session), the SMF may decide not to remove/release the unicast QoS Flow. In this case, since the unicast QoS Flow is continuously maintained, the SMF may not release the EBI allocated to the unicast QoS Flow. In this case, the SMF does not need to inform the AMF of the information about the EBI release.

Instead of determining the removal/release of the unicast QoS Flow(s) corresponding to the multicast QoS Flow(s) constituting the multicast session where the SMF is terminated, the SMF may receive information related to removal/release of unicast QoS Flow(s) corresponding to multicast QoS Flow(s) from MB-SMF. Or, through interaction with other NFs (eg, PCF, UDR), the SMF may be provided with the above information (information related to removal/release of unicast QoS Flow(s) corresponding to multicast QoS Flow(s)).

For reference, in the example of FIG. 20, although steps 3) and 5) are shown to be independently performed, this is only an example, and the scope of the disclosure of the present specification is not limited by the example of FIG. 20. For example, steps 3) and 5) of FIG. 20 may be combined and performed. For example, the SMF may transmit the information transmitted to the AMF in step 3) and the information transmitted to the AMF in step 5) to the AMF together.

6) The AMF may transmit the message received from the SMF to the NG-RAN. For example, the AMF may transmit an N2 session request message (including an SM NAS message and/or N2 SM information) including a message received from the SMF to the NG-RAN.

7) NG-RAN may transmit an SM NAS message to the UE.

When the multicast session is terminated, AF (or Content Provider) the UE may be notified (or notified) of the terminated multicast service, by using a higher layer (e.g. using application layer signaling). Then, the UE may perform leave for the terminated multicast service. For example, the UE performs leave for the terminated multicast service, the operations described above in the second example of the seventh disclosure of the present specification may be performed.

Hereinafter, an example of the operation of the terminal and the network according to the disclosure of the present specification described above through various examples will be described with reference to FIG. 21. For reference, FIG. 21 is only an example, and the terminal and the network may perform the operations described above in various examples of the disclosure of the present specification, although the operations are not shown in FIG. 21.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 21:
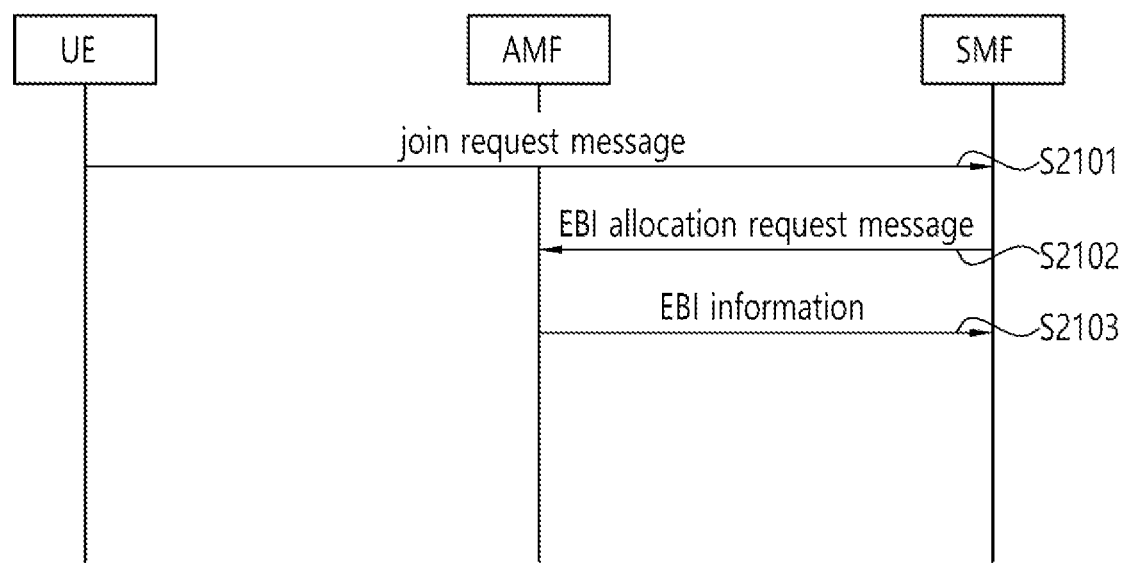
FIG. 21 shows an example of the operation of the terminal and the network according to the disclosure of the present specification.

FIG. 21 shows an example of the operation of the terminal and the network according to the disclosure of the present specification.

For reference, in the example of FIG. 21, the SMF may be an SMF serving multicast communication. Alternatively, the SMF may communicate with MB-SMF serving multicast communication. Alternatively, the SMF may be a network node that also performs an operation performed by the MB-SMF described in the disclosure of this specification.

In step S2101, the UE may transmit a join (participation) request message to the SMF. Here, the join request message may be a message requesting that the UE participate in multicast communication.

The join request message may be transmitted along with information related to the PDU session of the UE. And, the join request message may include the address or identification information of the multicast group to which the UE wants to join.

In step S2102, the SMF may transmit an EBI allocation request message to the AMF. After the SMF receives the join request message from the UE, the SMF may identify a multicast QoS flow related to a multicast communication that the UE intends to participate in. Alternatively, the SMF may identify a unicast QoS flow corresponding to a multicast QoS flow related to multicast communication that the UE intends to participate in. To request that the SMF allocate an EBI for the unicast QoS flow corresponding to this multicast QoS flow, the SMF may transmit an EBI allocation request message to the AMF.

Here, the unicast QoS flow corresponding to the multicast QoS flow may be, for example, a QoS flow included in the PDU session used by the UE to transmit the join request message in step S2101.

The SMF may determine (or generate) a unicast QoS flow corresponding to the multicast QoS flow before performing step S2102. For example, the SMF prepares for a situation in which the UE moves to the EPS, the SMF may determine (or create) a unicast QoS flow corresponding to a multicast QoS flow.

In step S2103, the AMF may transmit a message including EBI information to the SMF. Here, the EBI information may include EBI information allocated for a unicast QoS flow corresponding to the multicast QoS flow of step S2102. The EBI assigned for unicast QoS flows, when the UE moves from 5GS to EPS, may be used by the UE and the network to perform multicast communication in the EPS in a unicast manner.

Although not shown in FIG. 21, the SMF may transmit EBI information to the UE.

Although not shown in FIG. 21, the SMF may revoke the EBI allocated for the unicast QoS flow corresponding to the multicast QoS flow. For example, when the UE transmits a leave request message to the SMF requesting to leave the multicast communication, when the multicast QoS flow is removed from the multicast communication, or when the multicast communication is terminated/removed, the SMF may release the assigned EBI. The SMF may inform the AMF that it has released the allocated EBI.

According to the disclosure of the present specification described above through various examples, transition of 5GS multicast communication (eg transmission) to EPS unicast communication (eg transmission) may be supported. For example, according to the disclosure of this specification, for traffic transmitted in a multicast manner in 5GS, even after the UE moves from 5GS to EPS, it may switch from EPS to unicast to transmit traffic to the UE. Therefore, the network may continuously and/or effectively provide the MBS service to the UE.

According to the disclosure of the present specification, for example, the following operations may be performed. For example, according to the first example of the second disclosure of the present specification, the AMF may be requested to allocate EBI for Multicast QoS Flow(s) from the SMF. AMF may allocate EBI for Multicast QoS Flow(s). When the AMF performs EBI allocation, the AMF may provide the allocated EBI to the SMF. In addition, the AMF and/or the SMF may store information on the allocated EBI. When UE moves from 5GS to EPS, the AMF can also obtain the SM context by requesting the SMF for the Multicast QoS Flow(s) to which the EBI is assigned.

According to the disclosure of the present specification, for example, the following operations may be performed. For example, according to the second example of the second disclosure of the present specification, the SMF may receive a join request for a multicast session/group/service from the UE. The SMF may request the AMF to allocate EBI for Multicast QoS Flow(s) belonging to the multicast session/group/service. The PDU Session ID used when the SMF requests EBI allocation from the AMF may be a PDU Session ID for the PDU Session that the UE uses when requesting a join for multicast session/group/service. When the EBI is allocated from the AMF, the SMF may store information on the allocated EBI. When SMF stores information about the assigned EBI, the SMF may store one or more information on multicast session/service and multicast QoS Flow together. The UE may move from 5GS to EPS. When the UE moves from 5GS to EPS, the AMF may request the SM context from the SMF. When the SMF receives the SM context request from the AMF due to the UE's move from 5GS to EPS, the SMF may provide the AMF with the SM context for the Multicast QoS Flow(s) to which the EBI is assigned.

According to the disclosure of the present specification, for example, the following operations may be performed. For example, the contents described in the second example of the second disclosure of the present specification are applied, and instead of performing EBI allocation for Multicast QoS Flow, EBI allocation may be performed for Unicast QoS Flow corresponding to Multicast QoS Flow. For example, the SMF may receive a join request for a multicast session/group/service from the UE. For the unicast QoS Flow corresponding to the multicast QoS Flow belonging to the multicast session/group/service joined by the UE, the SMF may request the AMF to allocate an EBI. Here, the unicast QoS Flow corresponding to the multicast QoS Flow may be a QoS Flow belonging to the PDU Session used when the UE requests a join. The SMF transmits a request message including the ID of the PDU Session and ARP information of the unicast QoS Flow to the AMF, the SMF may request the AMF to allocate EBI for unicast QoS Flow. The SMF may release the EBI allocated for the unicast QoS Flow (ie, a unicast QoS Flow corresponding to a Multicast QoS Flow). When the SMF releases the assigned EBI, it may notify the AMF.

For reference, the operation of the terminal (eg, UE) described in this specification may be implemented by the apparatus of FIGS. 1 to 3 described above. For example, the terminal (eg, UE) may be the first device 100 or the second device 200 of FIG. 1. For example, an operation of a terminal (eg, UE) described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 control one or more memories 104 or 204 and one or more transceivers 105 or 206, and may perform the operation of the terminal (eg, UE) described herein by executing instructions/programs stored in one or more memories 104 or 204.

In addition, instructions for performing an operation of a terminal (eg, UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (eg, UE) described in the disclosure of the present specification.

For reference, the operation of a network node (eg, AMF, SMF, UPF, PCF, UDR, UPF, PCF, V-SMF, PGW-C+SMF, PGW-U+UPF, PGW-C+SMF, MB-UPF, NEF, MBSF, MB-SMF, AF, etc.) or base station (eg, NG-RAN, gNB, gNB (NB-IoT), gNB(NR) eNB, RAN, etc.) described herein may be implemented by the apparatus of FIGS. 1 to 3 to be described below. For example, a network node or a base station may be the first device 100a of FIG. 1 or the second device 100b of FIG. 1. For example, the operation of a network node or base station described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 may perform the operation of a network node or a base station described herein, by controlling one or more memories 104 or 204 and one or more transceivers 106 or 206 and executing instructions/programs stored in one or more memories 104 or 204.

In addition, instructions for performing the operation of the network node or base station described in the disclosure of this specification may be stored in a non-volatile (or non-transitory) computer-readable storage medium. The storage medium may be included in one or more memories 104 or 204. And, the instructions recorded in the storage medium are executed by one or more processors 102 or 202, so that the operations of a network node or base station are performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method comprising:
   performing a registration with a wireless device;
   establishing a protocol data unit (PDU) session with the wireless device;
   receiving a join request for a multicast session associated with the PDU session from the wireless device;
   transmitting an assignment request message to an access mobility management node for requesting an evolved packet system (EPS) bearer ID (EBI) from the access mobility management node; and
   receiving the EBI from the access mobility management node,
   wherein the EBI is assigned to a unicast quality of service (QoS) flow corresponding to a multicast QoS flow related to the multicast session, and
   wherein the EBI assigned to the unicast QoS flow is used to perform communication of the multicast session in an EPS based on the wireless device moving to the EPS.

2. The method of claim 1,
   wherein the join request is received together with information related to the PDU session,
   wherein the unicast QoS flow is a QoS flow included in the PDU session.

3. The method of claim 1,
   determining the unicast QoS flow corresponding to the multicast QoS flow.

4. The method of claim 1, further comprising
   revoking the EBI assigned to the unicast QoS flow corresponding to the multicast QoS flow.

5. The method of claim 4, further comprising:
   transmitting information informing that the EBI is released to the access mobility management node.

6. The method of claim 4, further comprising:
   receiving a leave request message for requesting to leave the multicast session from the wireless device,
   wherein the revoking is performed based on the leave request message being received.

7. The method of claim 1, further comprising:
   generating the multicast QoS flow based on the join request.

8. The method of claim 1, further comprising:
   transmitting the EBI assigned to the unicast QoS flow corresponding to the multicast QoS flow to the wireless device.

9. A method comprising:
   performing a registration with a network;
   establishing a protocol data unit (PDU) session with the network;
   transmitting a join request for a multicast session associated with the PDU session to a session management node; and
   receiving an evolved packet system (EPS) bearer ID (EBI) from the session management node,
   wherein an assignment request message is transmitted from the session management node to an access mobility management node for requesting the EBI from the access mobility management node,
   wherein the EBI is received from the access mobility management node via the session management node,
   wherein the EBI is assigned to a unicast quality of service (QoS) flow corresponding to a multicast QoS flow related to the multicast session,
   wherein the EBI for assigned to the unicast QoS flow is used to perform communication of the multicast session in an EPS based on a wireless device moving to the EPS.

10. The method of claim 9,
    wherein the unicast QoS flow is a QoS flow included in the PDU session.

11. The method of claim 9, further comprising:
transmitting a leave request message for requesting to leave the multicast session to the session management node.

12. A session management node comprising:
at least one processor; and
at least one memory for storing instructions and operably electrically connectable with the at least one processor;
wherein the operations performed based on execution of the instructions by the at least one processor include:
performing a registration with a wireless device;
establishing a protocol data unit (PDU) session with the wireless device;
receiving a join request for a multicast session associated with the PDU session from the wireless device;
transmitting an assignment request message to an access mobility management node for requesting an evolved packet system (EPS) bearer ID (EBI) from the access mobility management node; and
receiving the EBI from the access mobility management node,
wherein the EBI is assigned to a unicast quality of service (QoS) flow corresponding to a multicast QoS flow related to the multicast session, and
wherein the EBI assigned to the unicast QoS flow is used to perform communication of the multicast session in an EPS based on the wireless device moving to the EPS.

\* \* \* \* \*